United States Patent [19]
Okuda et al.

[11] Patent Number: 5,963,280
[45] Date of Patent: Oct. 5, 1999

[54] BACKLIGHTING DEVICE AND COLOR DISPLAY DEVICE

[75] Inventors: Eiichiro Okuda, Habikino; Shiro Asakawa, Nara; Tohru Okauchi, Ikoma, all of Japan

[73] Assignee: Matsushita Electric Industrial Co., Ltd., Osaka, Japan

[21] Appl. No.: 09/196,077

[22] Filed: Nov. 19, 1998

Related U.S. Application Data

[62] Division of application No. 08/760,711, Dec. 5, 1996.

[30]   Foreign Application Priority Data

| Dec. 5, 1995 | [JP] | Japan | .................................. 7-316227 |
| Feb. 26, 1996 | [JP] | Japan | .................................. 8-037783 |
| Apr. 9, 1996 | [JP] | Japan | .................................. 8-086190 |
| Apr. 9, 1996 | [JP] | Japan | .................................. 8-086191 |

[51] Int. Cl.⁶ .............................................. G02F 1/1335
[52] U.S. Cl. ................................ 349/65; 344/64; 344/86; 362/27
[58] Field of Search .................................. 349/62, 64, 65, 349/68, 86; 362/26, 27, 31

[56]              References Cited

U.S. PATENT DOCUMENTS

| 2,200,300 | 5/1940 | Roper . |
| 4,137,524 | 1/1979 | Chen et al. . |
| 4,235,526 | 11/1980 | Berman et al. . |
| 4,418,377 | 11/1983 | Tamura . |
| 4,422,719 | 12/1983 | Orcutt . |
| 4,635,033 | 1/1987 | Inukai et al. . |
| 4,669,828 | 6/1987 | Parker . |
| 4,949,489 | 8/1990 | Rudell et al. . |
| 5,099,343 | 3/1992 | Margerum et al. . |
| 5,124,890 | 6/1992 | Choi et al. ................................ 362/27 |
| 5,202,950 | 4/1993 | Arego et al. ............................ 385/146 |
| 5,390,085 | 2/1995 | Mari-Roca et al. . |

FOREIGN PATENT DOCUMENTS

| 0 229 863 | 7/1987 | European Pat. Off. . |
| 0 261 898 | 3/1988 | European Pat. Off. . |

(List continued on next page.)

OTHER PUBLICATIONS

Optics, Second Edition, p. 300, Addison–Wesley Publishing Company.

"Backlighting Technology for Liquid Crystal Panel", pp. 23–41 (w/partial English translation).

(List continued on next page.)

*Primary Examiner*—William L. Sikes
*Assistant Examiner*—Kenneth Parker
*Attorney, Agent, or Firm*—Ratner & Prestia

[57]                ABSTRACT

To achieve a backlighting device having excellent light utilization, there is provided an edge lighting-type backlight having a light guiding member, a high-refractive-index layer formed thereon and having a higher refractive index than the light guiding member, and a scattering layer formed on the high-refractive-index layer. Light from a light source disposed facing the edge of the light guiding member enters the high-refractive-index layer through the light guiding member, and effectively scatters scatterers to produce high brightness, and furthermore, to achieve a color display device that eliminates color. mixing in a transparent display device for decorative or various display uses, a construction is provided in which on one surface of a light guiding plate there are formed a high-refractive-index layer having a higher refractive index than the light guiding plate, a light scattering layer, and a low-refractive-index layer having a lower refractive index than the light guiding plate, one on top of another in this order, and on top of that structure another light guiding plate is provided, on top of which a high-refractive-index layer and a light scattering layer are likewise formed, while a color filter is disposed on one edge face of each light guiding plate and a light source is disposed near each color filter.

10 Claims, 43 Drawing Sheets

FOREIGN PATENT DOCUMENTS

| | | |
|---|---|---|
| 0 272 582 | 6/1988 | European Pat. Off. . |
| 0 398 346 | 11/1990 | European Pat. Off. . |
| 0 424 950 | 5/1991 | European Pat. Off. . |
| 0 552 508 | 7/1993 | European Pat. Off. . |
| 0 559 914 | 9/1993 | European Pat. Off. . |
| 0 643 315 | 3/1995 | European Pat. Off. . |
| 0 747 750 | 12/1996 | European Pat. Off. . |
| 23 53 485 | 5/1975 | Germany . |
| 28 41 338 | 11/1979 | Germany . |
| 53-20794 | 2/1978 | Japan . |
| 57-5030 | 1/1982 | Japan . |
| 57-045520 | 3/1982 | Japan . |
| 58-17957 | 4/1983 | Japan . |
| 59-194302 | 11/1984 | Japan . |
| 61-55684 | 3/1986 | Japan . |
| 1-245220 | 9/1989 | Japan . |
| 2-241843 | 9/1990 | Japan . |
| 3-23423 | 1/1991 | Japan . |
| 3-73926 | 3/1991 | Japan . |
| 3-52843 | 8/1991 | Japan . |
| 03282416 | 12/1991 | Japan . |
| 04012388 | 1/1992 | Japan . |
| 05072563 | 3/1993 | Japan . |
| 05232467 | 9/1993 | Japan . |
| 5-229366 | 9/1993 | Japan . |
| 5-319138 | 12/1993 | Japan . |
| 06235917 | 8/1994 | Japan . |
| 08011581 | 1/1996 | Japan . |
| 08101309 | 4/1996 | Japan . |
| 1044351 | 9/1966 | United Kingdom . |
| 1350601 | 4/1974 | United Kingdom . |
| 2 259 176 | 3/1993 | United Kingdom . |
| 95/16983 | 6/1995 | WIPO . |

OTHER PUBLICATIONS

European Search Report corresponding to application No. EP 96 11 9458 dated Feb. 19, 1998.

Y. Mesaki et al., "19.1: Invited Address: New Backlighting Technologies for LCDs", *SID 94 Digest,* pp. 281–284, Jun. 14, 1994.

European Search Report corresponding to application No. EP 96 11 9458 dated Jul. 7, 1998.

GREEN

BLUE

RED

Fig. 13(a) GREEN
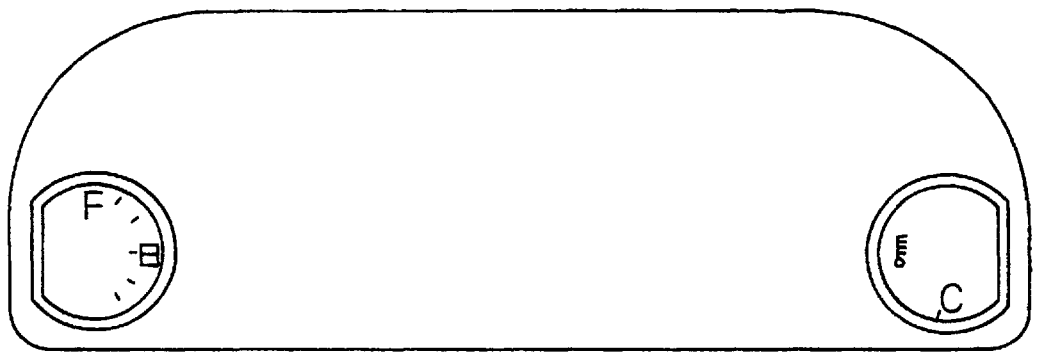
Fig. 13(b) BLUE
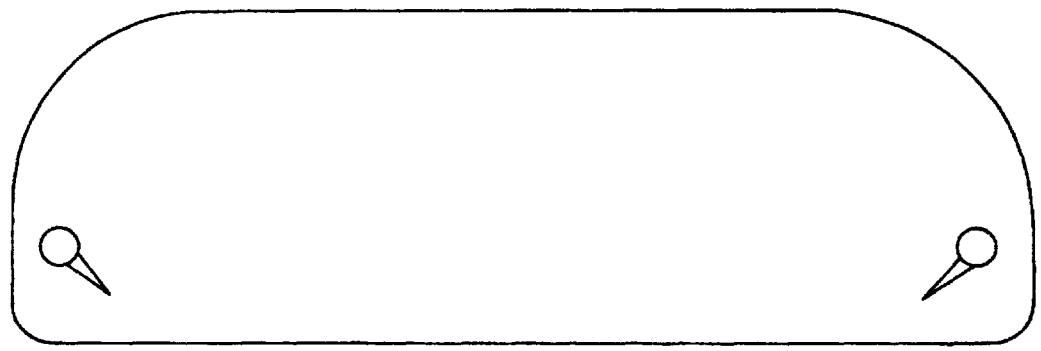
Fig. 13(c) RED
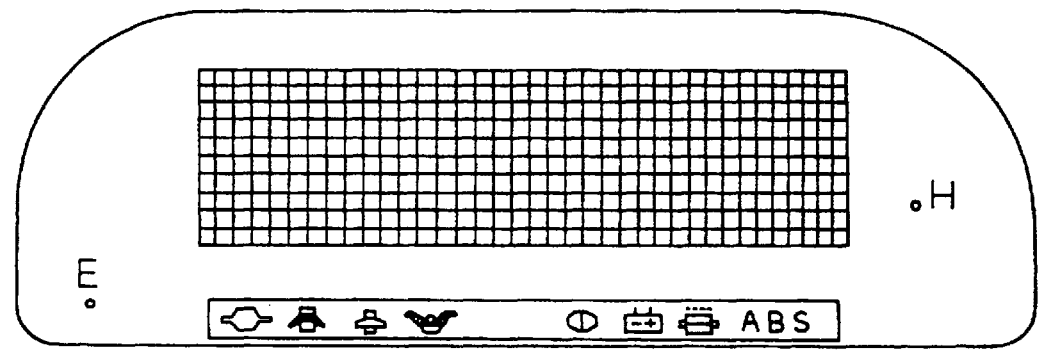

Fig. 16
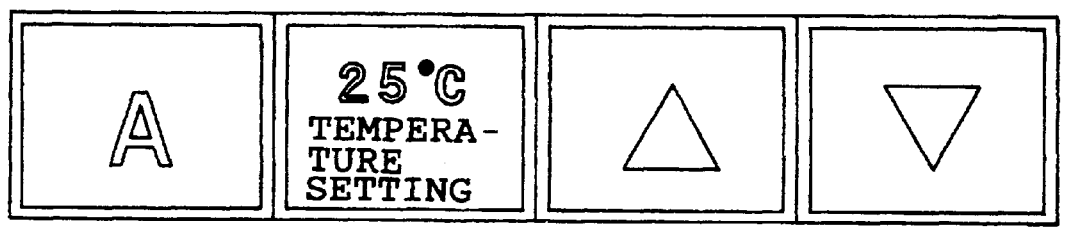
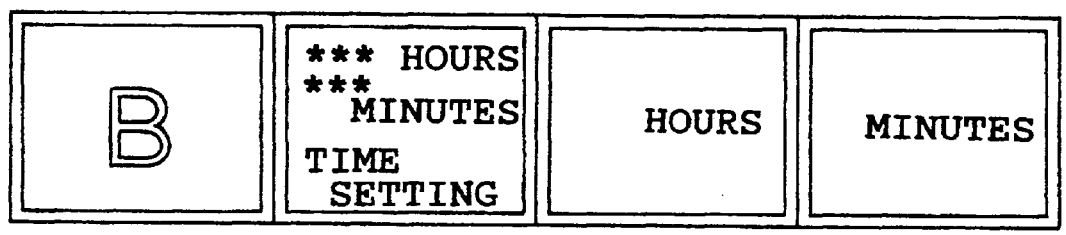

(a)

(b)

(c)

OFF STATE (SCATTERED STATE)

ON STATE (TRANSPARENT STATE)

(a)

(b)

(c)

BACKLIGHTING DEVICE AND COLOR DISPLAY DEVICE

This application is a division of U.S. patent application Ser. No. 08/760,711, filed Dec. 5, 1996.

BACKGROUND OF THE INVENTION

1. Field of the Invention

The present invention relates to a backlighting device used as a surface-area light source for various kinds of display devices, and also relates to a display device, and particularly a color display device, that is used, for example, in transport means such as an automobile, vessel; train car, and that allows the driver or operator of the transport means to view images or characters displayed on the display in superimposed fashion on an outside view ahead.

2. Description of the Related Art

In recent years, an edge lighting method has become a predominant method for flat display backlighting. This method uses a substrate made of an acrylic resin or the like, and a light source (such as a fluorescent lamp or cold-cathode lamp) disposed in close proximity to an edge of the substrate, and light from the light source is introduced into the transparent resin substrate and is made to emerge from the display surface. If a picture or other visual means is used instead of a display, this edge lighting method can be used for a decorative panel or a signboard. In such applications, in order to utilize efficiently light it is usual to place a reflecting plate on the reverse side of the substrate and a diffusing plate on the front side.

The refractive index of the acrylic resin (polymethyl methacrylate) is n=1.49. Therefore the critical angle of reflection at the interface with air is about 42°, and most of the light from the light source propagates through the substrate without emerging from the substrate. A variety of methods have been proposed to avoid this limitation and to extract the light in the desired direction (Japanese Patent Unexamined Publication Nos. 61-55684 and 1-245220, Japanese Patent Examined Publication No. 58-17957, Japanese Patent Unexamined Publication No. 59-194302, etc.).

In a method that involves applying a white paint or the like on the front side to diffuse light, light absorption by the paint cannot be ignored. Another method involves roughening the front surface from which the light emerges, but with this method also, sufficient light utilization cannot be obtained. In most of the currently practiced methods, direct emergent light from the front surface is not actively utilized, but a reflective film is placed on the reverse side of a light guiding plate and reflected light from the reflective film is made to emerge from the front surface. A white-colored film (including a white color painted plate, white color printed film, etc.) or a metallized film is used as the reflective film. The diffusing plate on the front side is used presumably for the purpose of evening out the reflected light, and furthermore, to enhance the directionality of the emergent light and increase its brightness, a method that uses a prism film or the like is employed.

However, with the shift from the traditional monochrome display to the more advanced full-color display, it is becoming increasingly important to increase the screen brightness, and a further improvement in the efficiency of backlighting is needed. To achieve this, various improvements have been proposed, such as reducing the cold-cathode lamp diameter, improving the reflective film, and improving the geometrical shape of the light guiding plate. While these improvements have been successful in increasing the brightness, they have had other problems such as increased cost and increased complexity of the system. Furthermore, utilizing reflected light is reaching its technological limit. The only way left to further improve the efficiency is to utilize the directly emerging light from the front surface of the light guiding plate. Utilizing the direct light from the front surface involves the problem of using the surface-area light source as a transparent body.

In applications where a picture or other visual means is used instead of a display to create a display apparatus (static) such as a light-guiding type decorative panel or signboard, as earlier described, in the case of displaying a color picture the color picture can be used as is, and in other cases, usually a light-scattering image or sign pattern is drawn and cut and is overlaid on a background color plate, while using a color filter to accomplish a color display.

On the other hand, if a dynamic display is to be achieved with this display, one possible way will be to use a light-scattering image using, for example, a macromolecular dispersion-type liquid crystal (polymer dispersed liquid crystal). In connection with this method, constructions similar to the above display apparatus are disclosed, for example, in Japanese Patent Unexamined Publication Nos. 3-73926 and 3-23423. The former proposes arranging different-colored light sources on two edge sides of a liquid crystal panel and switching the color between the two light sources thereby changing the color of a single image in time sequence. The latter states that a color display can be realized using color filters though no specific examples are shown.

In the (static) display apparatus of the above prior art, since color filters are used for the image portion, the number of colors that can be produced is fixed. Furthermore, with the exception of special examples, since a reflecting plate or a colored screen or the like is used for the background, they generally lack the concept that the whole construction should be made transparent. On the other hand, in the dynamic display apparatus using a macromolecular dispersion-type liquid crystal, the image can be displayed in mono-color but cannot be displayed in multi-colors at any arbitrary time and in any arbitrary region. Japanese Patent Unexamined Publication Nos. 3-73926 and 3-23423, cited above, both use a reflecting plate or a colored absorbing plate in their embodiments and lack the concept that the whole construction should be made transparent. The freedom of color selection can be increased and multi-color capability achieved by making the construction transparent and by stacking one on top of another a plurality of display devices each used to introduce a different color. In this case, however, the problem of how to separate the respective colors has to be addressed. There is also the problem of how to increase the variety of colors. A further problem is how these requirements can be accomplished in a compact and efficient construction.

There are two main types of display device: the self-luminous type such as the CRT, PDP, LED, and EL, and the external light type, such as the liquid crystal and electrochromic display, that produces the display by receiving light from a separate light source. In some applications, such display devices are positioned for use near a window glass or a show window. In other and more recent applications, such display devices are used as instrument and other display devices in automobiles, vessels, train cars, etc., a typical example being a direct-view head-up display (HUD). Since the display area of any of these display devices displays information thereon by emitting some form of display light, if the display device is positioned within such a distance that the display light reaches a window glass or a show window, the displayed image is reflected more or less onto the window glass or show window and comes into the viewer's visual field. The phenomenon of such reflection also occurs on a window glass or a show window near which a signboard or the like is put up.

In such cases, when light from the background of the window glass or illumination inside the show window is sufficiently strong, the reflection hardly disrupts the viewer's view, but when the light from the background of the window glass or the illumination inside the show window is weak, or when the display light from the display device is very strong, the reflection on the window glass or the show window becomes pronounced and annoys the viewer, and in the case of vehicular applications, adversely affects the driving operation of the driver.

Traditional methods to prevent such reflection have been to position the display device so that the display area does not face the window glass or the show window, to block the display light using a shade so that the display light does not fall on the window glass, to reduce the ambient light as well as the brightness of the display to reduce the intensity of the display light, and so on. For example, in a train or a bus running in the nighttime, in order that the panel faces such as instrument panels in the cab may not be reflected onto the windshield by the illumination from the passenger compartment and be brought into the visual field of the operator or driver, a shade is provided around the cab to block the illumination from the passenger compartment from entering the cab, or the lighting in and around the cab is dimmed so that the panel faces such as instrument panels in the cab are not reflected by the lighting onto the windshield and brought into the visual field of the operator or driver.

However, the methods employed to prevent the reflection on the window glass or the show window involve the following problems.

In the method that positions the display device so that the display area does not face the window glass or the show window, the position where the display device can be placed is very limited, and particularly, if the display device is positioned against the window glass, the display become very difficult to view when the outside light is bright, though it is easy to view when the outside light is weak.

In the method that provides a shade on the display device, a very wide shade may become necessary depending on the positional relationship between the display device and the window glass or the show window, and often the use of such a shade is not permitted by space limitations or design considerations.

In the method to reduce the ambient light and reduce the intensity of the display light, it becomes necessary to protect the area around the display device from light as the display would become difficult to view if the light through the window glass or the show window is incident on the display device. The display becomes very difficult to view particularly when the outside light from the window glass or the show window is bright.

Instrument panels in passenger cars are a typical example where reflections cause a serious problem. The instrument panel of a passenger car is mounted in a recess in the dashboard, and the surrounding areas are painted black or dark color, to prevent the panel illumination from being reflected onto the windshield during night driving and to prevent outside light from falling directly on the instrument panel during day driving. In such applications where the intensity of the ambient light varies greatly, the method of installing the display device is demanding and very limited in freedom. Furthermore, the display can be viewed from a specified position but cannot be viewed when the viewer's head is moved, if slightly, from the specified position.

Liquid-crystal displays constructed with twisted nematic (TN) liquid crystals sandwiched between two substrates having transparent electrodes have been widely used. The structure and the operating principle of this type of liquid crystal display are shown in FIG. 39. When the liquid crystal molecules on the surface of a substrate 3900 are forced to align in one direction with their long axes arranged at 90° with respect to the liquid crystal molecules on the surface of a substrate 3901 on the opposite side, as shown in FIG. 39($a$) the liquid crystal molecules 3902 are arranged gradually changing their orientation and twisting through 90° between the substrates. A polarizing plate 3903 with its direction of polarization indicated by arrow "a" and a polarizing plate 3904 with its direction of polarization indicated by arrow "b" are attached to the outer surfaces of the substrates 3900 and 3901, respectively. When light is incident on this structure, only light vibrating in the same direction as the direction of polarization of the polarizing plate 3903 is passed through it, and follows the twisted structure of the liquid crystal molecules, the polarization of the light thus being rotated through 90° until reaching the polarizing plate 3904 on the opposite side. Since the direction of polarization of the light now coincides with that of the polarizing plate 3904, the light is passed through it.

On the other hand, when a voltage is applied between the electrodes on the substrates, as shown in FIG. 39($b$), the liquid crystal molecules align themselves with their long axis direction parallel to the direction of the resulting electric field, so that the light entering the liquid crystal layer is passed through it with the direction of polarization of the light remaining unchanged and reaches the polarizing plate 3904 on the opposite side where the light is blocked, creating a dark spot. An image or character is thus displayed by applying a voltage at a portion where the image or character is to be displayed.

FIG. 40 shows another type of liquid crystal display which uses a macromolecular dispersion-type liquid crystal. In the macromolecular dispersion-type liquid crystal, the orientation of the liquid crystal molecules 4006 dispersed in the form of fine droplets in a macromolecular matrix 4005 is changed by applying an electric field, and the resulting change of refractive index is utilized to produce a display.

In the OFF state in which no voltage is applied, as shown in FIG. 40($a$), the optical axes of the liquid crystal molecules 4006 are random, and the difference in refractive index between macromolecule and liquid crystal causes the entering light to scatter in many directions.

On the other hand, when the voltage is applied, that is, in the ON state shown in FIG. 40($b$), the liquid crystal molecules 4006 are aligned in the direction of the applied electric field, because refractive indices of macromolecular and liquid crystal are substantially same so that the entering light is passed through without being scattered. That is, in the OFF state, the display is like frosted glass because of scattering light, and in the ON state, the display is like transparent glass. In this way, by placing image or character portions in the OFF state and other portions in the ON state, an image or character is displayed on a transparent screen.

However, the conventional twisted nematic liquid crystal display requires the use of two polarizing plates, as earlier described, and therefore, the light transmittance is 40 to 50% at most. This low transmittance is not suitable for forming an image on a transparent display screen, and it is difficult to display an image or character in superimposed fashion on the background view.

On the other hand, in the case of the macromolecular dispersion-type liquid crystal display which does not require the use of polarizing plates, the transmittance in the ON state is nearly 80 to 90%, which provides good transparency. However, when displaying patterns such as shown in FIG. 41, portions corresponding to the patterns to be displayed are placed in the OFF state to form scattered light images, while the other portions are placed in the ON state and thus made transparent, but since the wiring patterns for the display patterns placed in the OFF state also cause scattering of light, making the wiring patterns visible on the screen, visibility and transparency are impaired when the displayed images or characters are superimposed on the background view; this presents a problem particularly when displaying a plurality of patterns requiring an increased number of wiring patterns.

Furthermore, when an AC voltage is applied between the electrodes, a slight amount of current flows as this system is a kind of capacitor. When displaying patterns such as shown in FIG. 42, larger current flows through the wiring for the larger display pattern, and hence ia>ib. Voltage drops Va and Vb through the respective wiring patterns are expressed by Va=r*ia and Vb=r*ib. Assuming the wiring patterns have the same resistance r, since ia>ib, it follows that Va>Vb, which indicates that the voltage drop is larger for the larger display pattern.

FIG. 43 is a voltage-transmittance characteristic diagram for a typical macromolecular dispersion-type liquid crystal, plotting the transmittance as a function of the applied voltage. As described above, if the same voltage is applied to the respective display patterns from the drive circuit, the voltages actually applied to the respective liquid crystal portions are different. This gives rise to the problem that variations are caused in the transparency of the screen and the transparent appearance is impaired.

Furthermore, if the area sizes of the display patterns are the same, as shown in FIG. 44, the resistance r is larger for the longer wiring pattern, which means a larger voltage drop. This also presents the problem that variations are caused in the transparency of the screen and the transparent appearance is impaired.

In view of the problems that have made it difficult to use the above-described prior art liquid crystal displays as transparent displays, it is an object of the present invention to provide a transparent liquid crystal display that can display only images and characters that are to be displayed, on a transparent screen in superimposed fashion on the background view, thereby providing good visibility.

For an automotive head-up display (HUD), a projection method is generally used wherein a CRT or a transmission-type liquid crystal display, for example, is used as the image source, and using optics consisting of a lens, mirror, and hologram, a display image or character produced on the image source is projected onto a combiner positioned in front of the driver's seat (or on the windshield) and displayed in superimposed fashion on a forward view. In this projection method, the image source is separately mounted, and a prescribed light path is necessary for projecting the image. The resulting problem is that the system becomes large in size and requires large space for installation, for example, in the dashboard.

Furthermore, in recent automotive instrumentation, a combination instrumentation system is used that displays warning indications, etc. as necessary in superimposed fashion on the ordinary speedometer and tachometer displays. Since this system uses the so-called virtual image display method, the system is complex, occupies large space for installation, and is expensive, which has been a major problem with this system.

SUMMARY OF THE INVENTION

In view of the above-outlined problems with the prior art, it is an object of the present invention to provide a backlighting device for various kinds of display devices, that achieves excellent light utilization.

It is another object of the invention to provide a color display device that eliminates the problem of color mixing and that is compact and efficient.

It is a further object of the invention to provide a color display device that does not cause reflections when positioned near a window or windshield where the ambient light intensity varies greatly, and that can constantly provide good visibility over a wide viewing angle.

It is a still further object of the invention to provide a head-up display, instrument, and rearview mirror that are compact in construction and require much smaller space for installation compared with the prior art construction.

The present invention provides a backlighting device comprising a light guiding member with light source means disposed facing one edge thereof, wherein a substantially transparent layer having a higher refractive index than the light guiding member is formed on a light emergence surface of the light guiding member, on top of which a scattering layer is formed. Preferably, the refractive index of the higher-refractive-index layer is 0.05 to 1.50 greater than the refractive index of the light guiding member.

Also preferably, the scattering layer comprises a mixture of two or more kinds of materials that have different refractive indices, are substantially transparent in the visible spectral region, and are present in a phase separated state; for example, the scattering layer comprises a mixture of two or more kinds of polymers that have different refractive indices and whose constituents are substantially transparent and are present in a phase separated state, or a mixture in which a high-refractive-index compound is present in a phase separated state within a low-refractive-index polymer.

Further preferably, the light emergence surface of the light guiding member is sloped with a sloping angle of 87 degrees or greater but not greater than 90 degrees.

The invention also provides a color display device comprising: a light guiding member constructed with a pair of wedge-shaped light guiding plates bonded together, the bonded surfaces each serving as a reflecting surface; light sources of different colors, each disposed facing one edge of each of the light guiding plates; substantially transparent layers, each formed on a light emergence surface of each of the light guiding plates and having a higher refractive index than the light guiding member; and scattering layers each formed on top of each of the transparent layers.

Using the light guiding member having the above-described structure, the backlighting device of the present invention can achieve improved surface brightness compared with the prior art edge lighting-type backlighting device. The higher-refractive-index layer preferably has a refractive index 0.05 to 1.50 higher than the refractive index of the light guiding member itself, and may be formed from $LaF_3$, $NdF_3$, $Al_2O_3$, $CeF_3$, $PbF_2$, $MgO$, $ThO_2$, $SnO_2$, $La_2O_3$, $In_2O_3$, $Nd_2O_3$, $Sb_2O_3$, $ZrO_2$, $CeO_2$, $TiO_2$, or $ZnS$, or from a complex with a prescribed composition. This layer can be easily formed using a conventional thin film deposition process. If the refractive index of the higher-refractive-index layer is higher by 1.5 or more than that of the light guiding member, coloring at a certain wavelength and a decrease in transparency may occur depending on the material used.

For the scatterer, an ordinary paint or fluorescent paint may be used, but specifically the present invention uses a mixture of two or more kinds of polymers having different refractive indices, a mixture of a polymer and a high-refractive-index compound, etc. The scatterer may be formed uniformly throughout or may be cut in a prescribed pattern (e.g., a character, symbol, sign, etc.).

For the light guiding material, any optically transparent material, such as a glass plate, an acrylic plate, a polycarbonate plate, etc., can be used. A suitable material should be selected according to the film deposition conditions. Further, the light guiding plate shape, such as parallel plates or wedge-shaped plates, can be used as desired according to the purpose.

The present invention is primarily concerned with the utilization of the direct light emerging from the front surface, but it is apparent that the effectiveness can be further enhanced by using it in combination with the conventional edge light system having a reflective layer on the back surface.

When no reflective layer is used, the structure is a transparent surface-area light source corresponding to the pattern of the scatterer. If the method of the invention is used on both sides of a light guiding plate, a double image can be presented, and a multi-color display is also possible by using multiple light sources and switching the light source color.

The effects of the invention having the above-described construction will be described below.

When light is introduced from an edge of a single light guiding plate, such as an acrylic plate, the light undergoes total internal reflection at the critical angle of about 42°, as previously described. In an optical fiber, the core material is surrounded with a lower-refractive-index material to ensure total internal reflection and eliminate losses during propagation. On the other hand, when a higher-refractive-index material is applied on the surface, as in the present invention, the total reflection condition is eased and the light inside the light guiding plate penetrates into the high-refractive-index layer. However, in theory, the light entering this layer propagates while undergoing total internal reflection at a smaller critical angle at the interface with air and does not leak outside. In actuality, however, when a scatterer is placed on the surface of this layer, surface brightness increases compared with a structure where a scatterer is placed directly on the light guiding plate itself.

Though the following explanation does not impose any restrictions on the present invention, generally light is not perfectly reflected at total reflection surfaces but leakage occurs due to a phenomenon called evanescent wave coupling, etc. To prevent this, in an optical fiber, a low-refractive-index layer is provided to confine the light deeply inside. By contrast, in the present invention, it is presumed that the brightness improves not only because the light reaches the outermost layer but because the leakage is promoted by thin film irregularities, etc.

In this way, the present invention achieves efficient utilization of the direct light emerging from the front surface, and by using it in combination with the conventional backlighting method that uses a reflective layer, an excellent backlighting device with further improved brightness can be realized.

Furthermore, by patterning the scattering layer, the structure of the invention can also be used as a transparent display medium.

The present invention also provides a color display device comprising: light guiding plates, disposed parallel to each other, for guiding a plurality of lights therethrough; a light scattering layer formed on a display side of each of the light guiding plates; a low-refractive-index layer formed between the light guiding plates and on the display side of the light scattering layer; a color filter disposed on one edge face of each of the light guiding plates; and a light source disposed near the color filter.

In addition to the above structure, a layer having a higher refractive index than the light guiding plates is formed on top of and/or beneath the light scattering layer.

Preferably, the high-refractive-index layer is a transparent conductive layer, and the light scattering layer is constructed with a macromolecular dispersion-type liquid crystal.

Also preferably, the low-refractive-index layer is also formed on one side of the light guiding plate located at the farthest end from the display side, the one side being opposite from the display side.

Further preferably, the color filters are of three kinds, R, G, and B, respectively.

Also preferably, the color filters are each constructed to be movable with respect to each light guiding plate, allowing selection of a different color.

The present invention also provides a vehicular onboard color display apparatus comprising a color display device, a drive circuit for driving the color display device, and a signal generator for supplying the drive circuit with a signal concerning display contents, the color display device being positioned near a glass surface in such a manner as to allow an image displayed on the color display device to be viewed superimposed on an outside view seen through the glass surface.

The invention also provides a vehicular onboard combination color display apparatus comprising a color display device in combination with an instrument panel for displaying various conditions of a vehicle, and comprising a control section for controlling the color display device and the instrument panel, and an operation section for allowing a manual operation of displayed conditions on the color display device and the instrument panel.

The invention also provides a color display operation panel comprising the above-described color display device in combination with a transparent touch panel switch, and comprising a control section for controlling the transparent touch panel switch and the color display device; and a drive circuit for driving the control section.

In this way, according to the present invention, display devices for decorative and various display uses can be adapted to produce images in desired colors with a wide variety of colors. The color display device of the invention is compact in construction and provides improved display efficiency.

The present invention also provides a color display device which is positioned near a glass surface, such as a window glass or a show window, and equipped with a polarizer, wherein when light emitted from the color display device is reflected at the glass surface and reaches a viewer viewing displayed information on the color display device, and when a plane is determined by three points consisting of the color display device, a reflecting point on the glass surface at which the light from the color display device is reflected, and the viewer, the polarizer has a polarization axis arranged in such a direction as to block or absorb incident light (S wave) whose plane of vibration is perpendicular to the thus determined plane and which would otherwise be incident on the reflecting point.

The invention also provides a liquid crystal display device which is positioned near a glass surface such as a window glass or a show window, and which includes a liquid crystal layer sandwiched between two polarizers mounted on both sides thereof, wherein when light emitted from the liquid crystal display device is reflected at the glass surface and reaches a viewer viewing displayed information on the liquid crystal display device, and when a plane is determined by three points consisting of the liquid crystal display device, a reflecting point on the glass surface at which the light from the liquid crystal display device is reflected, and the viewer, of the two polarizers mounted on the liquid crystal display device the polarizer mounted on a display side has a polarization axis arranged in such a direction as to block or absorb incident light (S wave) whose plane of vibration is perpendicular to the thus determined plane and which would otherwise be incident on the reflecting point.

The invention also provides a color display device positioned near a window glass in an automobile, vessel, train car, or the like, wherein a variable scattering layer capable of varying a light transmission state and scattering state or a variable absorption layer capable of varying a light transmission state and absorption state is sandwiched between a plurality of substrates, and an image, character, etc. are displayed by light transmission and scattering or absorption through the scattering layer or the absorption layer, and when ambient light incident on the window glass is strong, the scattering layer or the absorption layer is illuminated with the ambient light to directly display an image, while when the ambient light is weak, the scattering layer or the absorption layer is illuminated with a lighting device, whereby the color display device is positioned so that an angle of incidence at which display light from the color display device is incident on the window glass falls within a range where reflectivity of a P wave component of the display light is low, and a polarizer for blocking or absorbing an S wave component of the display light is mounted on the color display device.

Preferably, in the color display device, the polarizer is a variable polarizer that polarizes the display light emitted from the color display device and incident on the window glass in such a manner as to block or absorb the S wave component of the display light when the color display device is illuminated with the lighting device, but does not polarize the display light from the color display device when the color display device is not illuminated with the lighting device.

Also preferably, the polarizer has the characteristic that, of the display light from the color display device, light vibrating in each plane containing the normal passing through the center of a display surface of the color display device is blocked or absorbed.

The present invention also provides a color display device, positioned near a window glass in an automobile, vessel, train car, or the like, for allowing viewing of various images and display images of character information and the like in superimposed fashion on forward view information, comprising: a variable scattering layer sandwiched between a plurality of substrates and capable of varying a light transmission state and scattering state; a transmission-type liquid crystal display for displaying images, characters, and the like by light transmission and scattering through the scattering layer; a signal generator for supplying image and character signals to the transmission-type liquid crystal display; and a lighting device for illuminating the transmission-type liquid crystal display; and wherein the transmission-type liquid crystal display includes a mechanism by which the transmission-type liquid crystal display can take a position for directly displaying images by illumination with ambient light entering through the window glass from outside the automobile, vessel, train car, or the like, and a position for displaying virtual images by reflecting, at the window glass, display images formed by illuminating with the lighting device.

Preferably, in the color display device, the mechanism supports the transmission-type liquid crystal display on a supporter having a swinging mechanism, and the surface of the window glass is inclined with respect to a prescribed reference plane, wherein when the ambient light is strong, the transmission-type liquid crystal display is turned up at a desired angle with respect to the reference plane, and when the ambient light is weak, the transmission-type liquid crystal display is folded flat substantially parallel to the prescribed reference plane and the lighting device is turned on.

Also preferably, the transmission-type liquid crystal display comprises a macromolecular dispersion-type liquid crystal and a pair of transparent substrates with transparent electrodes formed thereon sandwiching the liquid crystal therebetween, and the lighting device is disposed facing one edge of the transparent substrate.

Further preferably, the lighting device has a polarizer which is positioned beneath the transmission-type liquid-crystal display when the transmission-type liquid crystal display is folded flat.

In this way, according to the present invention, when a color display device, regardless of its type or variety, is placed near a window glass or a show window, reflection of the display surface on the window glass or show window can be perfectly or substantially eliminated. Furthermore, with the transmission-type display device using a macromolecular dispersion-type liquid crystal, the invention offers distinct effectiveness in enhancing the transparency of transparent portions.

Furthermore, in the color display device of the present invention, image and character portions to be displayed are placed in a scattered state and other portions placed in a transparent state, and when the ambient light is strong, images are displayed directly with the ambient light, while when the ambient light is weak, displayed images are reflected at the window glass in an automobile, vessel, train car, or the like, using illuminating light from the lighting device, thereby forming virtual images for viewing. In this way, display images can be presented in superimposed fashion on the outside view, with simple construction and without requiring large installation space.

Since ambient light is used when the ambient light is strong, there is no need to provide a large-power light source, and therefore, the invention provides the excellent advantage of saving power consumption and reducing heat generation.

The present invention also provides a liquid crystal display comprising two transparent substrates with transparent electrodes formed thereon and a liquid crystal layer sandwiched between the transparent substrates, wherein a display pattern portion where a prescribed voltage is applied becomes transparent and a display pattern portion where no voltage is applied is in a scattered (opaque) state, the liquid crystal display being characterized by the inclusion of a display pattern portion and its wiring portion which are formed by the transparent electrode on at least either one of the transparent substrates, an insulating layer covering the transparent electrode at least in the wiring portion, and another transparent electrode formed on the insulating layer.

In the liquid crystal display of the invention, the line width of the wiring portion is made thicker as the display pattern portion increases in size.

Further, in the liquid crystal display of the invention, the line width of the wiring portion is made thicker as the wiring length to the display pattern portion increases.

The present invention also provides a head-up display comprising a liquid crystal display positioned near a window glass in an automobile, vessel, train car, or the like, wherein, in the liquid crystal display, image and character portions to be displayed are placed in a scattered state and other portions placed in a transparent state, and images and characters are displayed in superimposed fashion on a forward view by illuminating the liquid crystal display with a lighting device.

The invention also provides a combination instrument comprising a transparent liquid crystal display placed in overlaid fashion on an instrument in an automobile, vessel, train car, or the like, wherein normally the liquid crystal display is transparent, allowing viewing of display information of the instrument, and when necessary, images and other information are displayed on the transparent liquid crystal display for viewing in superimposed fashion.

The invention also provides a combination rearview mirror comprising a rearview mirror and a transparent liquid crystal display arranged in overlaid fashion.

As described above, according to the present invention, since the liquid crystal display has a three-layered structure consisting of a transparent electrode deposited at least in the wiring portion, an insulating layer, and another transparent electrode, the wiring portion of the display pattern can be made transparent when the display pattern is placed in a scattered state (voltage OFF state) to display an image or character, and furthermore, the transparency of the display screen is uniform. This provides good visibility and good transparent appearance when the display pattern is displayed in superimposed fashion on the background view.

Further, since the line width of the wiring portion is made thicker as the display pattern portion increases in area size and as the wiring length to the display pattern portion increases, substantially the same voltage is applied to the liquid crystal regardless of the area size or wiring length of the display pattern to be displayed. The liquid crystal display can thus provide a display screen of uniform transparency.

Moreover, by using the liquid crystal display of the invention, a head-up display of compact and simple construction can be realized. Further, if a navigation system is constructed using the liquid crystal display of the invention, the driver can obtain guiding information in a reliable manner without looking away from the road ahead, which greatly enhances safety in driving.

The combination instrument of the invention is compact and inexpensive in construction, while the combination rearview mirror of the invention can alert the driver as necessary during driving while retaining the function as a rearview mirror.

BRIEF DESCRIPTION OF THE DRAWINGS

FIG. 13 is a diagram showing examples of light guide module displays of the combination color display apparatus according to the 11th embodiment;

FIG. 16 is a diagram for explaining the operation of the operation panel according to the 13th embodiment;

FIG. 23(b) is a horizontal cross-sectional view of the display device, FIG. 23(c) is a vertical cross-sectional view of the display device, FIG. 23(d) is a diagram showing the arrangement of the polarization axis of a polarizer mounted on the display device, and FIG. 23(e) is a diagram showing the arrangement of vibration planes light vibrating in which is blocked by the polarizer of the display device;

DESCRIPTION OF THE PREFERRED EMBODIMENTS

The entire disclosure of U.S. patent application Ser. No. 08/760,711 filed Dec. 5, 1996 is expressly incorporated by reference herein.

The preferred embodiments of the present invention will be described below with reference to the accompanying drawings. In the embodiments hereinafter given, a glass plate with a refractive index of 1.52 is used as a representative example of a light guiding plate.

Embodiment 1

Figure 1A:
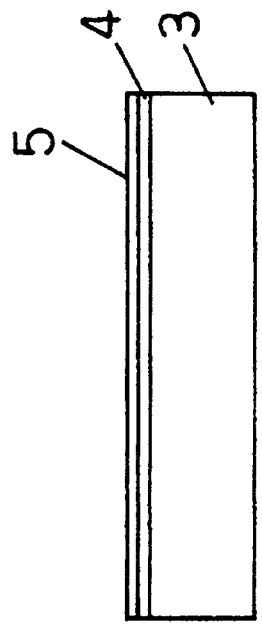
FIG. 1 is a schematic diagram showing a side view of a backlighting device according to a first embodiment of the present invention in contrast to an comparative example.
Figure 1B:

FIG. 1(a) is a diagram showing a prior art structure having no high-refractive-index layer on the surface of a light guiding plate, and FIG. 1(b) is a cross-sectional view of a backlighting device used in a first embodiment, with a high-refractive-index layer provided as shown. In FIG. 1, reference numeral 1 is a cold-cathode lamp of 3 mm diameter, 2 is a reflecting mirror, 3 is a light guiding plate of 4 mm thickness, 4 is the high-refractive-index layer, and 5 is a scattering layer. The reflecting plate usually attached on the reverse side was omitted in order to observe light from the front side only. Screen brightness was measured at a distance of 2 meters using Minolta's luminance meter LS-100.

First, the high-refractive-index layer 4 was formed by sputtering $TiO_2$ on the light guiding plate 3, and then white fluorescent ink usually used when printing dot patterns on the reflecting plate on the reverse side was applied to form the scattering layer 5. Measured results are shown in Table 1. Surface brightness of sample A was normalized as 1.0. As the results show, when the high-refractive-index layer 4 of $TiO_2$ was formed on the light guiding plate 3, the surface brightness was improved from 1.0 to 1.1 compared with the structure where no such high-refractive-index layer was formed.

TABLE 1

| SAMPLE | SURFACE LAYER | SCATTERER | SURFACE BRIGHTNESS |
|--------|---------------|-----------|---------------------|
| A | NONE | WHITE FLUORESCENT INK | 1.0 |
| B | $TiO_2$ | WHITE FLUORESCENT INK | 1.1 |

Embodiment 2

Figure 2A:
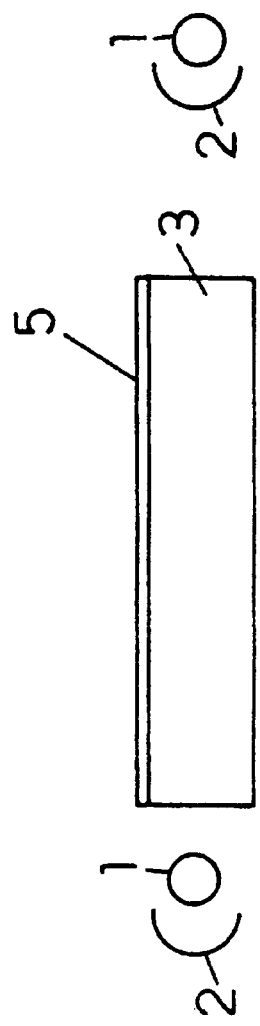
FIG. 2 is a schematic diagram showing a side view of a wedge-shaped backlighting device according to a second embodiment of the present invention.
Figure 2B:
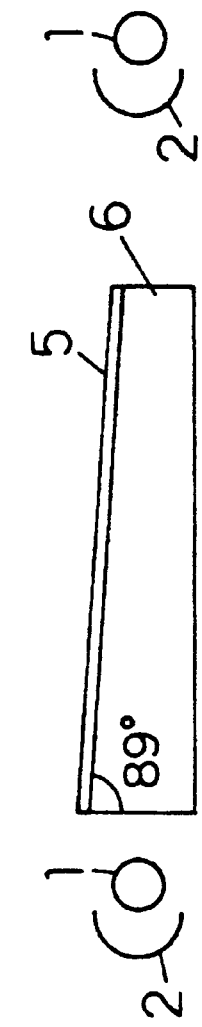

FIG. 2 shows a cross section of a backlighting device according to a second embodiment. Part (a) shows a structure where no high-refractive-index layer is formed on the surface of the light guiding plate, and part (b) shows a structure where a high-refractive-index layer is formed. The light guiding plate 6 is wedge-shaped with its light emergence surface slightly sloped with a sloping angle of 89°. The high-refractive-index layer 4 was formed by evaporating and thermally oxidizing $SnO_2$. As with the first embodiment, white fluorescent ink was used to form the scattering layer 5. Measured results are shown in Table 2.

As the results show, when the emergence surface of the light guiding plate 6 was slightly sloped, the surface brightness was improved from 1.0 to 1.3 compared with the structure where the emergence surface was not sloped; furthermore, when the high-refractive-index layer 4 of $SnO_2$ was formed on the light guiding plate 6, the surface brightness was further improved from 1.3 to 1.45 compared with the structure where no such high-refractive-index layer was formed.

TABLE 2

| SAMPLE | SURFACE LAYER | SCATTERER | SURFACE BRIGHTNESS |
|---|---|---|---|
| G | NONE | WHITE FLUORESCENT INK | 1.3 |
| D | $SnO_2$ | WHITE FLUORESCENT INK | 1.45 |

From the geometrical shape of the illuminated face, it is preferable that the sloping angle of the emergence surface of the light guiding plate 6 be set at 87 degrees or greater but not greater than 90 degrees.

Embodiment 3

Figure 3:
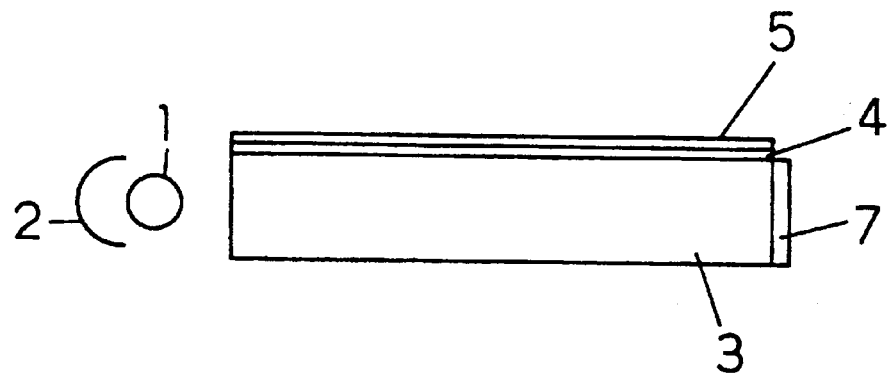
FIG. 3 is a schematic diagram showing a side view of a backlighting device with a reflective film according to a third embodiment of the present invention.

FIG. 3 shows a cross section of a backlighting device according to a third embodiment. Reference numeral 7 is a reflective film. The high-refractive-index layer 4 was formed from InOx/SnOy (ITO). The scattering layer 5 was formed by applying a solution consisting of a mixture of polymethylmethacrylate (PMMA) and polystyrene (PS). Here, when a polymer having a low refractive index (PMMA, cellulose acetate, polyvinyl acetate, etc.) and a polymer having a relatively high refractive index (PS, polycarbonate, polyethylene terephthalate, polyacrylonitrile-styrene copolymer, etc.) are selected and are formed into a film by phase-separating them in a controlled manner, light is scattered because of the difference between their refractive indices, giving a cloudy or pearl-like luster. This is known as the pearl effect.

Table 3 shows the results of the measurements of surface brightness when the high-refractive-index layer was formed on the surface of the light guiding plate and when no such layer was formed for comparison. As the results show, when the high-refractive-index layer 4 was formed on the light guiding plate 3, the surface brightness was improved from 1.25 to 1.4 compared with the structure where no such high-refractive-index layer was formed.

TABLE 3

| SAMPLE | SURFACE LAYER | SCATTERER | SURFACE BRIGHTNESS |
|---|---|---|---|
| E | NONE | PMMA/PS | 1.25 |
| F | ITO | PMMA/PS | 1.4 |

Embodiment 4

The same structure as that shown in the third embodiment was used, except that the scattering layer 5 was formed in the following manner. Methyl methacrylate as a low-refractive-index monomer and N-vinylcarbazole and vinyl benzoate as high-refractive-index monomers were mixed together, with diphenyl iodonium salt added as an initiator, and the mixture was applied onto the light guiding plate, on top of which a thin glass plate was placed through which UV radiation was applied. In this way, by mixing and polymerizing a low-refractive-index monomer and high-refractive-index monomer to form a polymer alloy in a phase-separated state, an efficient scatterer can be produced.

Table 4 shows the results of the measurements of surface brightness when the high-refractive-index layer was formed by using ITO on the surface of the light guiding plate and when no such layer was formed for comparison. As the results show, when the high-refractive-index layer 4 was formed on the light guiding plate 3, the surface brightness was improved from 1.4 to 1.55 compared with the structure where no such high-refractive-index layer was formed.

TABLE 4

| SAMPLE | SURFACE LAYER | SCATTERER | SURFACE BRIGHTNESS |
|---|---|---|---|
| G | NONE | POLYMER ALLOY | 1.4 |
| H | ITO | POLYMER ALLOY | 1.55 |

Embodiment 5

The same structure as that shown in the third embodiment was used, except that the scattering layer 5 was formed in the following manner.

Trimethylolpropanetriacrylate (TMP) was used as a low-refractive-index monomer, 4'-pentyl-4-cyanobiphenyl as a high-refractive-index compound, and benzylmethylketal as an initiator, and UV radiation was applied in the same manner as in the fourth embodiment, to obtain a scatterer. This scatterer has the structure in which the high-refractive-index compound is present in a phase separated state in the low-refractive-index polymer.

Table 5 shows the results of the measurements of surface brightness when the high-refractive-index layer was formed by using ITO on the surface of the light guiding plate and when no such layer was formed for comparison. As the results show, when the high-refractive-index layer 4 was formed on the light guiding plate 3, the surface brightness was improved from 1.7 to 1.9 compared with the structure where no such high-refractive-index layer was formed.

TABLE 5

| SAMPLE | SURFACE LAYER | SCATTERER | SURFACE BRIGHTNESS |
|---|---|---|---|
| I | NONE | TMP/PCB | 1.7 |
| J | ITO | TMP/PCB | 1.9 |

The scattering layers used in the foregoing third to fifth embodiments were each formed by mixing two or more kinds of transparent materials, each having a different refractive index and having no absorption bands in the visible region, in a phase separated state. In this type of layer, light is scattered at phase interfaces because of the difference in refractive index, and since the layer itself has no light absorbing characteristics, it serves as an efficient scatterer.

Embodiment 6

Figure 4:
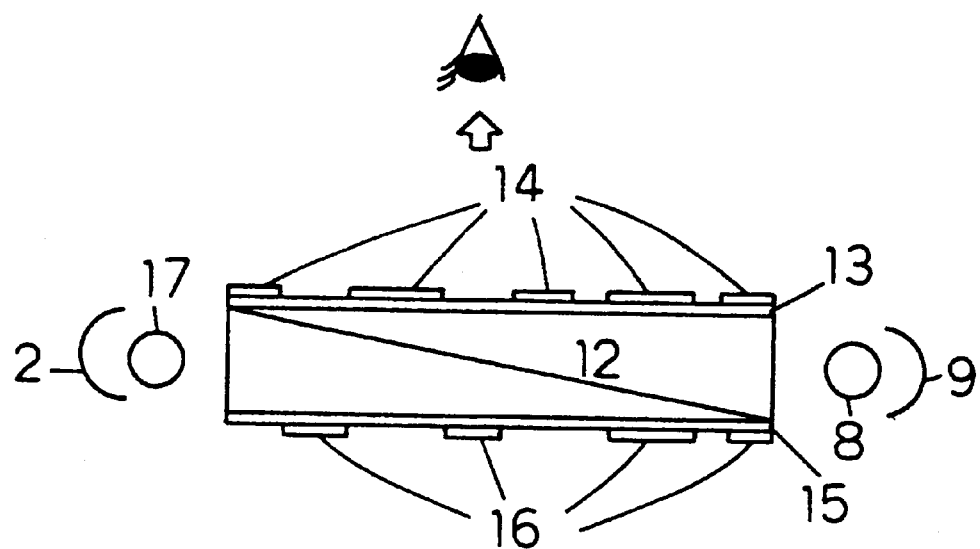
FIG. 4 is a schematic diagram showing a side view of a backlight display device comprising two wedge-shaped light guiding plates according to a sixth embodiment of the present invention.

In the structure of the fourth embodiment, if the scatterer is formed in a desired pattern, the scatterer itself can be used as a display medium. FIG. 4 shows one such example, wherein reference numerals 8 and 17 are light sources, 8 being red and 17 blue, for example. Wedge-shaped light guiding plates 10 and 11 are bonded together in the center with a transparent adhesive 12. Reference numerals 13 and 15 are high-refractive-index layers, and 14 and 16 are patterned scattering layers. When the light sources 8 and 17 are turned on, light entering the respective light guiding plates 10 and 11 is reflected at their interface where the refractive index is slightly different between the material of the light guiding plates 10, 11 and the adhesive layer 12; the reflected light enters the respective surface layers together with the direct light and is scattered in the respective scattering layers 14 and 16. By suitably selecting the incident direction of light, the wedge angle, and the material of the adhesive layer 12, the red and blue colors do not mix together and can be scattered only through the respective scatterers; when the display is viewed from one direction toward the display surface, the patterns are seen displayed in two colors, while portions where the patterns overlap appear purple, thus producing a three-color display.

Embodiment 7

Figure 17:
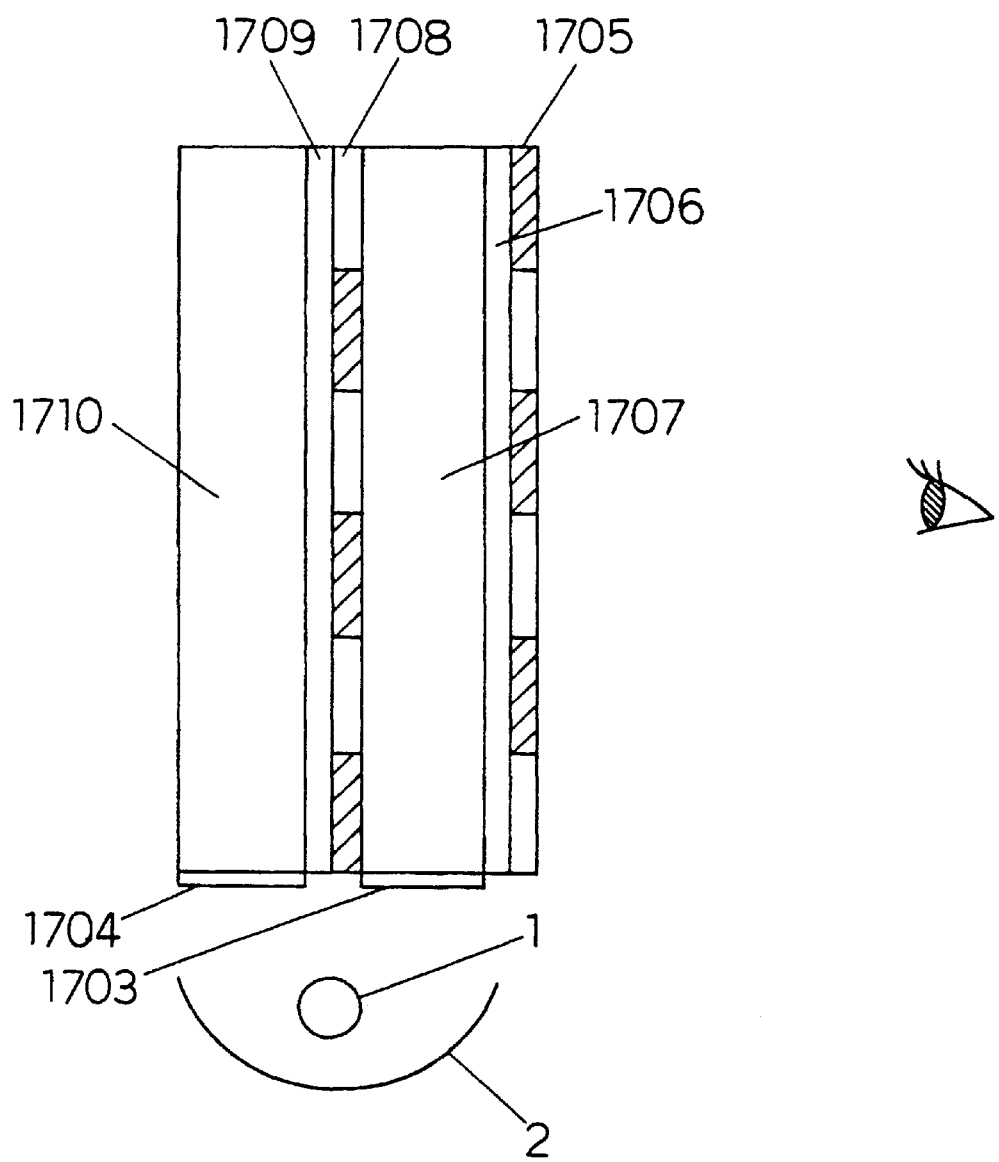
FIG. 17 is a diagram showing the structure of a (static) color display device for comparison.

FIG. 17 shows a structure in which a light guide module is constructed by forming a light scattering layer on a light guiding plate with a high-refractive-index layer sandwiched between them in accordance with the foregoing embodiments and by bonding two such light guide modules together, to achieve color display capability. In FIG. 17, reference numeral 1 is a light source, 2 is a reflecting plate, 1703 and 1704 are color filters, 1705 and 1708 are light scattering layers, and 1706 and 1709 are high-refractive-index layers formed to improve the introduction of light into the respective light scattering layers. Further, 1707 and 1710 are light guiding plates. However, since color mixing occurs, as will be described later, further improvements are made to the above structure in the present embodiment.

Figure 5:
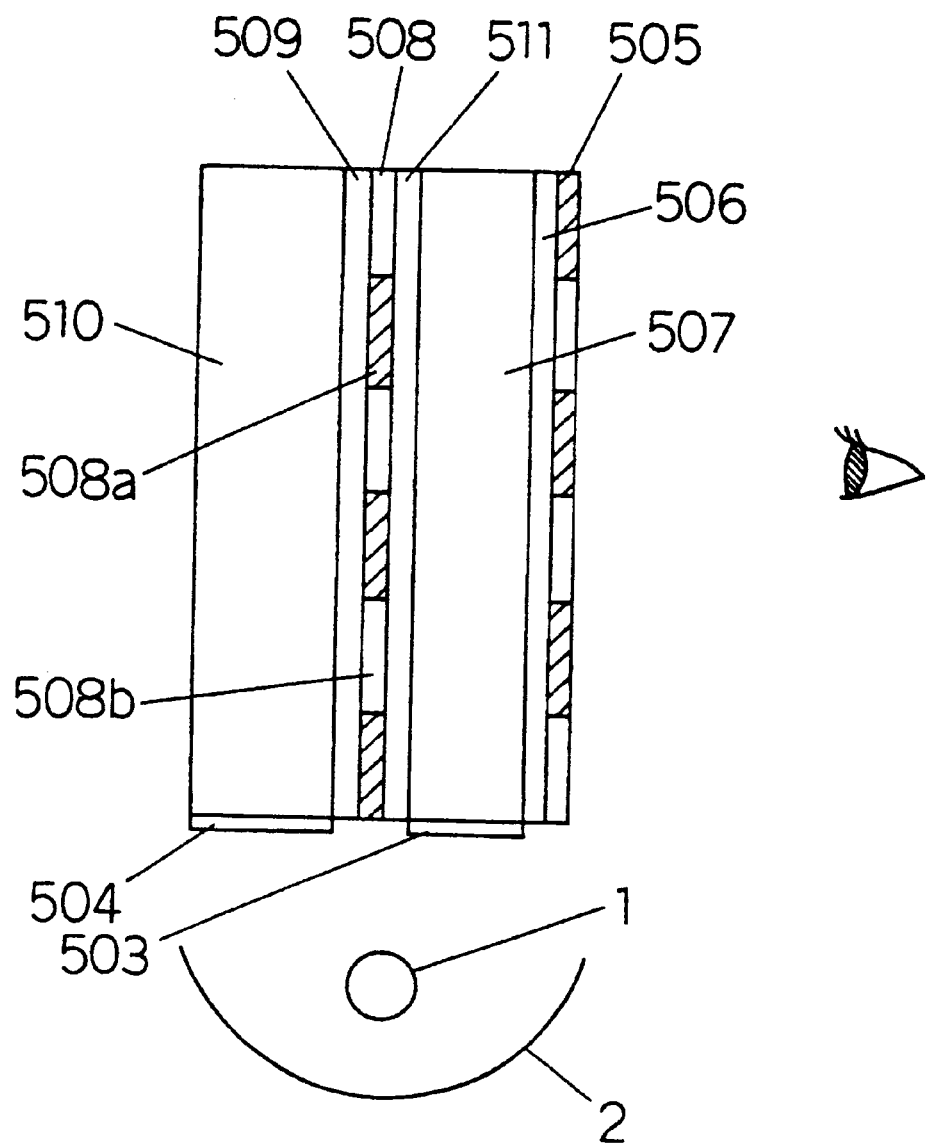
FIG. 5 is a diagram showing the structure of a (static) color display device according to a seventh embodiment of the present invention.

FIG. 5 shows a structure with two light guide modules bonded together in accordance with the present invention. In FIG. 5, reference numeral 511 shows a low-refractive-index layer. In this structure, since 510 is in contact with an air layer at its endmost surface, the low-refractive-index layer to be formed on its outside surface is omitted.

A fluorescent lamp, cold-cathode lamp, halogen lamp, LED, or the like is used as the light source 1. The light scattering layers 505 and 508 are each formed using an ordinary paint, fluorescent ink, or from a material such as a system consisting of two or more kinds of dispersing substances having different refractive indices. The high-refractive-index layers 506 and 509 are formed from $LaF_3$, $NdF_3$, $Al_2O_3$, $CeF_3$, $PbF_2$, $MgO$, $ThO_2$, $SnO_2$, $La_2O_3$, $In_2O_3$, $Nd_2O_3$, $Sb_2O_3$, $ZrO_2$, $CeO_2$, $TiO_2$, or $ZnS$, or from a complex of substances selected from these substances; that is, any material may be used as long as the refractive index is higher by 0.05 to 1.50 than the refractive index of the light guiding plate itself. The low-refractive-index layer can be formed from any material, such as $CaF_2$, $NaF$, $KiF$, $MgF_2$, etc., that has a refractive index lower than that of the light guiding plate itself. The light guiding plate is usually constructed from a glass plate or a transparent plastic plate, such as a plate made of an acrylic resin, that has a refractive index of around 1.5.

Light from the light source 1 entering the light guiding plates 507 and 510 through the color filters 503 and 504, propagates through the light guiding plates and is scattered in the respective light scattering layers 505 and 508. Since the light scattering layers 505 and 508 are formed in prescribed patterns, scattered light images colored through the respective color filters are obtained. On the other hand, in the case of the structure shown in FIG. 17, the light introduced through the color filter 503 is scattered not only in the light scattering layer 505 but also in the light scattering layer 508. The light scattering layer 508 thus scatters both lights passed through the color filters 503 and 504, resulting in color mixing.

By contrast, in the case of the present embodiment shown in FIG. 5, the light introduced through the color filter 503 is passed through the high-refractive-index layer 506 and enters the light scattering layer 505 where the light is scattered to form an image. Because of the presence of the low-refractive-index layer 511 between the light scattering layer 508 and the light guiding plate 507, the light entering the light guiding plate 507 undergoes total reflection at the interface with the low-refractive-index layer and does not emerge into the light scattering layer 508. Here, the light passed through the transparent portions of the light scattering layer 505 is totally reflected back at the boundary to the outside since the outside is an air layer of low refractive index, and therefore, the light does not emerge directly into the outside. Accordingly, the light introduced into the light guiding plate 507 through the color filter 503 is used only for scattering in the light scattering layer 505.

On the other hand, the light entering the light guiding plate 510 through the color filter 504 is passed through the high-refractive-index layer 509 and enters the light scattering layer 508 to form an image by the preformed pattern. The light scattered in scattering portions 508a of the light scattering layer 508 is not reflected by the low-refractive-index layer 511 but is passed through the light guiding plate 507, the high-refractive-index layer 506, and the light scattering layer 505, and emerges outside. At this time, if there is light leakage through transparent portions 508b of the patterned light scattering layer 508, such light is reflected back by the low-refractive-index layer 511 and does not emerge into the light guiding plate 507.

In this way, in the color display device of the present embodiment, light emitted from the light source 1 is color-separated by the differently colored color filters 503 and 504, and the colored lights enter the respective light guiding plates 507 and 510 and are scattered only in the respective light scattering layers 505 and 508 without interfering with each other, to form respective color images. Each of these scattered light images, when seen from the viewer, is viewed as a so-called self-light-emitting image; therefore, those portions of the images which are independent of each other are displayed in the colors corresponding to the respective color filters 503 and 504, and portions where the images overlap are displayed in a color produced by mixing the two colors. When three such light guide modules are used in conjunction with R, G, and B color filters, an image of any desired color can be obtained by suitably overlapping the scattered light images of the respective colors. The light guiding plate 510 located at the farthest end from the display side may also be provided with a low-refractive-index layer 511 on the side thereof opposite from the display side.

Embodiment 8

Figure 18:
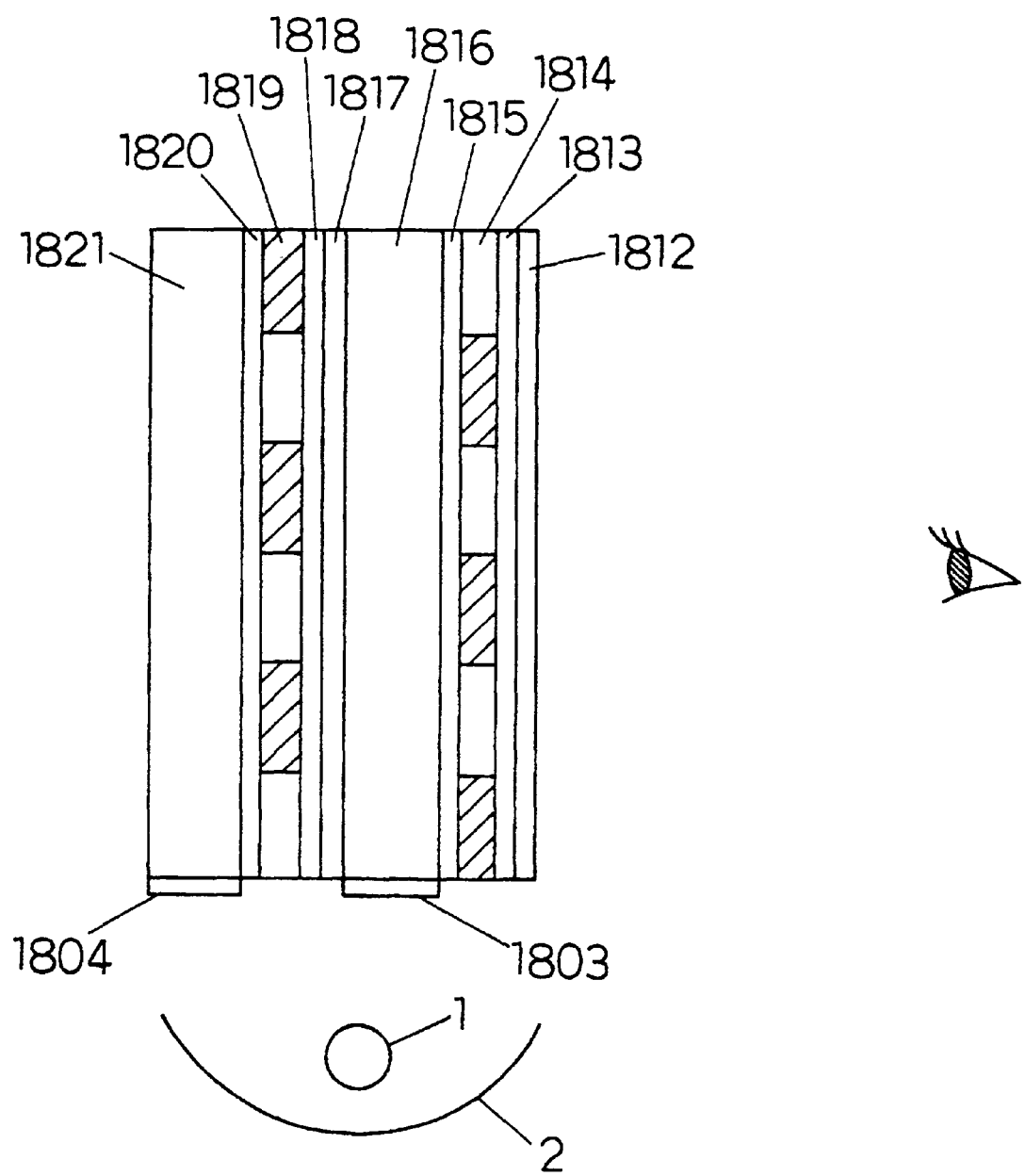
FIG. 18 is a diagram showing the structure of a (dynamic) color display device for comparison.

Next, an embodiment will be described in which the color display device of the invention is adapted to a dynamic display. FIG. 18 is a diagram showing two liquid crystal panels bonded together, each panel being identical in construction to the prior art macromolecular dispersion-type liquid crystal panel except that the reflecting plate or absorbing plate on the rear side is removed. In the figure, reference numerals 1812 and 1817 are transparent substrates of glass or the like, and 1813, 1815, 1818, and 1820 are transparent electrodes made, for example, of ITO, which also serve as high-refractive-index layers because their refractive index is higher than that of the substrates. Further, 1814 and 1819 are macromolecular dispersion-type liquid crystal layers, and 1816 and 1821 are transparent substrates of glass or the like, which also serve as light guiding plates. The liquid crystals are electrically driven (drive circuitry is not shown here).

When a voltage is applied between the transparent electrodes, for example, the macromolecular dispersion-type liquid crystals become transparent, and when the voltage is off, they scatter light. Images and symbols can thus be displayed.

Figure 6:
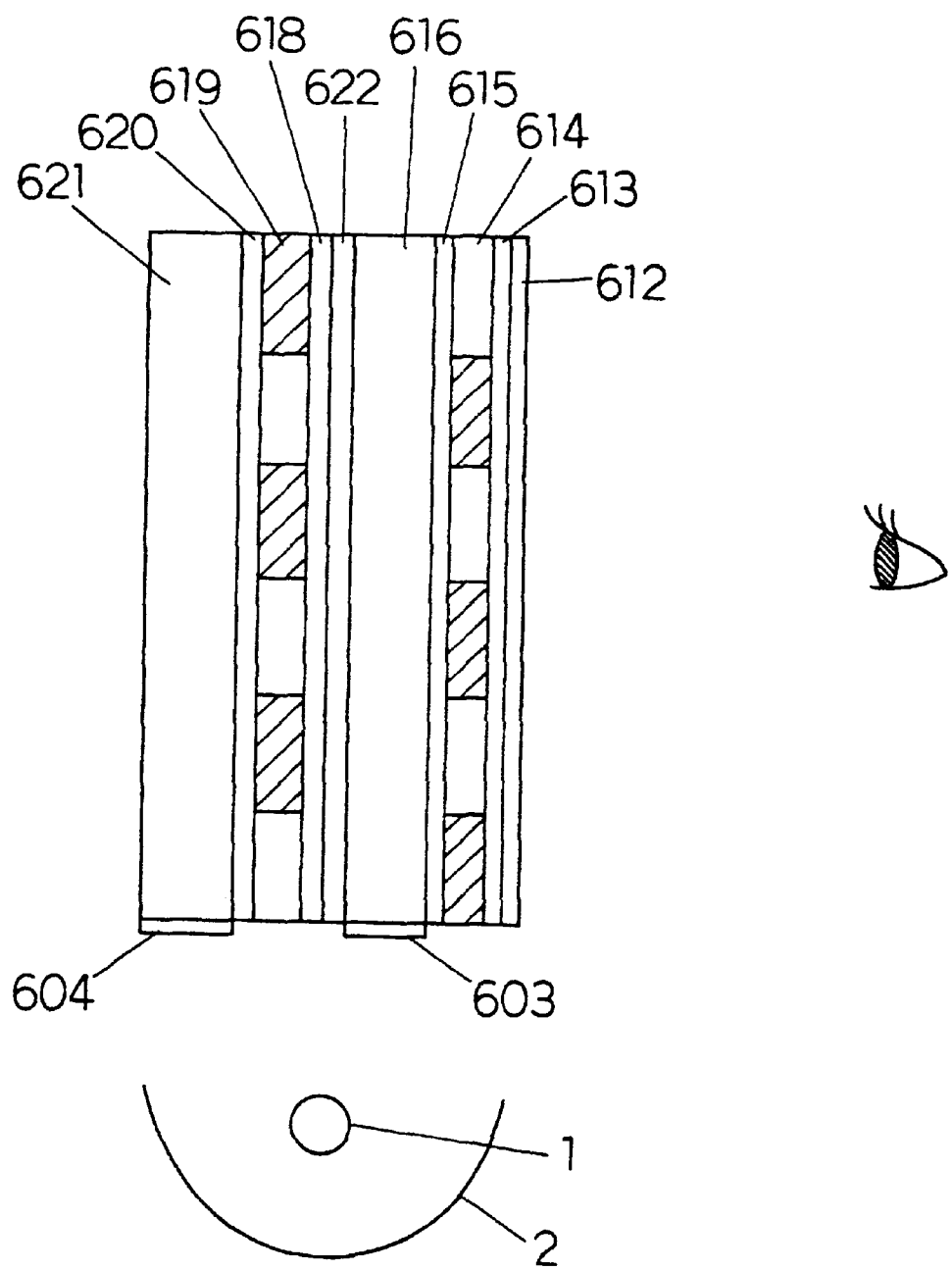
FIG. 6 is a diagram showing the structure of a (dynamic) color display device according to an eighth embodiment of the present invention.

FIG. 6 shows a dynamic color display device according to the present invention. In the figure, reference numeral 622 is a low-refractive-index layer according to the present invention. In the present invention, the glass substrate 1817 is not needed.

In FIG. 18, light from the light source 1 is color-separated by the color filters 1803 and 1804, and the colored lights enter the respective light guiding plates 1816 and 1821 and are propagated through them. The propagated lights are passed through the ITO layers 1815 and 1820 and enter the liquid crystal layers 1814 and 1819 where scattered portions are displayed as colored images. However, the light entering the light guiding plate 1816 is passed through 1817 and 1818 and scattered also in the liquid crystal layer 1819. Accordingly, scattering portions in the liquid crystal layer 1819 scatter the two lights colored through the respective color filters 1803 and 1804, thus causing color mixing.

By contrast, in the display device of the present invention shown in FIG. 6, light introduced through a color filter 603 is passed through an ITO layer 615 of high refractive index and enters a liquid crystal scattering layer 614 where the light is scattered in a pattern corresponding to an electrical signal, thus forming an image. Because of the presence of the low-refractive-index layer 622 between a liquid crystal scattering layer 619 and a light guiding plate 616, the light entering the light guiding plate 616 undergoes total reflection at the interface with the low-refractive-index layer and does not emerge into the liquid crystal scattering layer 619. Accordingly, the light introduced into the light guiding plate 616 through the color filter 603 is scattered only in the liquid crystal scattering layer 614.

On the other hand, light entering a light guiding plate 621 through a color filter 604 is passed through an ITO layer 620 of high refractive index and enters the liquid crystal scattering layer 619 to form an image of the pattern corresponding to the applied electrical signal. At this time, if there is light leakage through transparent portions of the patterned liquid crystal scattering layer 619, such light is reflected back by the low-refractive-index layer 622 and does not emerge into the light guiding plate 616.

In this way, in the color display device of the present embodiment, light emitted from the light source 1 is color-separated by the differently colored color filters 603 and 604, and the colored lights enter the respective light guiding plates and are scattered only in the respective liquid crystal scattering layers without interfering with each other, to form respective color images. Each of these scattered light images, when seen from the viewer, is viewed as a so-called self-light-emitting image; therefore, those portions of the images which are independent of each other are displayed in the colors corresponding to the respective color filters 603 and 604, and portions where the images overlap are displayed in a color produced by mixing the two colors. When three such light guide modules are used in conjunction with R, G, and B color filters, an image of any desired color can be obtained by suitably overlapping the scattered light images of the respective colors.

Embodiment 9

Figure 7:
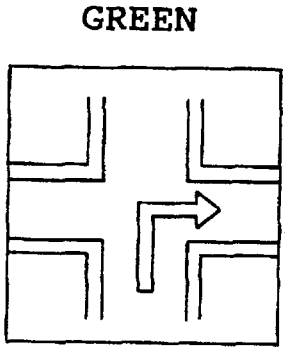
FIG. 7 is a diagram showing the structure of a (static) color display device according to a ninth embodiment of the present invention.
Figure 7:
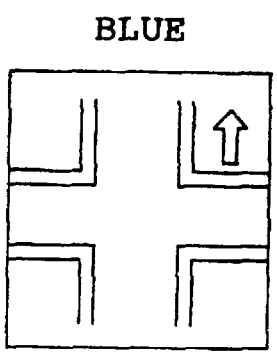
Figure 7:
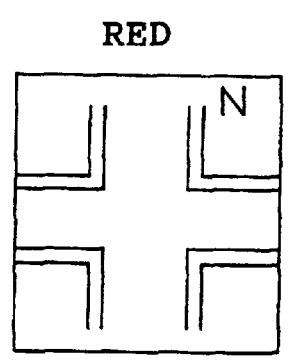
Figure 7:
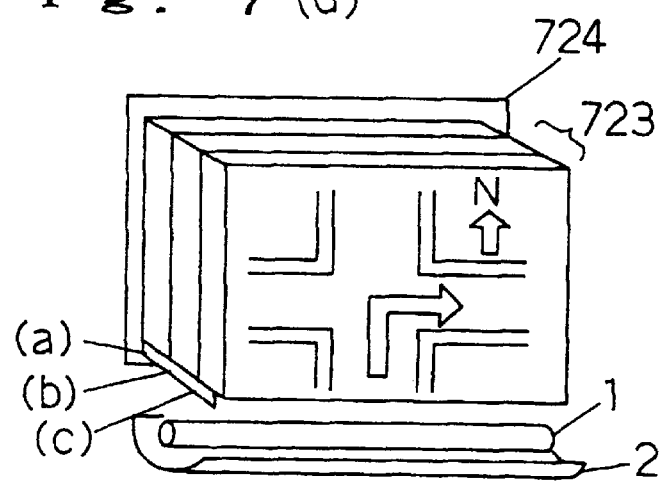

Next, an embodiment will be described in which the color display device of the invention is adapted for use as a signpost. Three light guide modules are prepared, each constructed with an acrylic plate that has a scattering pattern written with white ink as shown in FIG. 7. Module (a) has a green color filter, module (b) a blue color filter, and module (c) a red color filter. These modules are integrated into one unit. The result is the color display device (d) embodying the present invention. In FIG. 7(*d*), reference numeral 723 is the color display device constructed from the light guide modules, and 724 is a background plate which, in this case, is colored black. The light source 1 is a white-light fluorescent lamp. When the fluorescent lamp is turned on, the road pattern written in white on the signpost appears floating in space against the black background, with directional arrow displayed in green, direction pointing arrow in blue, and N direction in red.

Figure 8A:
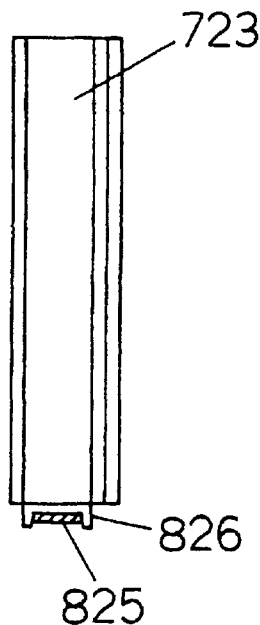
FIG. 8 is a diagram illustrating a color filter moving method according to the ninth embodiment.
Figure 8B:
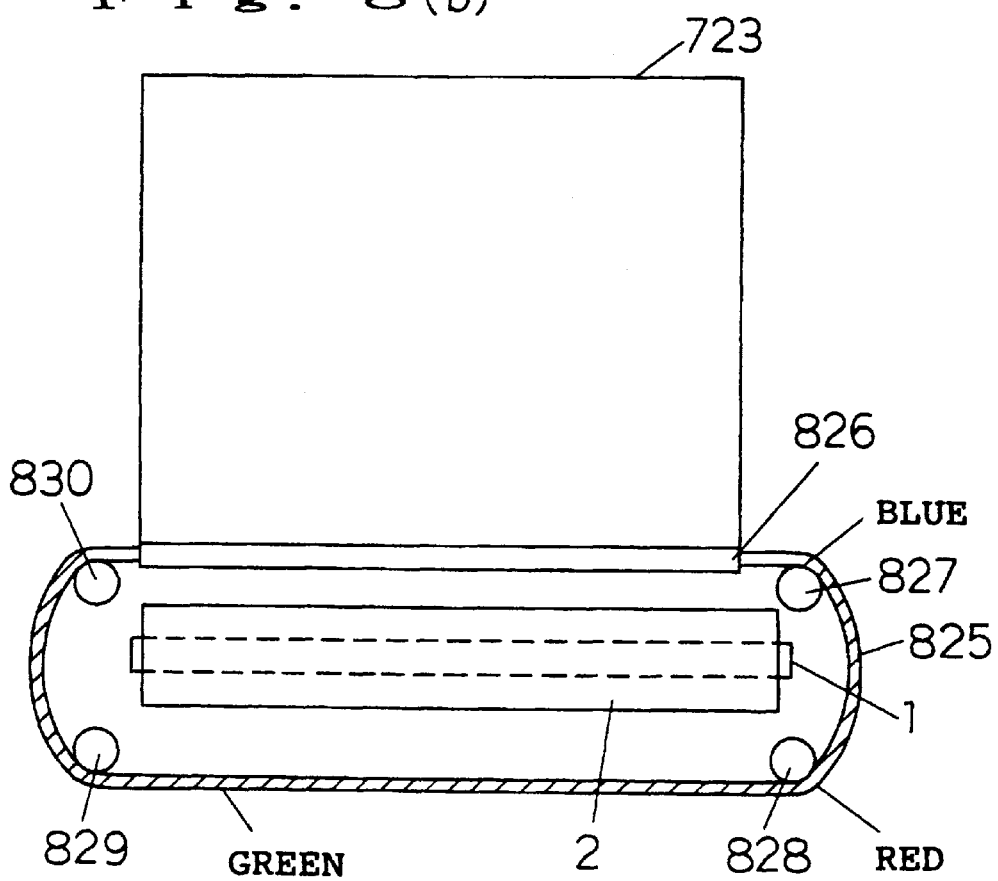

Each color filter can be constructed to be detachable and movable. This can be accomplished by constructing each filter 825 with a guide 826 that holds it in place, as shown in FIG. 8(*a*). Desired color filters can thus be selected and replaced so that the same image pattern can be displayed in various combinations of colors. Further, if an RGB three-color filter tape 825' is used that is movable by rollers 827 to 830, as shown in FIG. 8(*b*), filter color selection is made easier. By adopting this filter tape system for each light guide module 723, a colored image can be displayed easily with a very wide range of color combinations. The method of moving the color filter tape is not limited to the illustrated one; rather, it is apparent that various types of moving means can be used.

Embodiment 10

Figure 9:
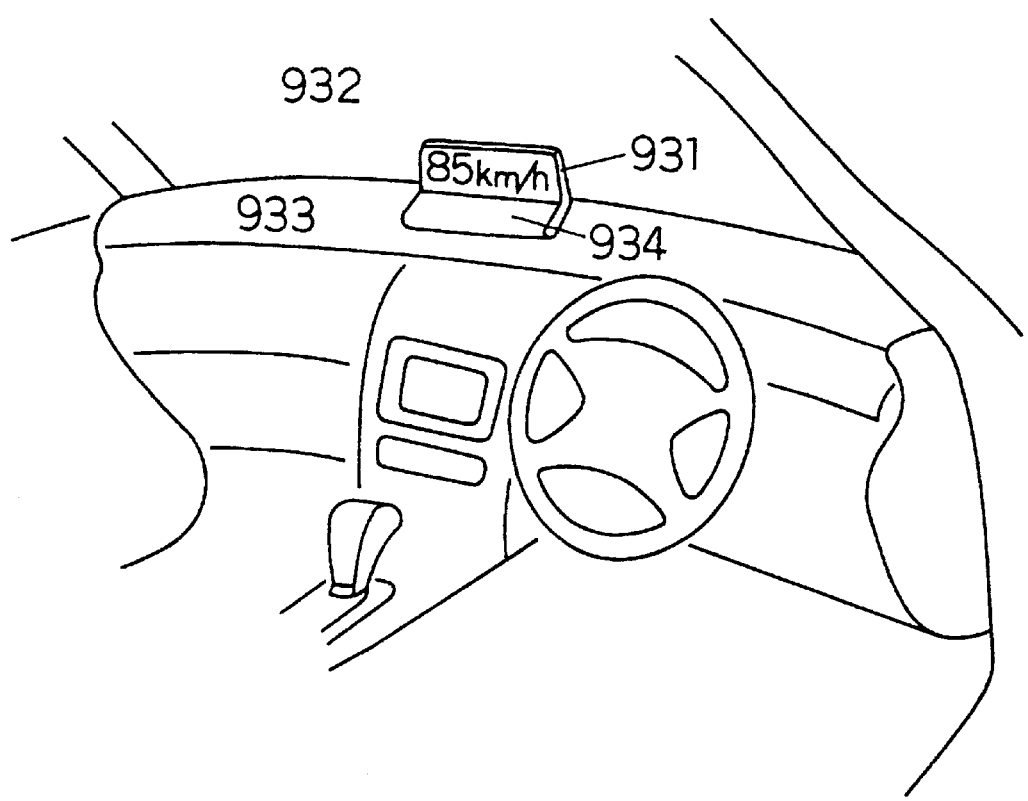
FIG. 9 is a diagram showing the structure of a vehicular onboard display apparatus according to a 10th embodiment of the present invention.

Next, an embodiment will be described in which the color display device of the invention is adapted for use in a vehicular onboard display apparatus. FIG. 9 shows an example in which the color display device of the invention is installed on a automobile dashboard 933. The display device itself is the same as that described in the eighth embodiment, and uses three color filters of R, G, and B. In the figure, reference numeral 931 is the color display device of the invention, and 934 indicates a place where liquid crystal driving circuitry is accommodated. This display device is connected to a navigation system via a harness (not shown), and is driven by signals from the navigation system. Since this color display device uses macromolecular dispersion-type liquid crystal, an image is displayed in the form of a scattered light image on a transparent screen. Since portions other than the displayed image portions are transparent, this allows viewing of the displayed image superimposed on the outside view seen through the windshield 932, so that the driver need not look away from the road ahead when viewing the image.

Figure 10:
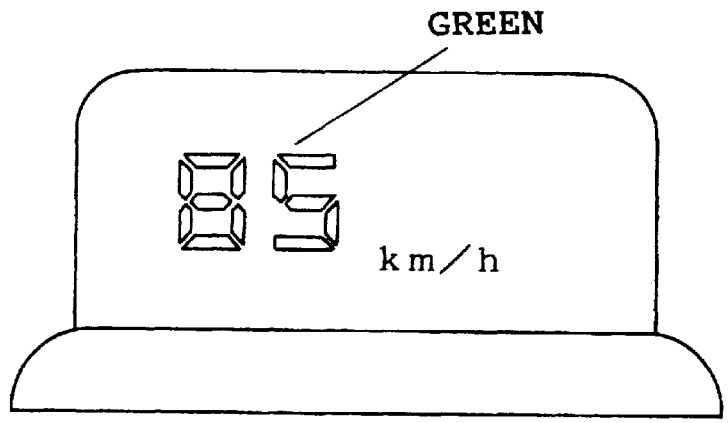
FIG. 10 is a diagram showing examples of light guide module displays of the vehicular onboard display apparatus according to the 10th embodiment.
Figure 10:
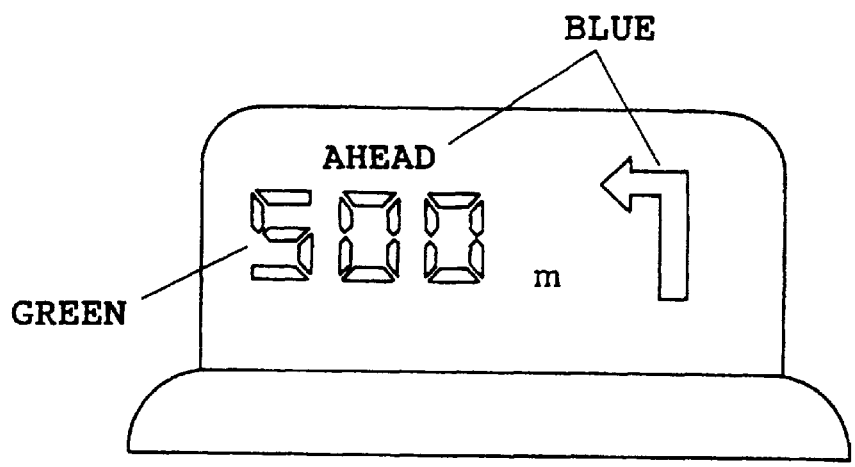
Figure 10:
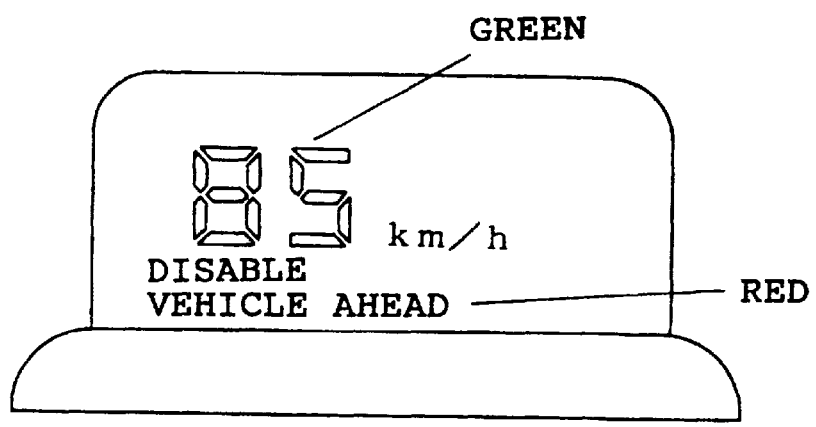

FIG. 10 shows display examples. Part (a) is a display of automobile speed which is displayed, for example, in green. In this light guide module, three-digit numbers are produced by transparent electrodes patterned in the form of segments, and "km/h" is displayed from different patterns "k/h" and "m". Part (b) shows an intersection guide mode, in which distance is displayed in green using the same patterns that are used in (a). In this second light guide module, "AHEAD"

and an arrow are formed as patterns. Therefore, "AHEAD" and the arrow are displayed, for example, in blue. Part (c) shows a display when an warning indication is produced using, in this case, the third light guide module. A warning "DISABLED VEHICLE AHEAD" is displayed, for example, in red alongside the green speed display.

These displays can be accomplished either by segment display or by dot display. The vehicular onboard color display apparatus of the invention is compact, thin, and transparent, and can be installed in a convenient position in an automobile. The display device can be attached to the windshield or built into the windshield glass.

The vehicular onboard color display apparatus of the present invention is not limited to the example shown in this embodiment, but the vehicular onboard color display apparatus can be constructed in any suitable configuration as long as it comprises the color display device of the present invention, drive circuitry, and a signal generator such as a navigation system, and is capable of allowing viewing of displayed images superimposed on the outside view.

Embodiment 11

Figure 11:
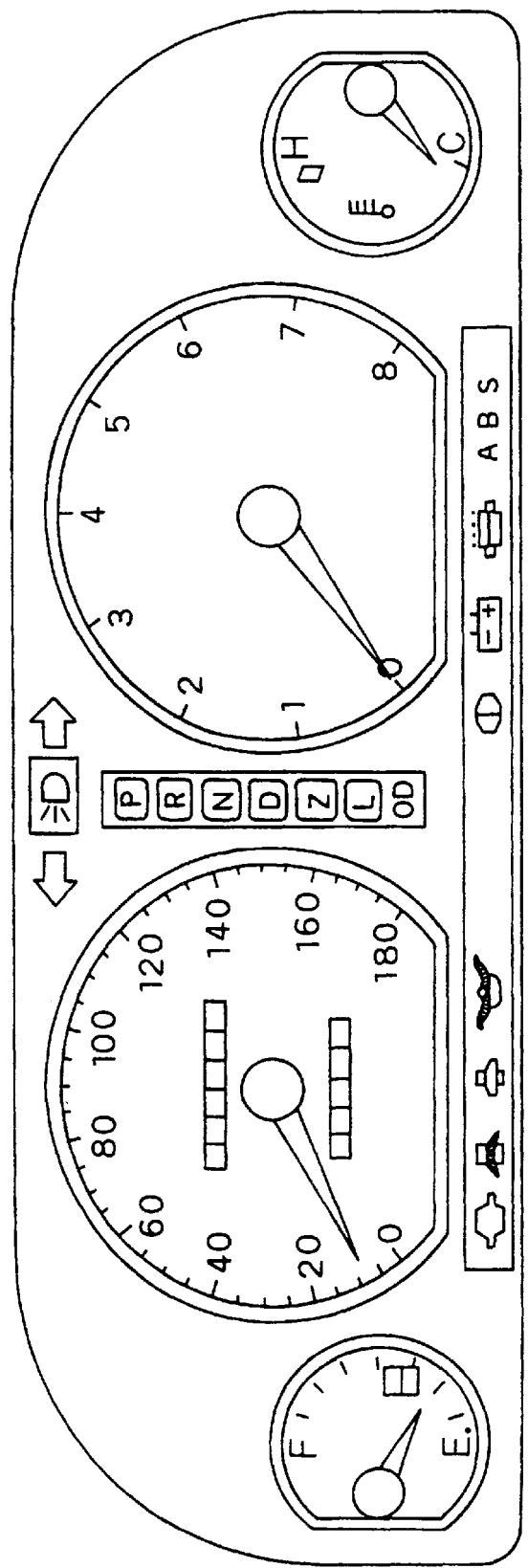
FIG. 11 is a diagram showing a display example of an instrument panel according to an 11th embodiment of the present invention.

Next, an embodiment will be described in which the present invention is combined with an automotive instrument panel. FIG. 11 shows an example of a conventional analog display instrument panel. Various kinds of meters and indicators are arranged, of which those that the driver are constantly looking at are the speedometer and tachometer. The other meters and indicators need only be displayed when necessary. Further, if some kind of information in the event of an emergency or information, for example, on traffic congestion can be displayed superimposed on the instrument panel only when necessary, this will be preferable since this can alleviate the burden imposed on the driver when looking at the displays. Therefore, of the instrument panel displays shown in FIG. 11, the speedometer, tachometer, directional arrows for turn signal indications, and A/T shift position indicator are left as the basic displays, and all other displays and indicators are omitted.

Figure 12:
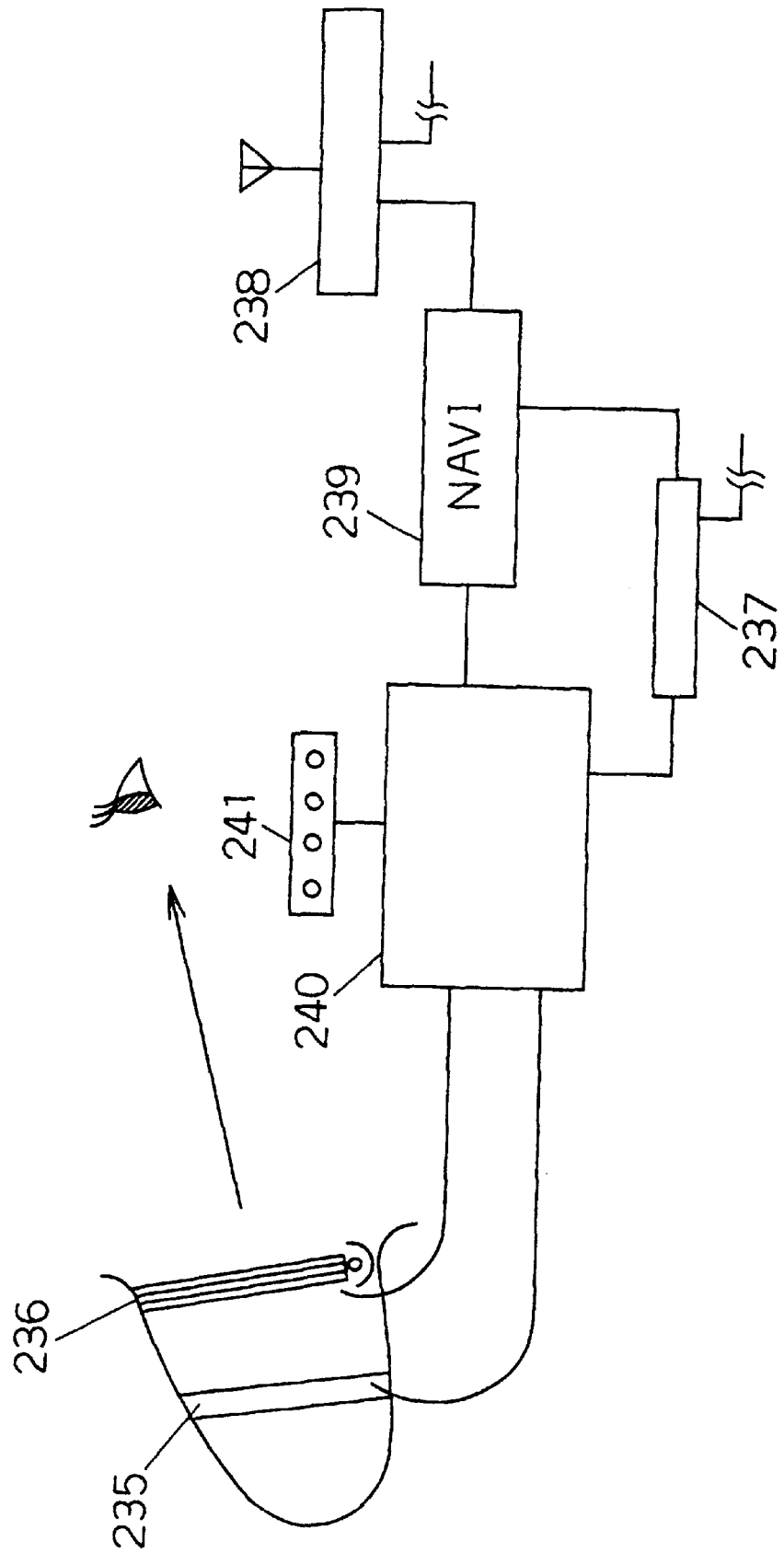
FIG. 12 is a diagram showing the configuration of a combination color display apparatus according to the 11th embodiment.

The present embodiment uses the same kind of color display device as that used in the invention shown in the 10th embodiment, and mounts it in overlaying fashion on the instrument panel, as shown in FIG. 12. The light guide modules used are shown in FIG. 13: for example, as shown in FIG. 13(a), a fuel gauge and a water temperature gauge are patterned in the green panel; a fuel indicating needle and a water temperature indicating needle are patterned in the blue panel, as shown in part (b); and a fuel empty indicator E, an overheat indicator H, and various warning indicators can be displayed in red, as shown in part (c), along with an information display (dot or character display) in the center. This combination color display apparatus constituting the combination instrument panel is constructed by overlaying the color display device 236 of the present invention on the conventional instrument panel 235, and information from various sensors 237, external information 238 or internal information, and navigational information 239 are supplied directly or through a suitable controller 240, as shown in FIG. 12. Usually, these operations are controlled automatically, but can also be controlled manually via an operation panel 241.

During driving, when the display is not necessary, the entire display area is in a transparent mode, and only the speedometer, tachometer, etc. are visible. When the engine is started, water temperature is displayed with the blue needle on the green water temperature display panel, and when the temperature reaches a predetermined value, the display is blacked out. Similarly, the fuel gauge is displayed on the green display panel with its blue needle indicating the amount of remaining fuel, and the display is blacked out after a predetermined time. If the driver wants to check the indication, he can operate the operation panel 241 (for example, switch ON) to turn on the display. In the event of an engine overheat, the water temperature gauge is again displayed, with the red overheat indicator H superimposed on it; similarly, when the fuel becomes low, the fuel gauge is displayed along with the red indicator E. The various other warning indicators are illuminated in red when necessary. Some kind of information, such as traffic information or emergency information, is displayed in red on the large display area in the center, in superimposed fashion on the underlying instrument panel displays. In this way, the present invention can provide an excellent on-demand type combination color display apparatus that is capable of displaying necessary information only when necessary in superimposed fashion on the instrument panel information.

Embodiment 12

Figure 14:
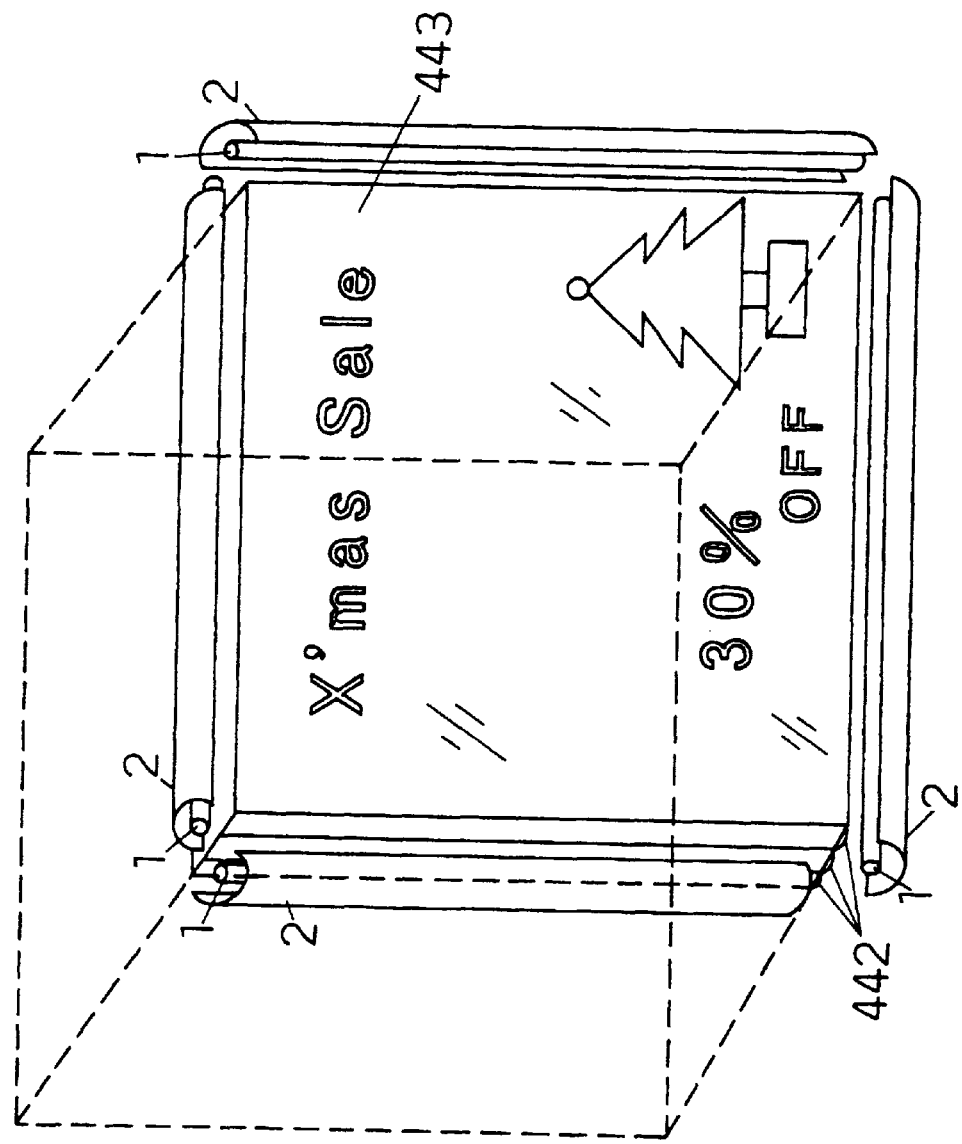
FIG. 14 is a diagram showing the construction of a color display device adapted to a decorative transparent medium according to a 12th embodiment of the present invention.

Next, an embodiment will be described in which the present invention is applied for use in a decorative transparent display medium. An example is shown below in which the color display device of the present invention is adapted for use in a store's show window or the like, for example, as shown in FIG. 14. In the figure, reference numeral 1 is a light source, 2 is a reflecting plate, 442 is a color filter attached to each light guide module, and 443 is a panel constructed by combining three light guide modules made of glass.

The color display device used here is of the same type as that used in the 10th embodiment, except that the size and display contents are different. When the size is substantially large, it is preferable that the light source, reflecting plate, and color filters be arranged on each side of the light guide module panel. Further, in applications where the display is not produced over the entire panel surface, transparent electrodes and macromolecular dispersion-type liquid crystals may be arranged only in necessary areas, leaving other areas as glass only.

As in the 10th embodiment, the color display device of the present embodiment is constructed together with drive circuitry for driving the display device and a signal generator for supplying drive signals (not shown). When patterns, dots, etc. corresponding to R, G, and B colors are formed using transparent electrodes on the light guide modules to which the color filters of R, G, and B are respectively attached, various images and characters are displayed, floating on the seemingly transparent glass, when the display device is driven. Since merchandise displayed inside the show window can be seen through the transparent portions, an excellent display effect can be obtained. The effect can be further enhanced by using in combination the movable filters described in the ninth embodiment in accordance with the display contents.

The application of the present embodiment is not limited to the store show window described above; rather, the present embodiment can be used in a wide variety of decorative transparent display applications, such as a stage setting, advertisement media on train windows, etc.

Embodiment 13

Figure 15:
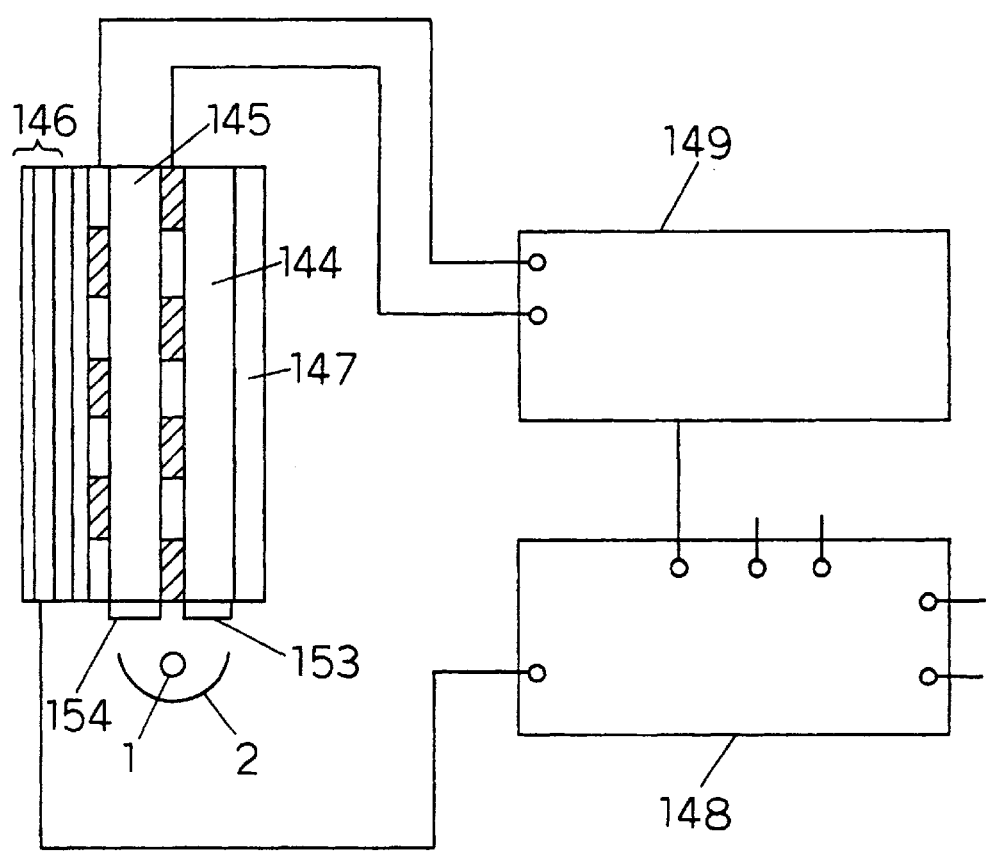
FIG. 15 is a diagram showing the structure of an operation panel according to a 13th embodiment of the present invention.

Next, an embodiment will be described in which the color display device is adapted to an operation panel. FIG. 15 is a diagram showing a cross-sectional structure of the operation panel according to this embodiment. In the figure, reference numeral 1 is a light source, 2 is a reflecting plate, 153 and 154 are color filters, and 144 and 145 are light guide modules of the same kind as those used in the 10th embodiment. Further, 146 is a transparent touch panel which is constructed, for example, from a pair of films, each having a transparent conductive layer, bonded together facing each other with a prescribed spacing provided between them; 147 is a background plate which is installed when necessary and which is, for example, a colored light-absorbing plate; and 148 is a control circuit which outputs signals to a drive circuit 149 for driving the color display device, to an operation system, and to other operation panels in response to the operation made on the touch panel 146. The touch panel 146 is connected to the drive circuit 149 via the control circuit 148. As the touch panel 146 is pressed, the prescribed display contents change sequentially.

Next, an operational example of a construction using a plurality of such operation panels will be described with reference to FIG. 16. FIG. 16 is a diagram showing a cluster of operation panels as viewed from the front. An operation panel 350 is, for example, a mode setting operation panel. As the panel is pressed, the display changes sequentially, for example, from A to B to C, and so on (these may be numeric or alphabetic), each being produced in the form of a scattered light image colored through a color filter and displayed superimposed on the background plate. An operation panel 351 is set in the mode specified by a signal from the operation panel 350, and displays, for example, temperature setting. When the operation panel 351 is pressed, up and down arrows are displayed on operation panels 352 and 353. When the operation panel 352 is pressed, the display on the operation panel 351 changes to a temperature indicator, and the temperature set value changes upward as this panel is pressed (in the figure, both the temperature indicator and the letters "TEMPERATURE SETTING" are shown, but actually the letters "TEMPERATURE SETTING" go off when the temperature indicator comes on). The operation panel 353 is used to lower the temperature setting.

When the operation panel 350 is pressed again, the mode changes, for example, to time setting mode, and "TIMING SETTING" is displayed on the operation panel 351. When the operation panel 351 is pressed, the operation panel 352 displays "HOURS" and the operation panel 353 displays "MINUTES". When the operation panel 352 is pressed, the operation panel 351 displays "HOURS MINUTES", and the HOURS setting changes as this panel is pressed (at this time, the display "TIME SETTING" goes out). Likewise, when the operation panel 353 is pressed, the MINUTES setting changes.

Needless to say, various methods may be employed to implement these display modes by those who carry out the present invention, and it will be easily recognized that various improvements are also possible.

As described above, the operation panel of the present embodiment can present a display simultaneously with a switch operation, while permitting the display to be changed with a certain degree of freedom. This achieves the operation panel that is easy to understand and easy to operate with a reduced number of switches. In the present embodiment, two light guide modules are shown in FIG. 15, but it will be appreciated that a suitable number of modules can be used according to the purpose.

Embodiment 14

Figure 19:
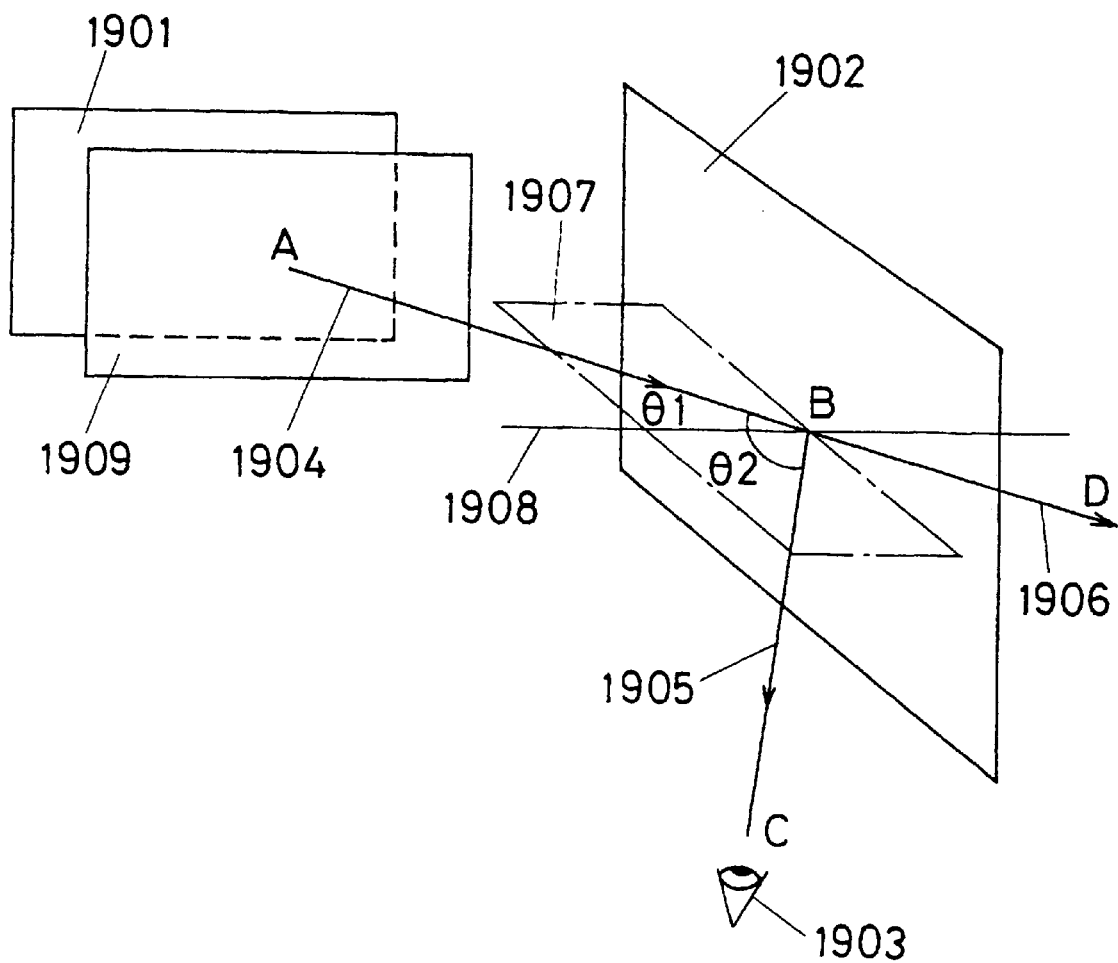
FIG. 19 is a perspective view showing the positional relationship between a display device, window glass, and viewer according to a 14th embodiment of the present invention.

FIG. 19 shows how a self-luminous display device, such as a CRT, positioned near a window glass is reflected onto the window glass. In FIG. 19, reference numeral 1901 is a display surface of the display device, 1902 is the window glass, and 1903 is a viewer looking out the window. Display light 1904 emitted from point A on the display surface 1901 is reflected at point B on the window glass 1902. When its reflected light 1905 reaches the viewer 1903, the viewer 1903 views a reflection of the display surface 1901 on the window glass 1902. Here, 1907 indicates the incidence plane of the display light 1904 emitted from point A. Non-reflected components of the display light 1904 are radiated outside the window. Since the display light of the display device is natural light, it contains P wave component and S wave component in approximately equal proportions.

Figure 20:
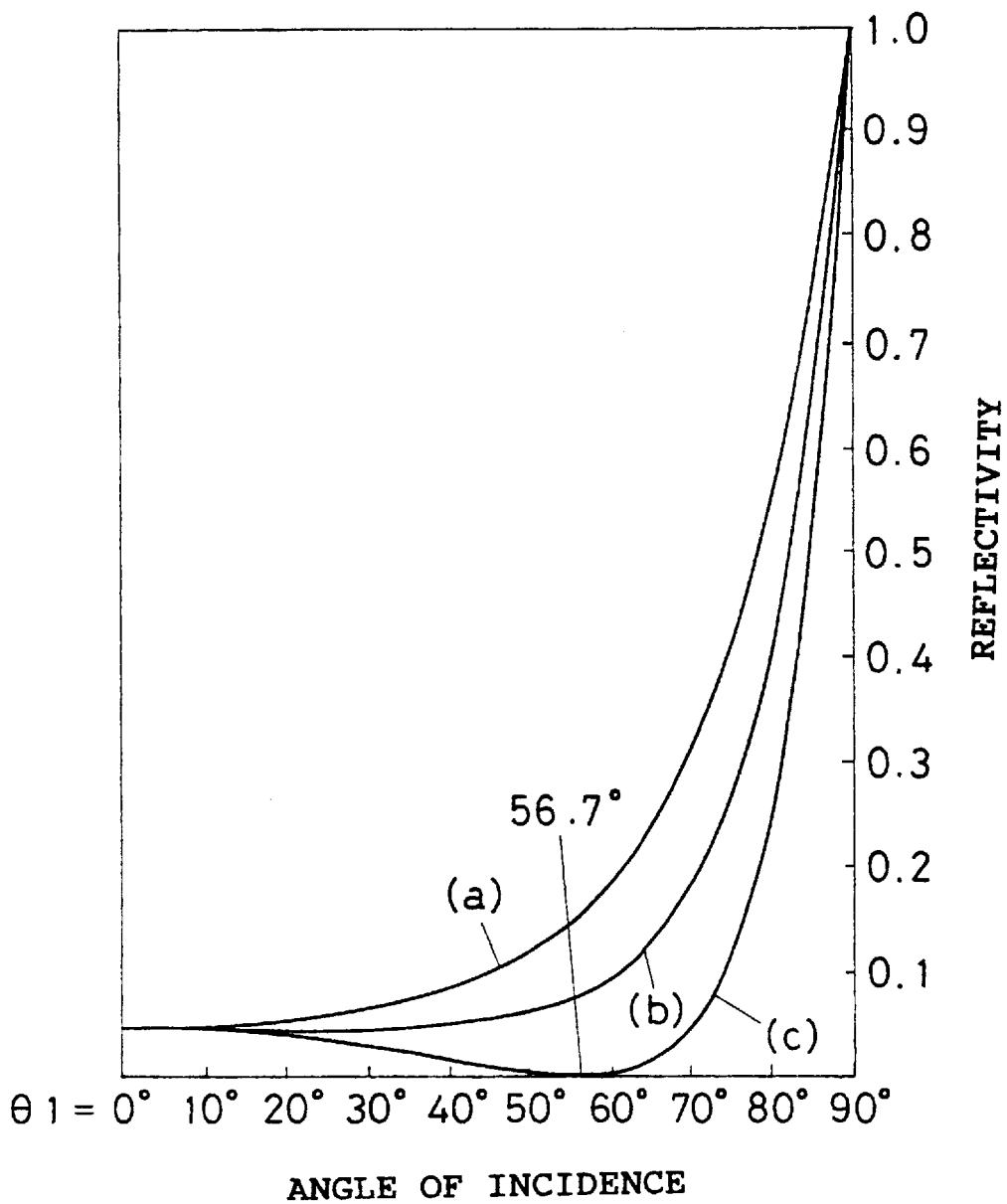
FIG. 20 is a characteristic diagram showing the variation of reflectivity with the angle of incidence at air/glass plate interface.

Reflections of the P wave and S wave components are as shown in FIG. 20. That is, the reflectivity of each of the P wave and S wave components incident on the surface of glass of refractive index of 1.52 varies greatly depending on the angle of incidence $\theta_1$, the reflectivity rapidly dropping as the angle of incidence $\theta_1$ decreases below 90°. The drop of reflectivity in the region of the angle of incidence $\theta_1 \leq 90°$ is steeper particularly for the P wave component than for the S wave component, and the reflectivity of the P wave component becomes very small. At $\theta_1 = 56.7°$, the reflectivity of the P wave component becomes 0, and the reflected light consists only of the S wave component. This is known as the Brewster angle (Principles of Optics 1, M. born E. Wolf).

Let us consider here the positional relationship between the display, the window glass or show window and viewer's eyes, that can occur in an actual situation. The angle of incidence $\theta_1$ of the display light 1904 at the window glass 1902 becomes close to 90° when the display surface 1901 is on or very near the window glass 1902 or when the display surface 1901 is positioned on an extended line of the surface of the window glass 1902 and spaced away from the window glass 1902; this condition can occur only for the light incident nearly parallel to the surface of the window glass 1902. To view the reflected light of such incident light, the viewer 1903 would have to put his face against the window glass and direct his line of sight in parallel to the window glass 1902. It is therefore unthinkable that the reflected light of the light incident at an angle close to 90° will reach the eyes of the viewer 1903 looking out the window. Therefore, the angle of incidence $\theta_1$ of the display light 1904 that reaches the eyes of the viewer 1903 at least satisfies $\theta_1 \leq 75°$. At $\theta_1 \leq 75°$, the amount of the reflected light of the P wave component is very small, as described above, and the S wave component becomes dominant.

Accordingly, in the present invention, when a polarizer 1909 with its plane arranged in the direction that blocks or absorbs the S wave component of the display light 1904 was mounted on the front of the display surface 1901 of the display device, the reflection of the display surface 1901 on the window glass 1902 was completely or substantially eliminated. Though the brightness of the display light was reduced by the presence of the polarizer 1909, a condition that minimizes the reflection and permits good viewing of the display was achieved by suitably selecting the display brightness.

Embodiment 15

Figure 21:
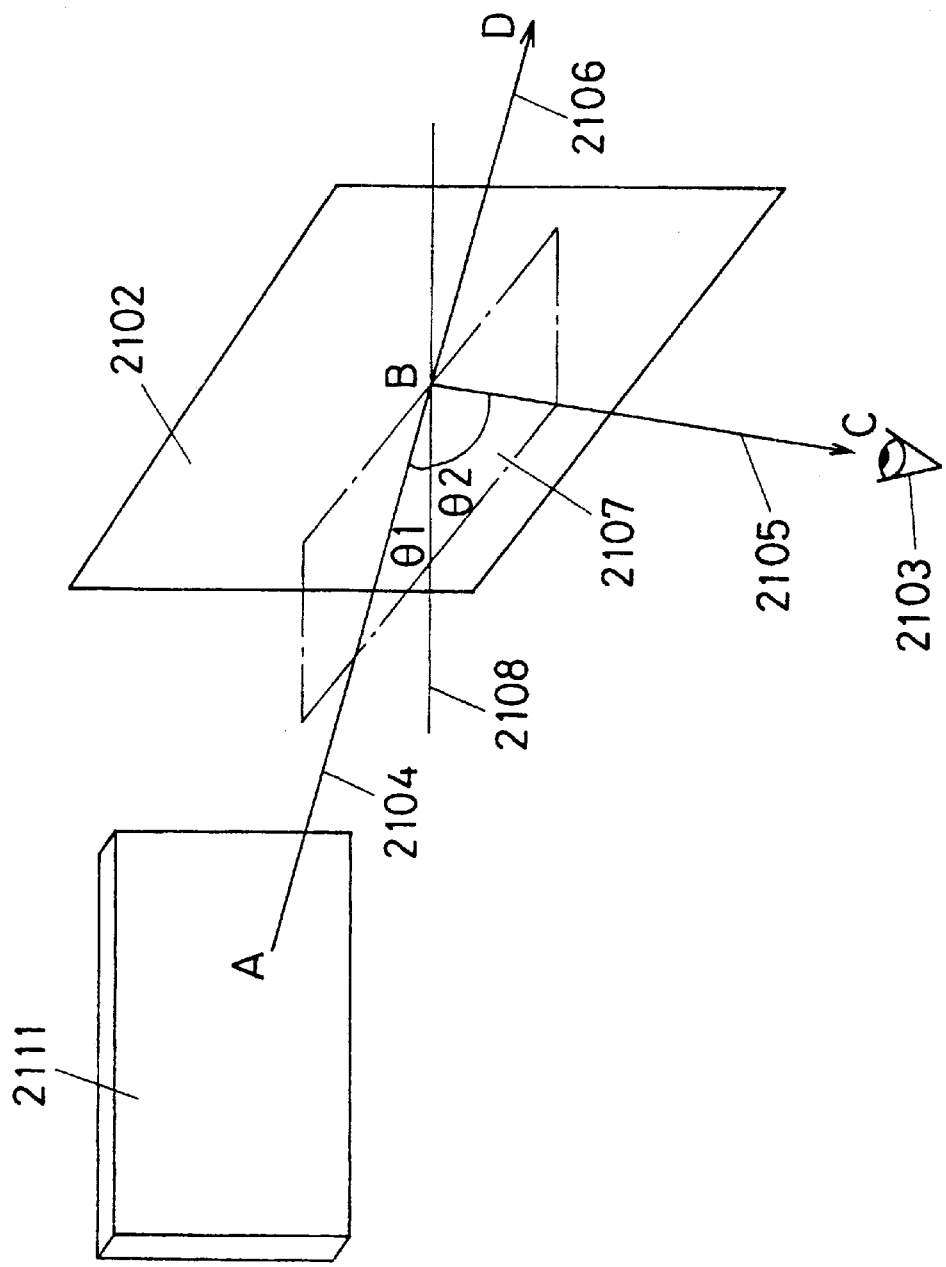
FIG. 21 is a perspective view showing the positional relationship between a liquid crystal display, window glass, and viewer according to a 15th embodiment of the present invention.

FIG. 21 shows how a conventional liquid crystal display, such as a TN or STN/TFT type, is reflected onto a window glass or a show window. FIG. 21 is the same as FIG. 19, except that the self-luminous display device is replaced by a liquid crystal display. Usually, the liquid crystal display is constructed with a liquid crystal cell sandwiched between a pair of polarizers with their polarization axes arranged at right angles to each other. As a result, display light emerging from the liquid crystal display is linearly polarized. As described in the 14th embodiment, the reflectivity of the P wave component at the surface of the window glass 2102 is very low. Accordingly, when the polarization axes of the polarizers are arranged so that the display light emerging through the polarizer (analyzer) on the display side of the liquid crystal display 2111 consists of the P wave component, reflections on the window glass 2102 or show window of images displayed on the liquid crystal display 2111 can be completely or substantially eliminated.

Embodiment 16

Figure 22:
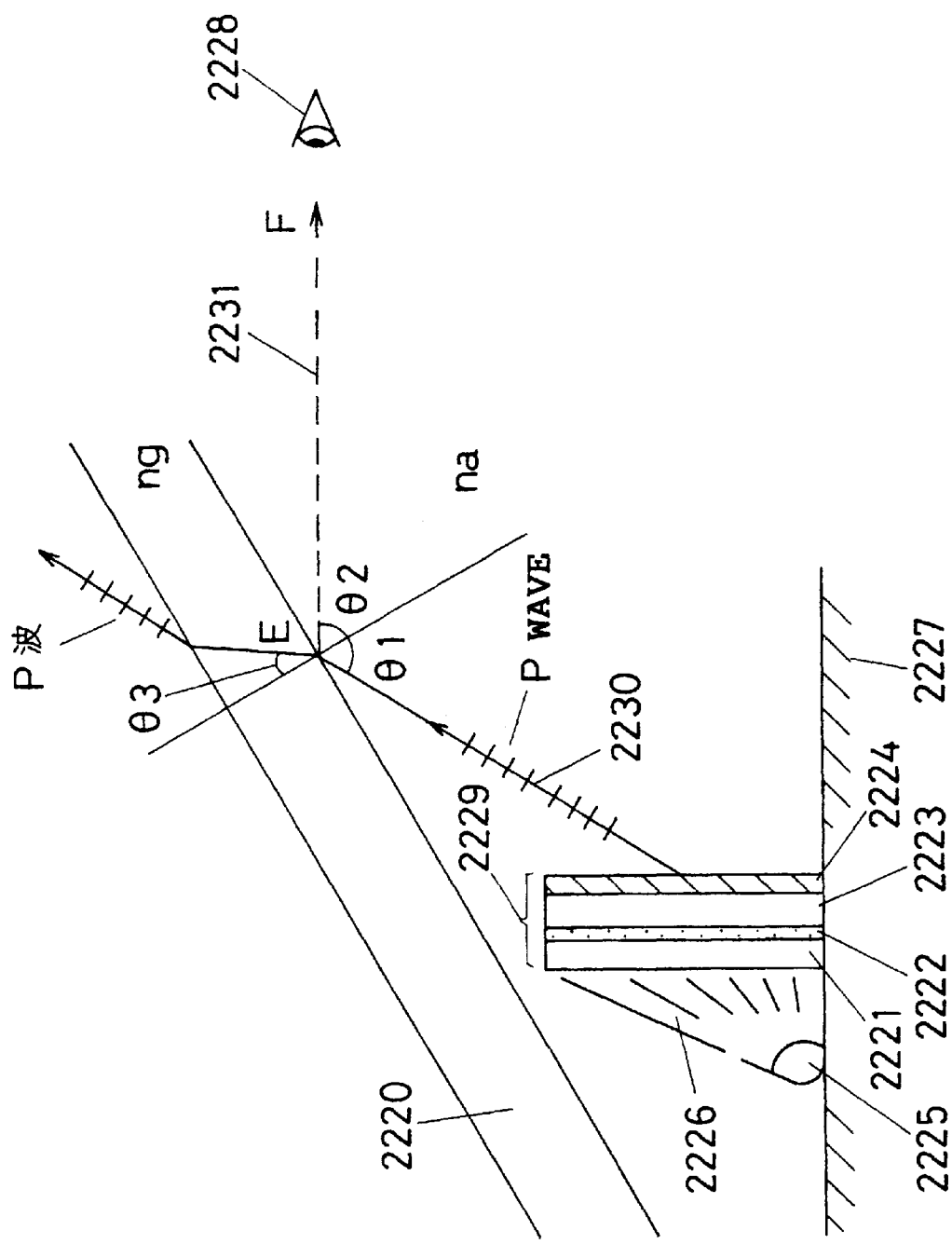
FIG. 22 is a side view showing the positional relationship of a display device mounted directly below a windshield according to a 16th embodiment of the present invention.

FIG. 22 shows a liquid crystal display 2229 mounted on a dashboard 2227 directly below a windshield 2220. The liquid crystal display 2229 consists of two glass substrates 2221 and 2223, each having a transparent electrode (not shown) on one surface, and a macromolecular dispersion-type liquid crystal 2222 sandwiched between them. The transparent electrodes provided on the glass substrates 2221 and 2223 are patterned in the form of display segments, and an AC voltage can be applied for each individual display segment. By the application of an AC voltage higher than the threshold, the macromolecular dispersion-type liquid crystal 2222 becomes transparent; therefore, when the voltage is applied to the segments of the glass substrates 2221 and 2223 other than the segments to be displayed, cloudy images are displayed on the transparent glass substrates. These cloudy images are formed by the ambient light around the liquid crystal display 2229 entering the macromolecular dispersion-type liquid crystal 2222 and scattered through the display segments.

Therefore, in the nighttime or in a tunnel where the ambient light is dark, display image contrast decreases and the images become difficult to see, in which case the liquid crystal display 2229 must be illuminated with a lighting device 2225. At this time, display light 2230 and illumination light 2226 are incident on reflecting point E on the windshield 2220 at an angle of incidence $\theta_1$ and a reflection occurs with reflected light 2231 reaching the eyes of a viewer 2228. The reflection is particularly pronounced at night or in a tunnel because the external light entering through the windshield 2220 is weak. Here, when we consider the reflection of the display light 2230 at the windshield 2220, if the angle of incidence $\theta_1$ is equal to the Brewster angle the reflected light 2231 from the reflecting point E will consist only of the S wave component, as described in connection with the 14th embodiment. The condition for the angle of incidence $\theta_1$ to become equal to the Brewster angle is when $\tan^{-1} \theta_1 = n$ is satisfied, where $n = n_g/n_a$ where $n_a$ is the refractive index of air and $n_g$ is the refractive index of the windshield 2220. Therefore, when the liquid crystal display 2229 is mounted at such a position that the angle of incidence $\theta_1$ becomes nearly equal to the Brewster angle, the reflected light 2231 consists mostly of the S wave component.

Accordingly, by mounting on the display surface of the liquid crystal display 2229 a polarizer 2224 with its plane arranged in a direction that absorbs or blocks the S wave component of the reflected light 2230, the reflected light 2231 is eliminated and the reflection problem is resolved.

On the other hand, information on the external view outside the windshield 2220 is natural light, and the light scattered in the macromolecular dispersion-type liquid crystal 2222 in the portion of the display segments is also natural light; therefore, both lights contain the P wave and S wave components in approximately equal proportions. As a result, the viewer 2228 can easily see the external view information as well as the displayed contents.

Mounting the polarizer 2224 of the invention on the display surface of the liquid crystal display 2229 not only serves to prevent the reflection, but provides the following excellent effect. That is, the transparency of the transparent portions of the macromolecular dispersion-type liquid crystal 2222 other tha the display segments drastically improves compared with the arrangement without the polarizer 2224.

Though the following explanation does not impose any restrictions on the present invention, the above effect can be explained as follows.

Since there are liquid crystal molecules in the transparent portions of the macromolecular dispersion-type liquid crystal 2222, the transparent portions are not perfectly transparent but a slight amount of light scattering occurs. The scattered light passes through the interface between the macromolecular dispersion-type liquid crystal 2222 and the glass substrate 2223 and through the interface between the glass substrate 2223 and the polarizer 2224 before emerging from the display surface. Since the scattered light from the transparent portions is also polarized, the scattered light is blocked or absorbed by the polarizer 2224, presumably contributing to the drastic improvement of the transparency of the transparent portions.

The present embodiment has been described as using a transmission-type liquid crystal display of the type that displays information by transmitting or scattering external light, but it will be recognized that also in the case of a transmission-type display of the type that displays information by transmitting or absorbing external light by using, for example, the guest-host effect, reflections on the windshield can be prevented, as with the transmission and scattering type.

Furthermore, in the present embodiment, the polarizer for blocking or absorbing the S wave component of the display light has been permanently mounted. Instead, by mounting a polarizer of the type that blocks or absorbs the S wave component of the display light only when the liquid crystal display is illuminated with the lighting device and that does not polarize light when it is illuminated only with ambient light, the utilization of the display light can be further enhanced, providing better visibility of the contents displayed on the liquid crystal display. Such a variable polarizer can be accomplished, for example, by a film-like polarizing filter wound in roll form which is drawn to cover or expose the display surface like a roller curtain in an interlocking fashion with the ON or OFF operation of the lighting device.

Embodiment 17

Figure 23:
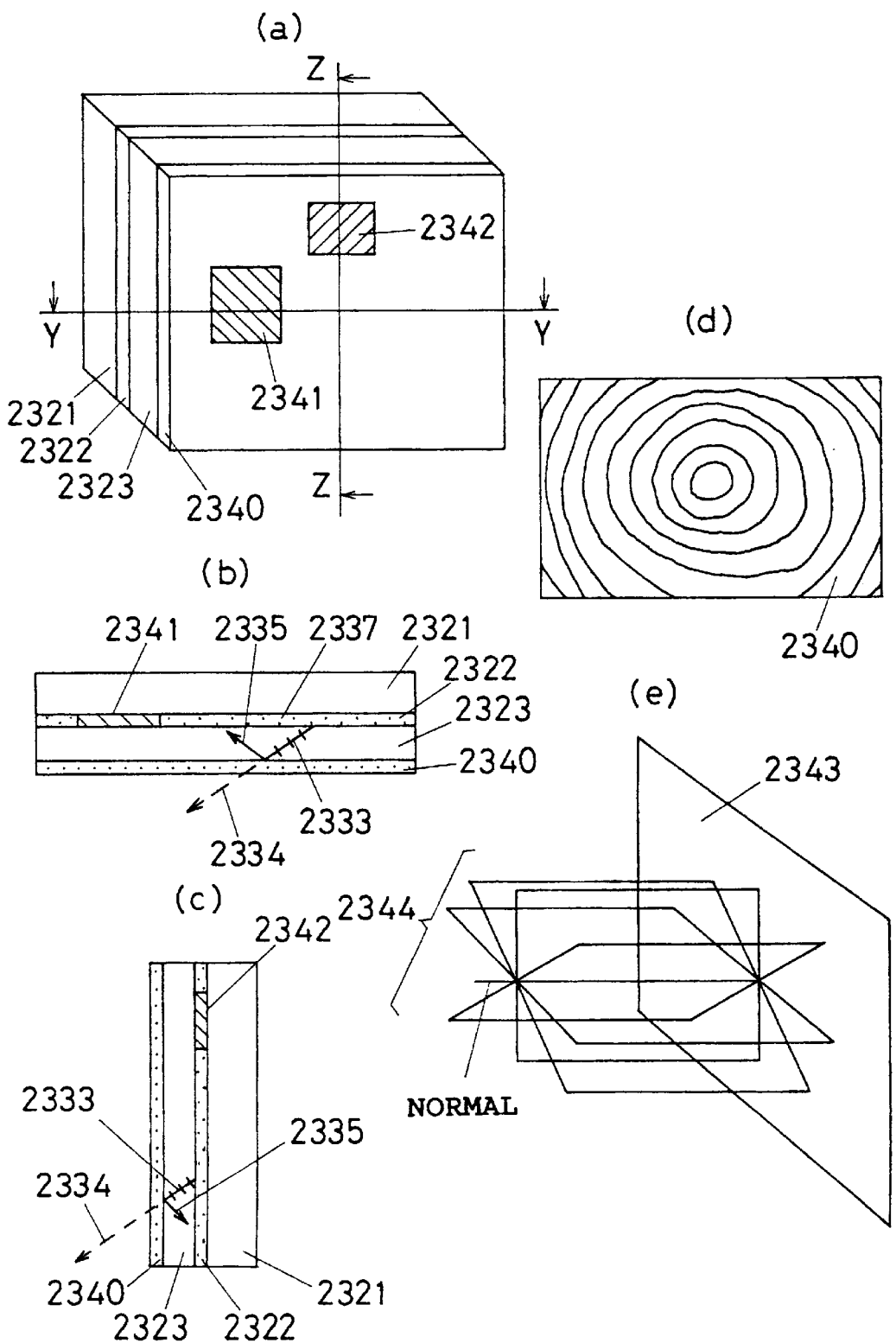
FIG. 23($a$) is a external perspective view of a display device according to a 17th embodiment of the present invention.

In the second half of the description of the 16th embodiment, an explanation has been given of how the transparency of the transparent portions improves for the liquid crystal display mounted directly below the windshield. This, however, does not mean that the transparency improves in all viewing directions on the display surface of the liquid crystal display, but if the display surface is viewed obliquely from above or below, it is seen that cloudy portions still remain. An embodiment that aims at improving the transparency of the transparent portions in such cases will be described with reference to FIG. 23.

FIG. 23(a) is a perspective view showing the liquid crystal display as viewed from the display surface side. It is assumed here that regions 2341 and 2342 are in scattered mode (cloudy state) and other regions are in transparent state. A Y—Y cross-sectional view (horizontal cross-sectional view) of the liquid crystal display of FIG. 23(a) is shown in FIG. 23(b), and a Z—Z cross-sectional view (vertical cross-sectional view) is shown in FIG. 23(c). In FIGS. 23(b) and 23(c), reference numeral 2337 is a transparent portion, 2333 is scattered light due to slight cloudiness remaining in the transparent portion 2337, 2334 is transmitted light of the scattered light 2333, and 2335 is reflected light of the scattered light 2333. Further, 2340 shows a cross-section of the polarizer, and the mark • in the figure indicates that only the light component (S wave component) whose plane of vibration is perpendicular to the plane of the figure is transmitted. The scattered light 2333 scattered through the transparent portion 2337 is split into the reflected light 2335 and transmitted light 2334 at the interface between the polarizer 2340 and the glass substrate 2323. Most of the reflected light 2335 is the S wave component, and the transmitted light 2334 is the P wave component. Since the polarizer 2340 blocks or absorbs the P wave component, in actuality most of the transmitted light 2334 is not radiated outside.

As described above, the polarizer 2340 has a polarization axis arranged in a direction that blocks or absorbs the P wave component in the Y—Y cross section (horizontal cross section) and Z—Z cross section (vertical cross section). Overall, this polarizer has a polarization axis on concentric circles or ellipses with a common center at the center of the display surface, as shown in FIG. 23(d).

By using the polarizer having a polarization axis on concentric circles or ellipses as described, light vibrating in each plane containing the normal passing through the center of the display surface (the P wave component in all cross sections) can be blocked or absorbed, and therefore, the transparency of the transparent portions as viewed from all directions can be improved drastically.

Embodiment 18

Figure 24:
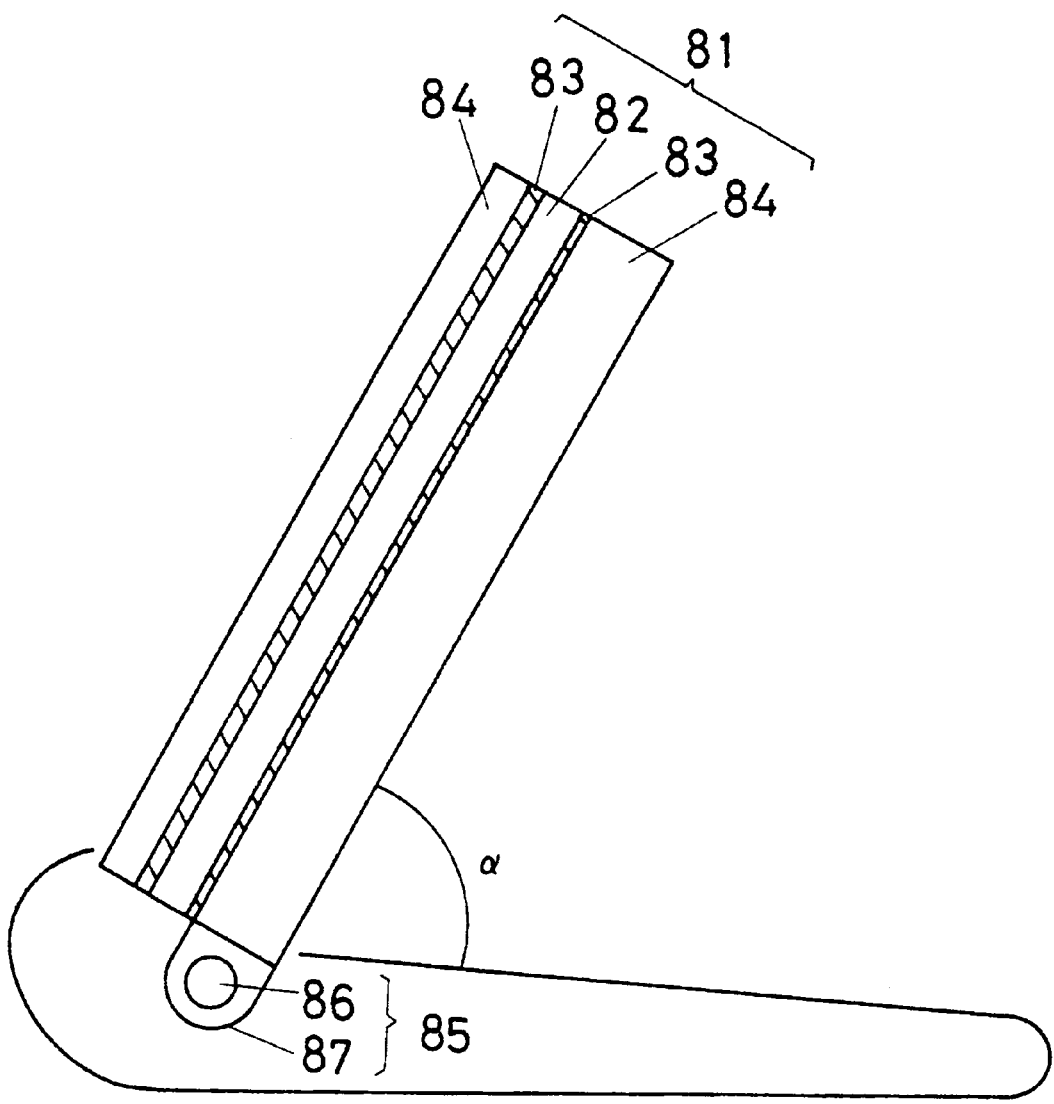
FIG. 24 is a diagram showing the basic construction of a display device according to an 18th embodiment of the present invention.

FIG. 24 is a diagram showing the basic construction of an 18th embodiment of the present invention. The figure shows a cross section of the display device of the invention. Reference numeral 81 indicates a liquid crystal display which comprises a macromolecular dispersion-type liquid crystal 82 such as the one described in the 16th embodiment, and a pair of transparent substrates 84 with transparent electrodes 83 formed thereon and sandwiching the macromolecular dispersion-type liquid crystal 82 between them. Images and characters are displayed by putting the macromolecular dispersion-type liquid crystal 82 in a scattered or transparent state in accordance with signals from a signal generator (not shown). The liquid crystal display 81 is supported by means of a supporter (not shown) having a swinging mechanism, and can be folded flat or turned up at any desired angle by adjusting its supporting angle α. Reference numeral 85 indicates a lighting device consisting of a light source 86 and a reflecting mirror 87 and arranged at one end of the transparent substrate to illuminate the liquid crystal display 81.

The lighting device 85 is not limited in construction to the light source 86 and reflecting mirror 87, but any construction can be employed as long as it is so designed as to illuminate the liquid crystal display 81.

Figure 25:
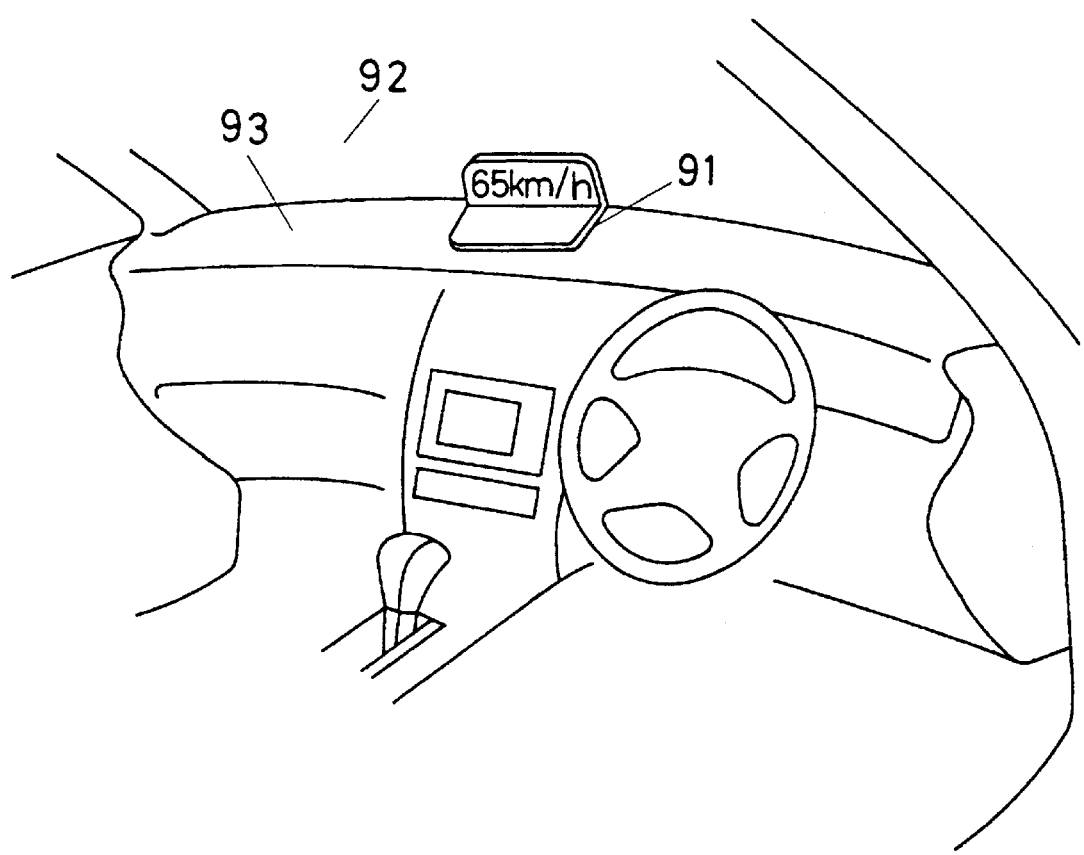
FIG. 25 is an installation example of the display device according to the 18th embodiment.

The thus constructed display device 91 of the invention is mounted on the dashboard 93 in close proximity to the windshield 93, as shown in FIG. 25.

Figure 26A:
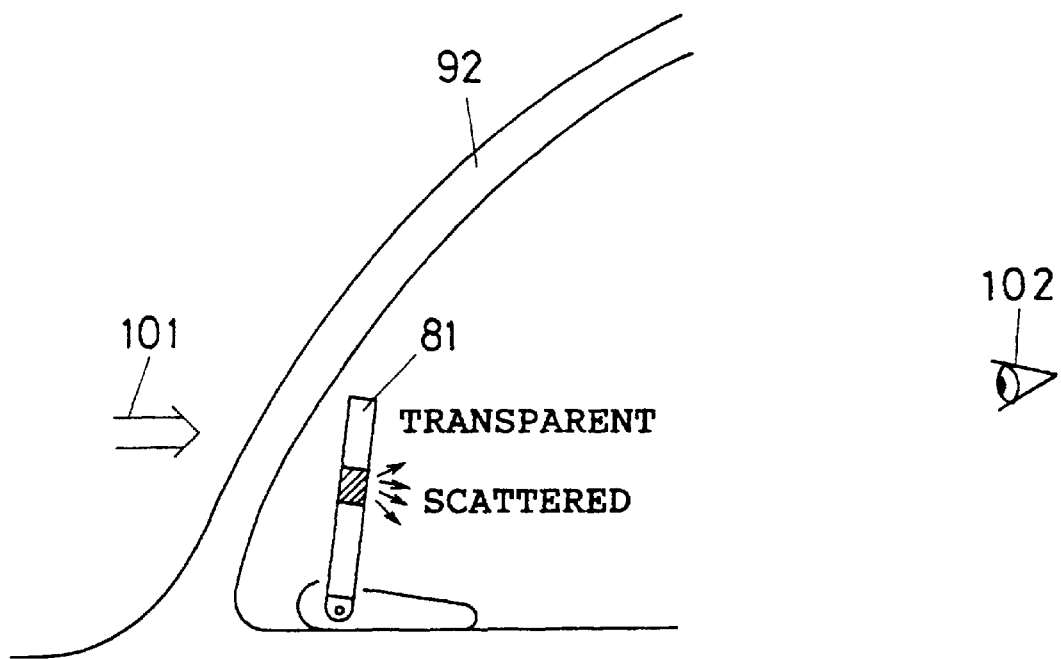
FIG. 26 is a schematic view showing the display device according to the 18th embodiment.
Figure 26B:
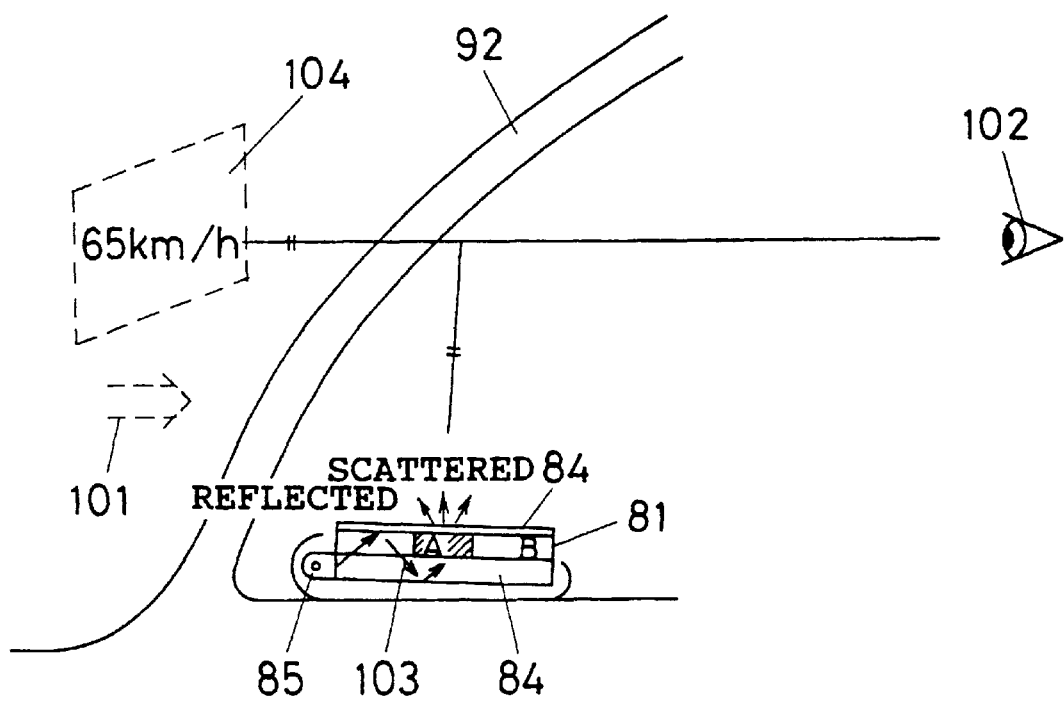

The operation of the present embodiment will be described with reference to FIGS. 26(a) and 26(b). FIG. 26(a) shows the arrangement when ambient light is bright, for example, in the daytime. The liquid crystal display 81 is turned up toward the windshield 92; in this condition, when the portions of the liquid crystal display 81 where an image or character is to be displayed are put in the scattered state and the other portions in the transparent state by the signal generator, the bright ambient light 101 is scattered only through the portions of the image or character to be displayed, thereby forming a bright image for display.

On the other hand, the other portions transmits the ambient light 101, so that the driver 102 can view the displayed images in superimposed fashion on the outside view.

When the ambient light 101 is weak, for example, during night driving, the lighting device 85 is turned on, but with the above-described arrangement, reflections would occur on the windshield 92. Therefore, the liquid crystal display 81 is folded flat, as shown in FIG. 26(b), and in this condition, when the liquid crystal display 81 is illuminated from the edge of the transparent substrate 84 with light 103 from the lighting device 85, the illuminating light 103 is scattered through the image or character portions set in the scattered state (portions indicated by A in the figure), thereby forming a bright image for display. In the other portions set in the transparent state (portions indicated by B in the figure), the illuminating light 103 undergoes total reflection within the transparent substrate 84 because of the difference in refractive index between the air layer and the transparent substrate, so that the illuminating light 103 does not emerge outside the surface of the liquid crystal display 81. As a result, only the displayed image is reflected at the windshield 92 and forms a virtual image 104 at the front, allowing the driver 102 to view the displayed image superimposed on the outside view and thus substantially relieving him of such problems as reflections that could interfere with the driving. In this case, the image displayed on the liquid crystal display 81 is reversed right and left, but since the image is again reversed on reflection at the windshield 92, the image appears normal like the image viewed when the liquid crystal display 81 is set upright. Therefore, special signal processing for reversion need not be performed on the signal controlling the liquid crystal display 81.

The decision as to whether the ambient light is strong or weak can be made based, for example, on whether or not the headlights or taillights are on. When the driver turns off the headlights and taillights, it is decided that the ambient light is strong, and the lighting device 85 is turned off to display images or characters, as shown in FIG. 26(a). On the other hand, when the driver turns on the headlights or taillights, the lighting device 85 is turned on to display images or characters, as shown in FIG. 26(b).

Alternatively, a sensor for detecting the intensity of ambient light may be used to make the above decision with reference to a predetermined threshold value. It is of course possible to light the lighting device 85 regardless of the intensity of the ambient light. If illuminated with a colored light using a colored light source or a color filter, a colored image can be produced for display.

The means for adjusting the supporting angle α of the liquid crystal display 81 in accordance with the intensity of ambient light, that is, the means for setting the liquid crystal display 81 upright when the ambient light is strong and folding it when the ambient light is weak, may be operated manually by the driver 102, or by electrical means such as a motor or mechanical means such as a spring. In any case, the liquid crystal display 81 can be folded flat when it is not necessary. Needless to say, the above-described means for deciding whether the ambient light is strong or weak can also be used in the 16th and 17th embodiments if necessary.

Embodiment 19

Next, a display device will be described whose lighting device is equipped with a polarizer.

Figure 27A:
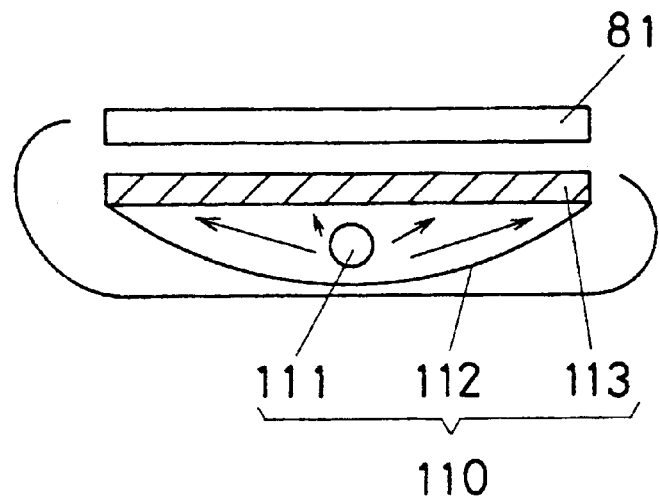
FIG. 27 is a diagram showing the basic construction of a display device according to a 19th embodiment of the present invention.
Figure 27B:
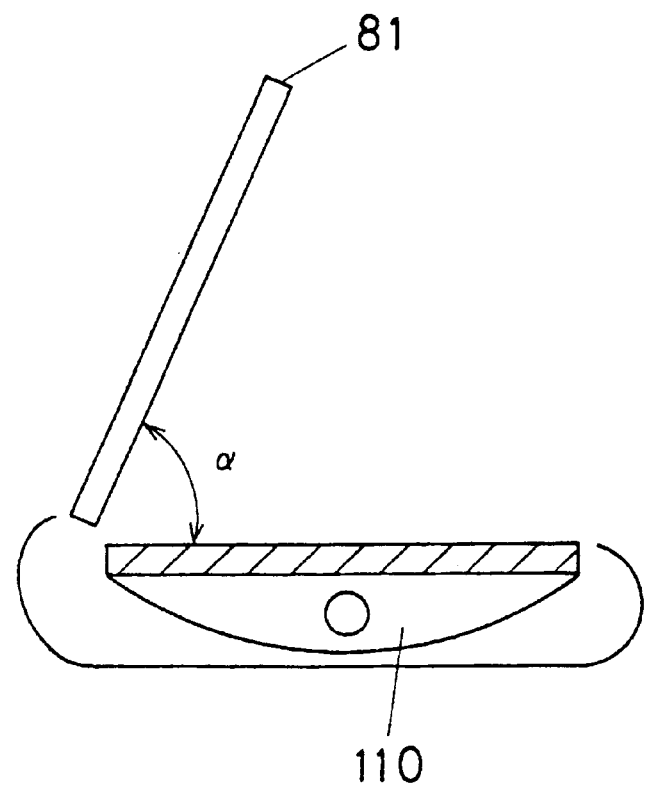

FIG. 27 is a diagram showing the basic construction of a 19th embodiment of the present invention: FIG. 27(a) shows a cross section of the display device when the liquid crystal display 81 is folded flat. The liquid crystal display 81 can be turned up at any desired angle, as shown in FIG. 27(b), by adjusting its supporting angle α using a swinging mechanism similar to the one described in the 18th embodiment. The lighting device 110 of the present embodiment is positioned beneath the liquid crystal display 81, and consists of a light source 111, a reflecting mirror 112, and a polarizer 113.

The lighting device 110 is not limited to the above construction, but any construction can be employed as long as it is designed to illuminate the liquid crystal display 81 with light passed through the polarizer 113.

Figure 28A:
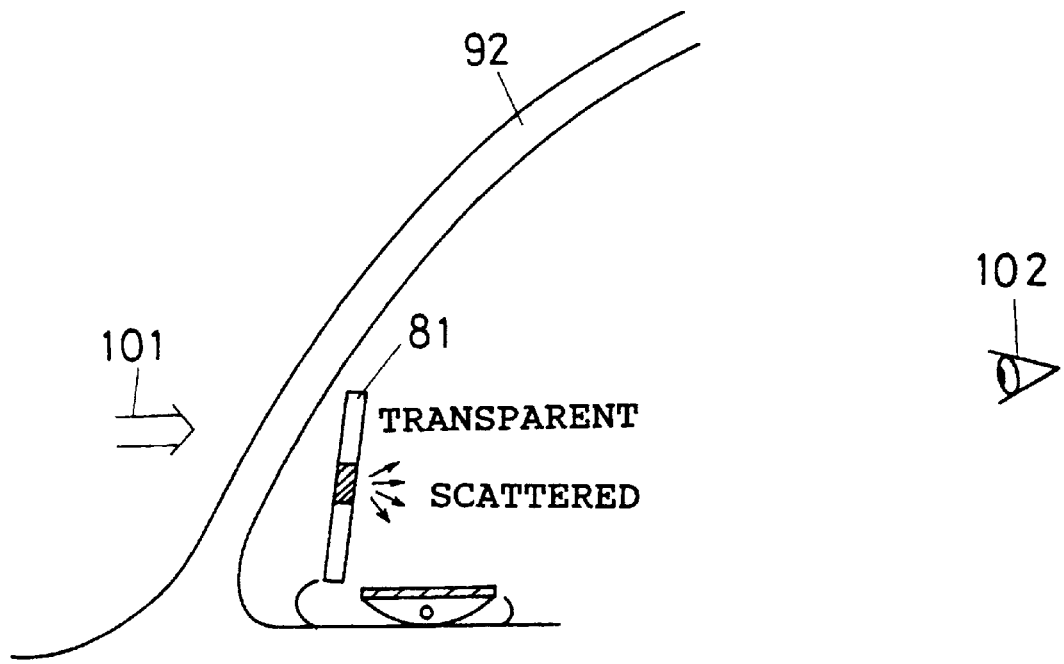
FIG. 28 is a schematic view showing the display device according to the 19th embodiment.

The operation of the present embodiment will be described with reference to FIGS. 28(a) and 28(b). FIG. 28(a) shows the arrangement when ambient light is bright, for example, in the daytime. As in the 18th embodiment, the liquid crystal display 81 is turned up toward the windshield 92; in this condition, when the portions of the liquid crystal display 81 where an image or character is to be displayed are put in the scattered state and the other portions in the transparent state by the signal generator, the bright ambient light 101 is scattered only through the portions of the image or character to be displayed, thereby forming a bright image for display. On the other hand, the other portions transmits the ambient light 101, so that the driver can view the displayed images superimposed on the outside view.

Figure 28B:
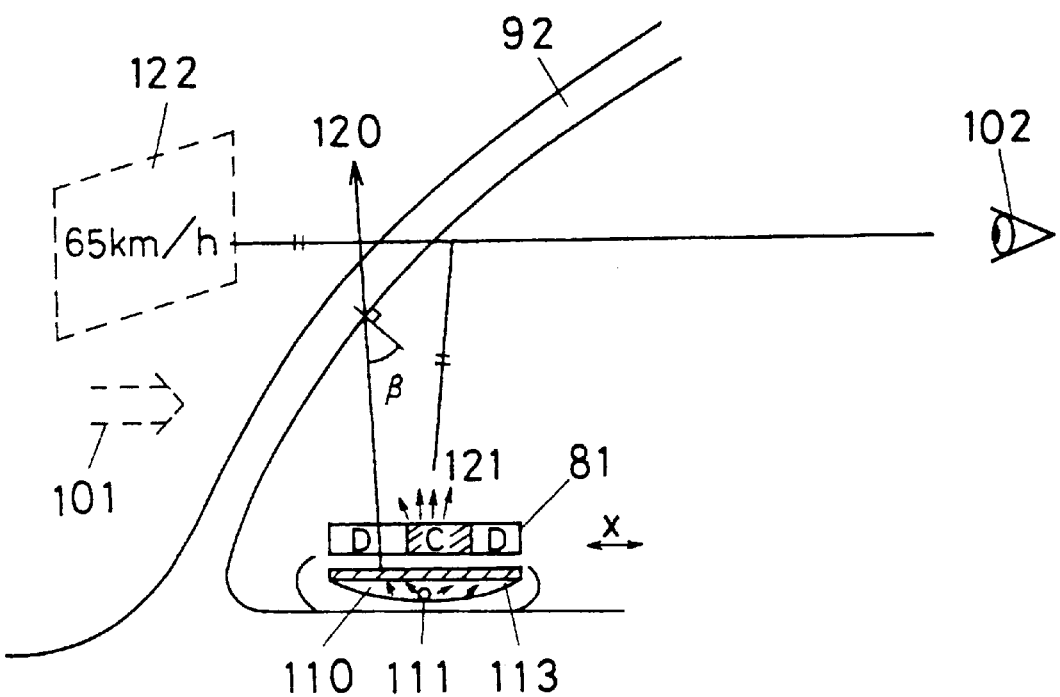

When the ambient light 101 is weak, for example, during night driving, the liquid crystal display 81 is folded flat, as shown in FIG. 28(b), and in this condition, the lighting device 110 illuminates the liquid crystal display 81 with illuminating light 120 from below the liquid crystal display 81. When the polarizer 113 whose direction of polarization is shown by arrow X (P polarization) is mounted on the lighting device 110, of the light emitted from the light source 111 only the light vibrating in the same direction as the direction of polarization of the polarizer 113 is passed through it as the illuminating light 120 to illuminate the liquid crystal display 81. In the image or character portions set in the scattered state (portions indicated by C in the figure) in the liquid crystal display 81, the illuminating light 120 consisting only of the component vibrating in the direction of arrow X (P-polarization component) is turned by scattering into display light 121 having components vibrating substantially in many directions when viewed from the windshield side. The display light 121 is reflected at the windshield 92 and forms a virtual image 122 at the front.

On the other hand, in the other portions set in the transparent state (portions indicated by D in the figure), the illuminating light 120 polarized in one direction is passed through the liquid crystal display 81 and reaches the windshield 92. When the angle of incidence β at which the illuminating light 120 passed through the transparent portions of the liquid crystal display 81 is incident on the windshield 92 falls within a prescribed range, the light passes through the windshield 92 with little reflection and exits outside the automobile.

The display device can thus provide good visibility, allowing the driver to view only the displayed image in superimposed fashion on the outside view without having to directly see the illuminating light.

Embodiment 20

Figure 29A:
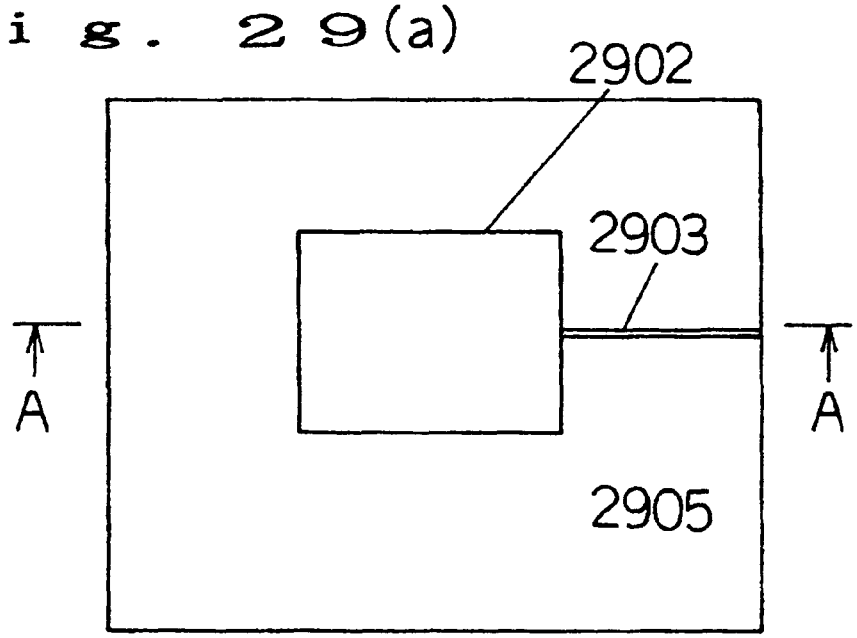
FIG. 29 is a simplified schematic diagram showing the structure of a liquid crystal display according to a 20th embodiment of the present invention.
Figure 29B:
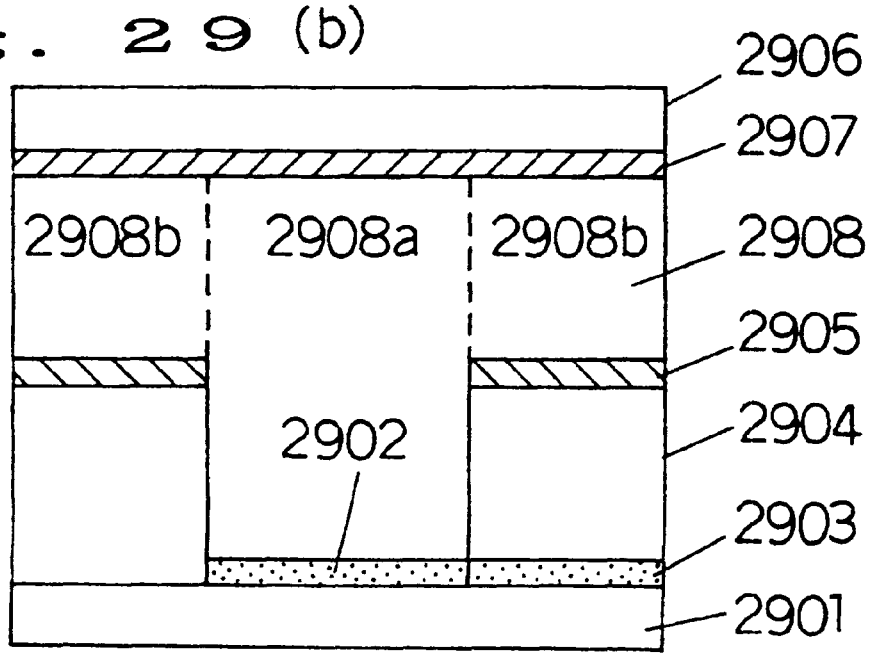

FIGS. 29(a) and 29(b) show a front view of the liquid crystal display of the invention and a cross section taken along line 29(b)—29(b), respectively. In the figure, reference numeral 2901 is a transparent substrate, 2902 is a display pattern portion and is formed from a transparent electrode, and 2903 is a wiring portion for a display pattern portion 2902 and is formed from a transparent electrode. Further, 2904 is a transparent insulating layer, 2905 is a transparent electrode formed in a portion other than the display pattern portion 2902, 2906 is a transparent substrate opposing the transparent substrate 2901, 2907 is a transparent electrode formed on the transparent substrate 2906, and 2908 is a macromolecular dispersion-type liquid crystal (hereinafter simply referred to as the liquid crystal).

When a voltage is applied between the transparent electrodes 2905 and 2907, setting the portions between them in the ON state while setting the display pattern portion 2902 in the OFF state, the liquid crystal 2908a in the display pattern portion 2902 is put in the scattered state. At this time, the voltage is not applied to the wiring portion 2903, but since the voltage is applied to the transparent electrode 2905 above it, the liquid crystal 2908b in the wiring portion 2903 is set in the transparent state. Thus only the display pattern portion 2902 can be displayed by setting the liquid crystal 2908b in the wiring portion 2903 always in the transparent state.

Figure 30:
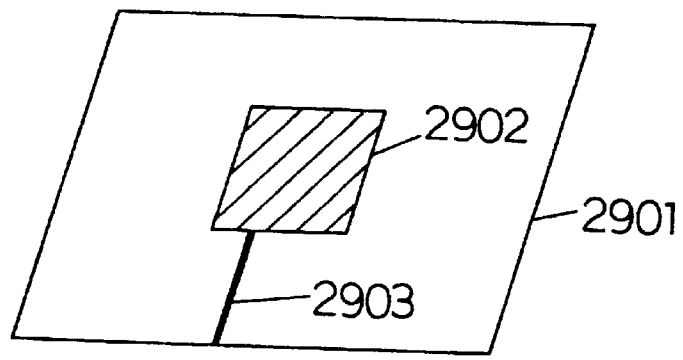
FIG. 30 is a diagram conceptually illustrating a method of transparent electrode formation in the liquid crystal display according to the 20th embodiment
Figure 30:
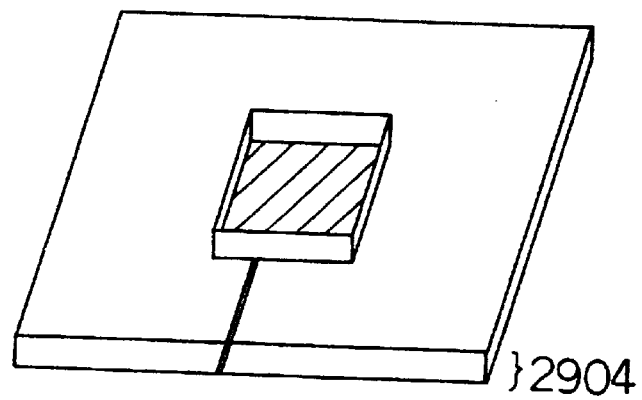
Figure 30:
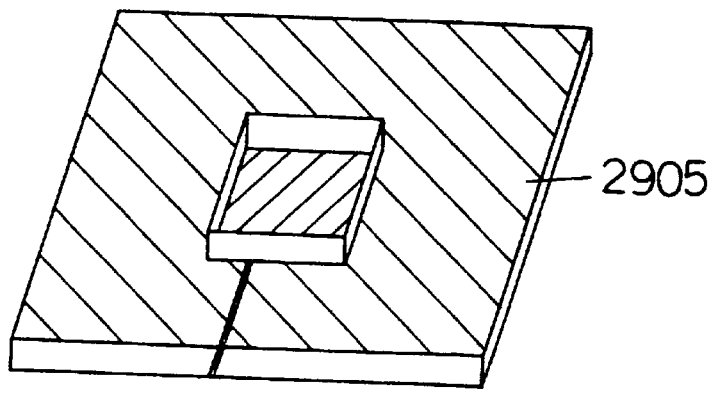

FIG. 30 is a diagram conceptually showing how the transparent electrodes are formed in the liquid crystal display of the invention. First, as shown in FIG. 30(a), a transparent electrode is deposited to form the display pattern portion 2902 and the wiring portion 2903 on the transparent substrate 2901. Next, as shown in FIG. 30(b), the portions other than the display pattern portion 2902 are covered with the insulating layer 2904. Then, as shown in FIG. 30(c), the transparent electrode 2905 is formed on the insulating layer 2904, completing the three-layered structure consisting of the transparent substrate 2901 containing the wiring portion 2903, the insulating layer 2904, and the transparent electrode 2905, as shown in FIG. 29. With this structure, only the display pattern is displayed with the other portions set in the transparent state. The liquid crystal display can thus provide good visibility, displaying an image or character on a transparent screen in superimposed fashion on the background.

Embodiment 21

Figure 31:
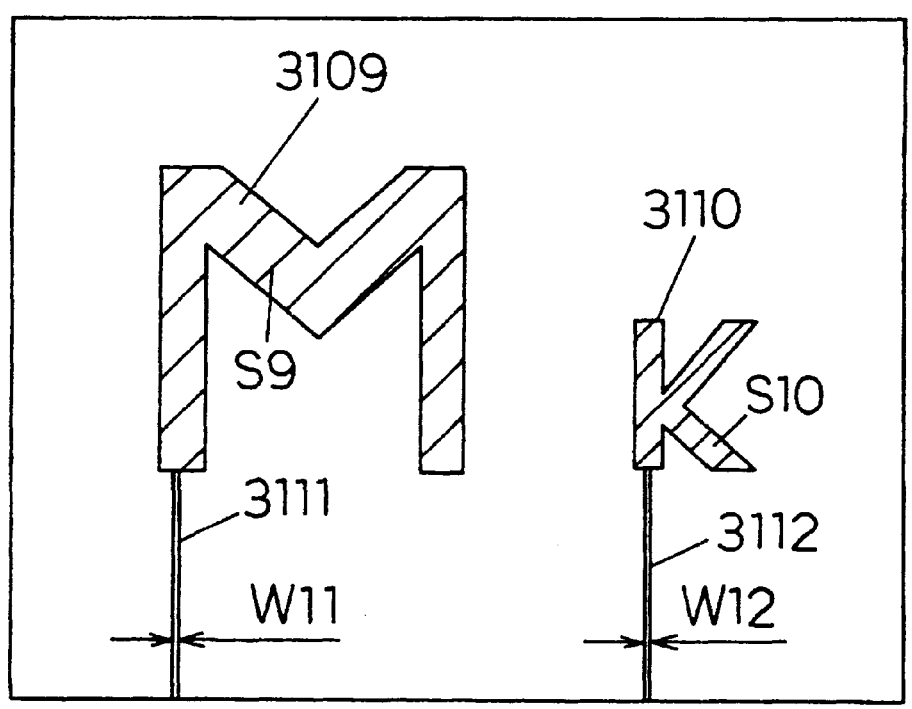
FIG. 31 is a diagram showing display patterns in a liquid crystal display according to a 21st embodiment of the present invention.

Next, a liquid crystal display of the construction that achieves uniform screen transparency will be described. FIG. 31 shows display patterns in the liquid crystal display according to a 21st embodiment of the present invention. In FIG. 31, reference numerals 3109 and 3110 are display pattern portions, and 3111 and 3112 are wiring portions for the display pattern portions. Wiring line width is made thicker as the display pattern area increases. That is, when the area of the display pattern portion 3109 is S9 and the area of the display pattern portion 3110 is S10, and S9>S10, the transparent electrodes and insulating layer are formed in the same way as described in the 20th embodiment in such a manner as to satisfy W11>W12, where W11 and W12 are the line widths of the wiring portions 3111 and 3112, respectively.

In this way, the wiring resistance of the larger area display pattern is reduced to reduce the voltage drop through the wiring portion. Since approximately the same voltage can be applied to the liquid crystal regardless of the area sizes of the display patterns, the liquid crystal display achieves uniform screen transparency.

Embodiment 22

Figure 32:
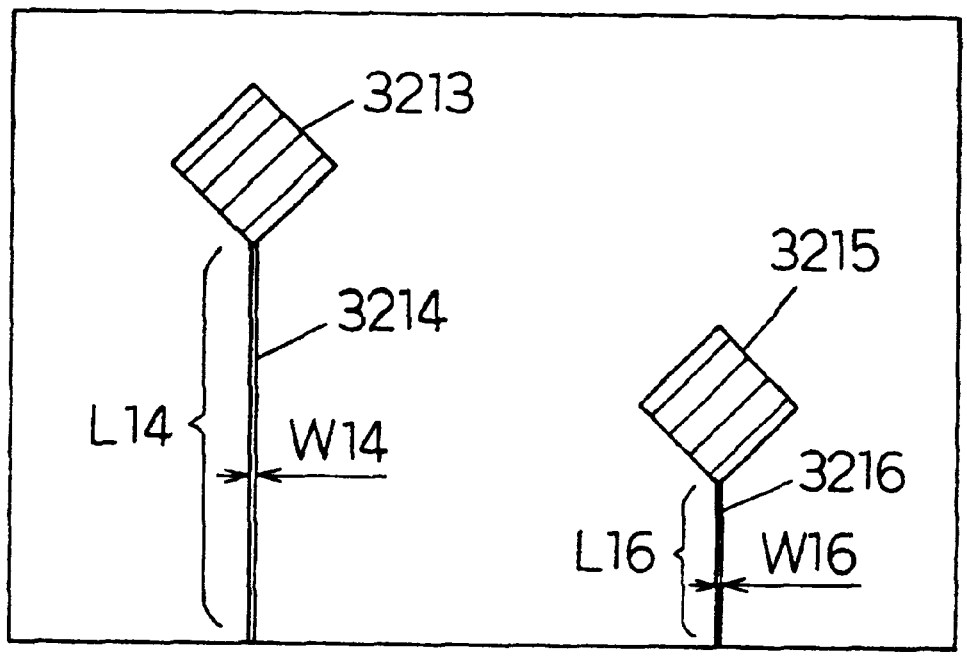
FIG. 32 is a diagram showing display patterns in a liquid crystal display according to a 22nd embodiment of the present invention.

FIG. 32 shows display patterns in the liquid crystal display according to a 22nd embodiment of the present invention. When the area sizes of the display patterns are the same but the lengths of the wiring portions are different because of different display positions, as shown in FIG. 32, wiring line width is made thicker as the wiring length increases. That is, when the length of the wiring portion 3214 for the display pattern portion 3213 is L14 and the length of the wiring portion 3216 for the display pattern portion 3215 having the same area size as the display pattern portion 3213 is L16, and L14>L16, the transparent electrodes and insulating layer are formed in the same way as described in the 20th embodiment in such a manner as to satisfy W14>W16, where W14 and W16 are the line widths of the wiring portions 3214 and 3216, respectively.

In this way, the wiring resistance of the display pattern having the longer wiring portion is reduced to reduce the voltage drop through the wiring portion. Since approximately the same voltage can be applied to the liquid crystal regardless of the wiring length, the liquid crystal display achieves uniform screen transparency.

As described, the transparent liquid crystal display of the invention not only achieves improved transparency compared with the conventional liquid crystal display using polarizers, but has the excellent characteristic that bright images can be obtained because images are displayed in the scattered mode and also color images can be obtained easily by illuminating with colored light, whereas, with the conventional liquid crystal display which displays images by absorbing light, only darkish images could be obtained if the display was driven in the transparent mode.

In the above 21st and 22nd embodiments, display pattern area and wiring length have been dealt with separately, but it will be recognized that the wiring line width should be determined so that the voltage drop through any wiring portion is equal regardless of its length, in accordance with conditions considering both the display pattern area and wiring length.

Embodiment 23

Figure 33:
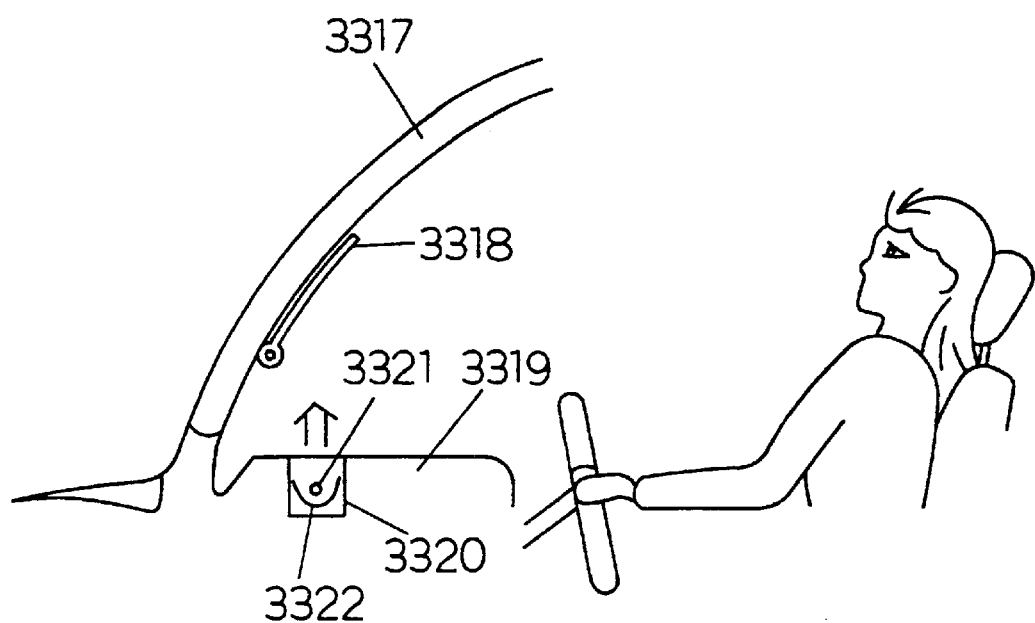
FIG. 33 is a diagram showing the basic construction of a head-up display according to a 23rd embodiment of the present invention.

Next, a description will be given of a head-up display using the liquid crystal display of the present invention. FIG. 33 is a diagram showing the basic construction of the head-up display according to a 23rd embodiment of the invention. Reference numeral 3317 is a windshield, and 3318 is the liquid crystal display of the invention which displays images and characters. The liquid crystal display is attached to the windshield 3317 or mounted on the dashboard 3319 using a transparent adhesive tape, suction cap, or the like, and displays images and characters by receiving signals from a signal generator not shown. Further, 3320 is a lighting device consisting of a light source 3321 and a reflecting mirror 3322 and so mounted as to illuminate the liquid crystal display 3318.

The lighting device 3320 is not limited in construction to the light source 3321 and reflecting mirror 3322, but any construction can be employed as long as it is so designed as to illuminate the liquid crystal display 3318.

Figure 34A:
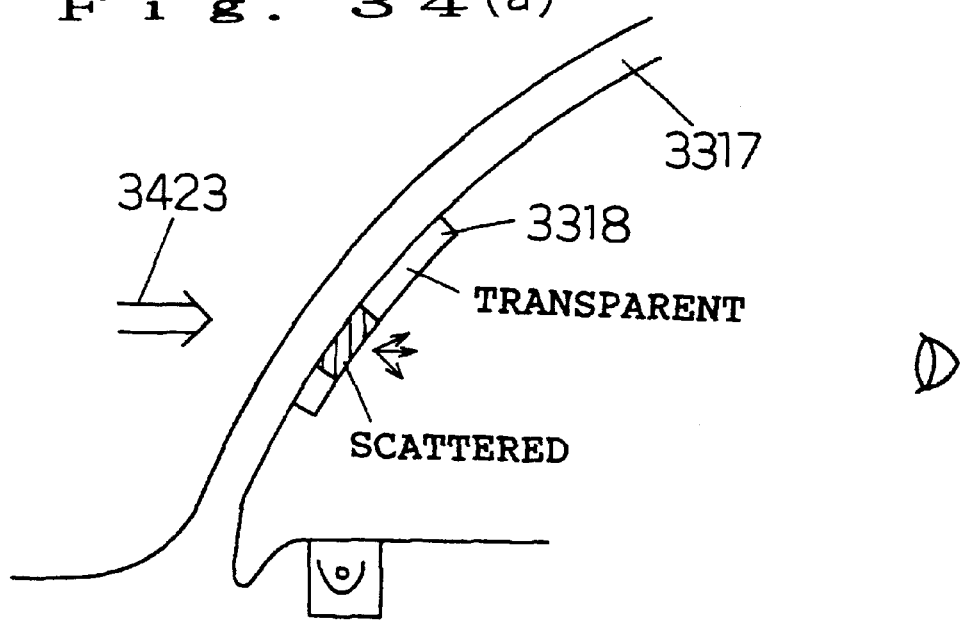
FIG. 34 is a schematic view showing the head-up display according to the 23rd embodiment.

The operation of the present embodiment will be described with reference to FIG. 34. FIG. 34(a) shows the arrangement when ambient light is bright, for example, in the daytime. In the liquid crystal display 3318 attached to the windshield 3317, when the portions of an image or character to be displayed are put in the scattered state and the other portions in the transparent state, the bright ambient light 3423 is scattered only through the portions of the image or character to be displayed, thereby forming a bright image for display. On the other hand, the other portions transmits the ambient light 3423, allowing the driver to view the outside view.

Figure 34B:
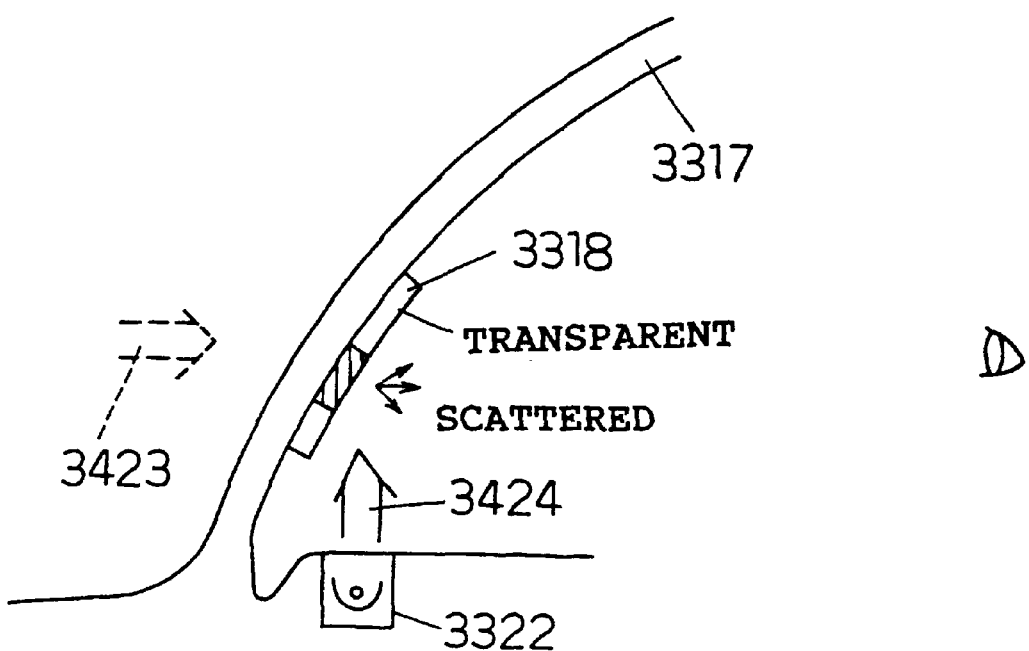

When the ambient light 3423 is weak, for example, during night driving, as shown in FIG. 34(b), the lighting device 3322 is turned on to illuminate the liquid crystal display 3318 with illuminating light 3424 which is scattered only through the image or character portions set in the scattered state, thereby forming a bright image for display. On the other hand, the other portions that are set in the transparent state transmit the illuminating light 3424 outside the automobile, thus admitting the ambient light 3423 and allowing the driver to view the outside view.

The decision as to whether the ambient light is strong or weak can be made based, for example, on whether the headlights are on. When the driver turns off the headlights, it is decided that the ambient light is strong, and the lighting device 3322 is turned off to display images or characters, as shown in FIG. 34(a). On the other hand, when the driver turns on the headlights, the lighting device 3322 is turned on to display images or characters, as shown in FIG. 34(b). Alternatively, a sensor for detecting the intensity of ambient light may be used to make the decision as to whether the ambient light is strong or weak.

In this way, the liquid crystal display of the invention is attached to the windshield, and with the portions of an image or character to be displayed set in the scattered state and the other portions set in the transparent state, the image for display is formed using the ambient light when the ambient light is bright enough, and using the illuminating light from the lighting device when the ambient light is weak. This construction achieves a display device which is compact and which can display information in superimposed fashion on the outside view. It is of course possible to keep the display constantly illuminated with lighting, in which case a colored scattered light image can be obtained by illuminating with colored light.

Embodiment 24

Figure 35:
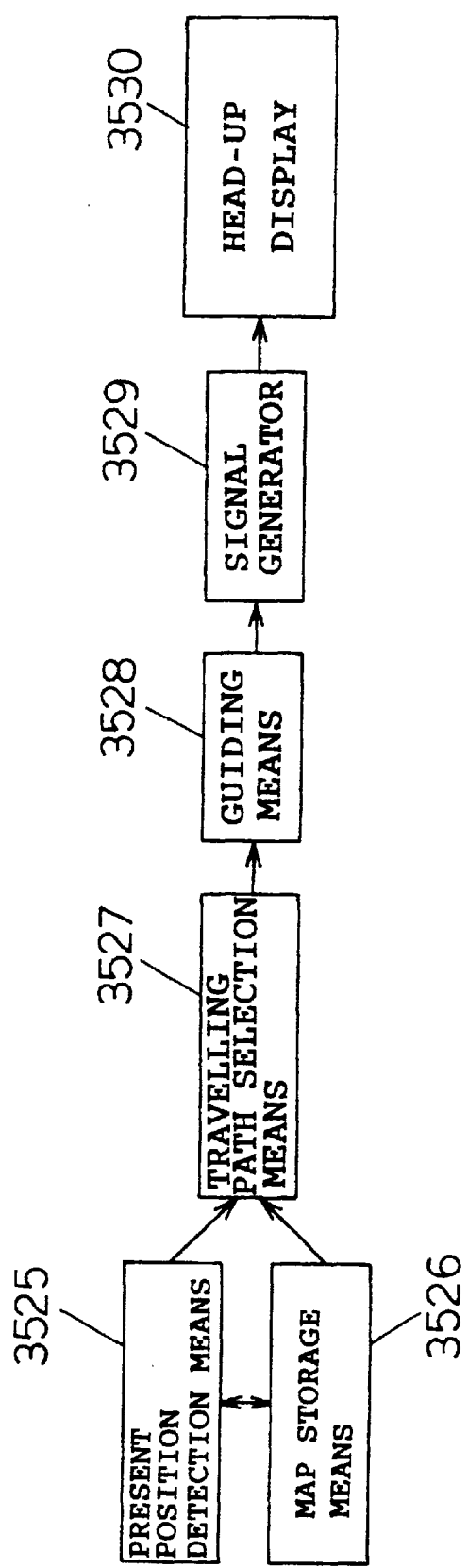
FIG. 35 is a functional block diagram of a navigation system according to a 24th embodiment of the present invention.

Next, a description will be given of a navigation system that uses the head-up display and the liquid crystal display of the present invention. FIG. 35 is a functional block diagram of the navigation system according to a 24th embodiment of the invention. Reference numeral 3525 is a present position detection means which detects the present position of the vehicle by receiving radiowaves from GPS satellites, or by calculating the vehicle's travelling path based on the information from the heading sensor and distance sensor mounted in the vehicle and relating the calculated results to the road data stored in map storage means 3526, or by using both methods in combination. A travelling route selection means 3527 selects the appropriate route and road to the destination based on the data stored in the map storage means 3526, road traffic information, etc. A guiding means 3528 calculates a junction or intersection where guidance is needed on the basis of the information from the travelling route selection means 3527, and also calculates the distance from the present position to the junction and outputs the distance to the junction or the direction of the turn to a signal generator 3529 when the vehicle approaches within a predetermined distance of the junction. The signal generator 3529 converts this information to display output data, and displays guiding information on a head-up display 3530.

Figure 36:
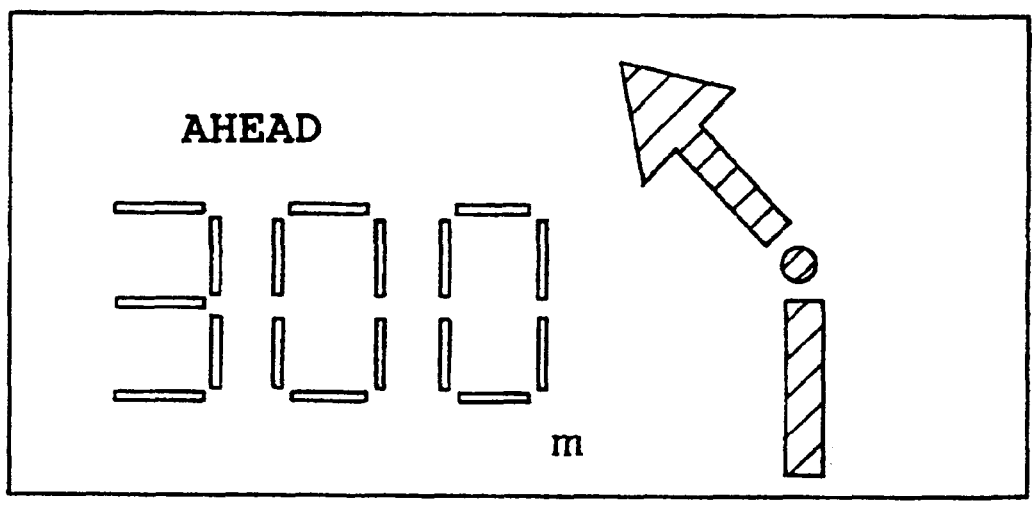
FIG. 36 is a diagram showing an example of a screen display according to the 24th embodiment.

Next, the operation of the present embodiment will be described. The construction of the head-up display 3530 is the same as that shown in FIG. 33. FIG. 36 shows an example of a screen display of the head-up display 3530. When the driver inputs the destination, the appropriate route and road are selected, and a junction point is calculated. As the vehicle travels, the vehicle approaches within a predetermined distance of the junction point, upon which the direction of the turn and the distance to the junction point are output via the signal generator 3529 and displayed in superimposed fashion on the outside view, as shown in FIG. 36. The information displayed on the head-up display 3530 is not limited to the example shown in FIG. 36, but such information as vehicle speed, present time, direction, and warning or alarm indicating the occurrence of a trouble in the vehicle or traffic congestion or accident ahead, may be displayed.

In this way, according to the present embodiment, since the driver can obtain guiding information from the navigation system in a reliable manner without looking away from the road during driving, inattentive driving can be avoided and safety in vehicle driving can be enhanced.

Embodiment 25

Figure 37A:
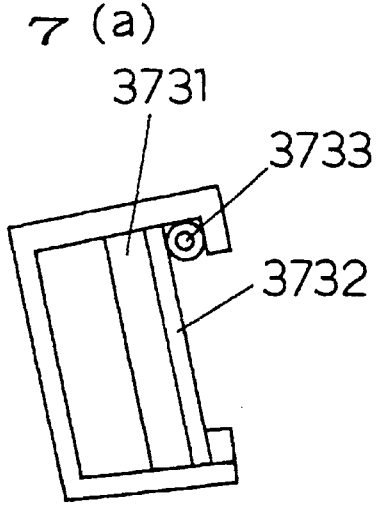
FIG. 37 is a schematic diagram of a combination instrument according to a 25th embodiment of the present invention.
Figure 37B:
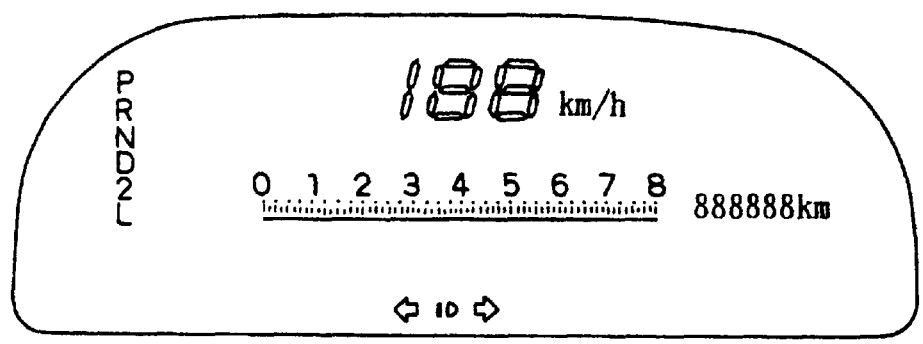
Figure 37C:
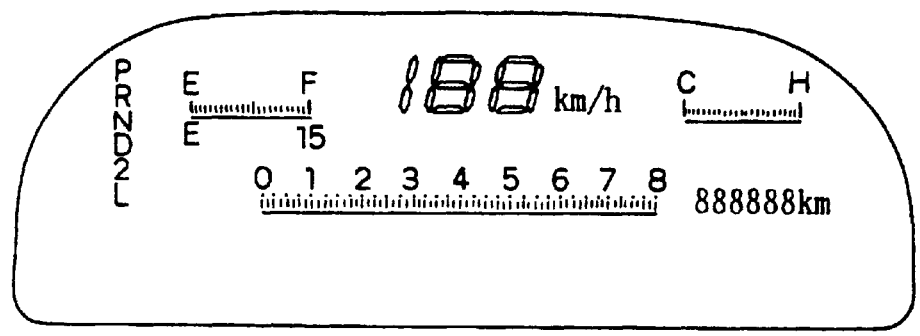

Next, a description will be given of a combination instrument using the transparent liquid crystal display of the present invention. FIG. 37(*a*) is a cross-sectional view of the combination instrument according to a 25th embodiment of the invention, wherein reference numeral 3731 is, for example, a fluorescent display lamp which is normally on to display a speedometer, tachometer, etc., as shown in FIG. 37(*b*). Reference numeral 3732 is the transparent liquid crystal display already described previously. Further, 3733 is a lighting system which illuminates the transparent liquid crystal display 3732 and is installed in an optimum location according to the arrangement of display patterns. Normally, the transparent liquid crystal display 3732 is maintained in the ON state so that it is transparent allowing viewing of the displays shown in FIG. 37(*b*). When the transparent liquid crystal display 3732 is set in the OFF state in accordance with a control signal, scattered light images showing the amount of remaining fuel, etc. are displayed in superimposed fashion, as shown in FIG. 37(*c*). When the scattered light images are illuminated, for example, with red light from the lighting system 3733, red displays are produced.

The combination instrument of the present embodiment eliminates the need for a separate display and a half-silvered mirror and hence, space for accommodating them, which were required with the conventional virtual image display system, and only requires that the transparent liquid crystal display of the invention be overlaid on the instrument. The present embodiment, therefore, is compact and inexpensive in construction, allows a wide variety of displays, and provides an excellent display. It will also be appreciated that various types of lighting system can be selected according to the purpose.

Embodiment 26

Figure 38:
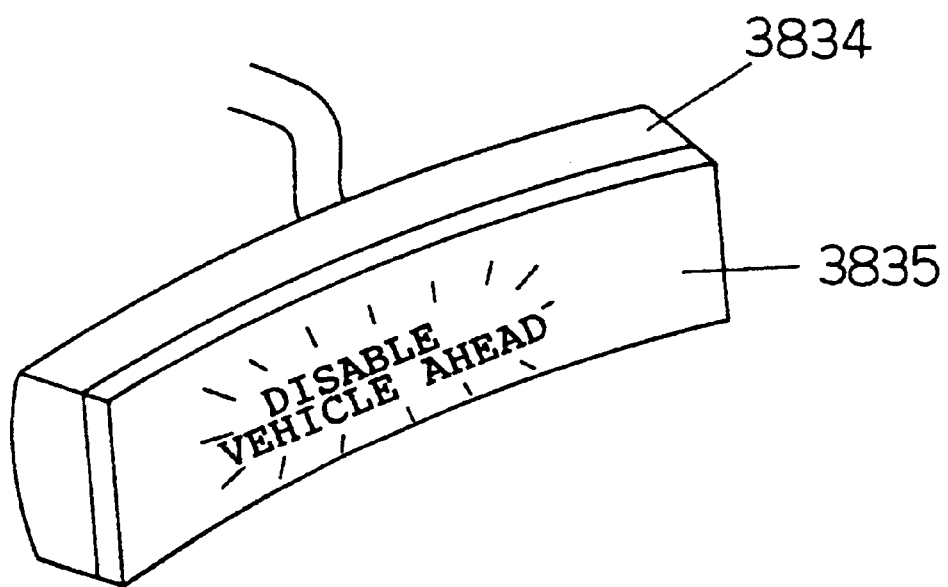
FIG. 38 is a schematic view showing a combination rearview mirror according to a 26th embodiment of the present invention.
Figure 39A:
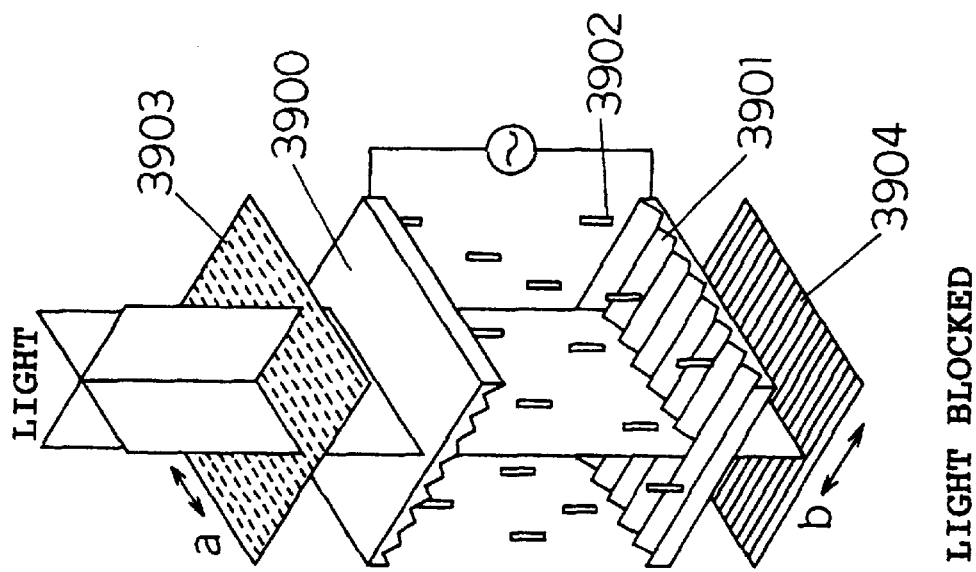
FIG. 39 is a diagram for explaining the operating principle of a prior art liquid crystal display.
Figure 39B:
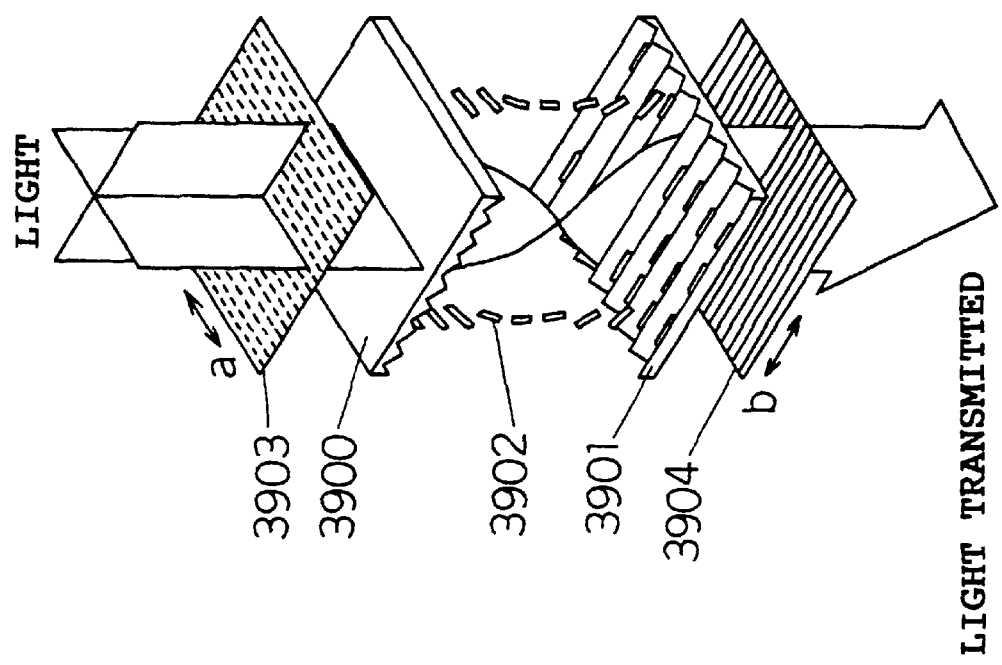
Figure 40A:
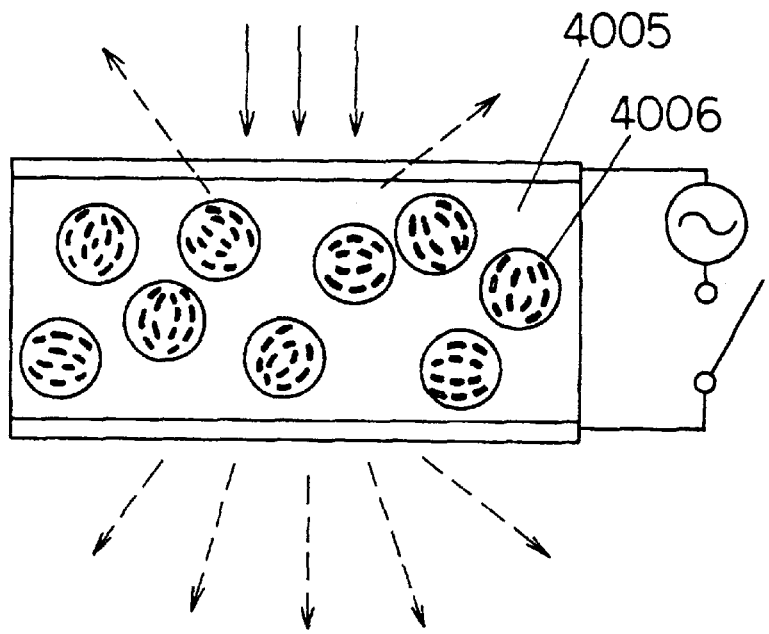
FIG. 40 is a diagram for explaining the operating principle of a prior art liquid crystal display using a macromolecular dispersion-type liquid crystal.
Figure 40B:
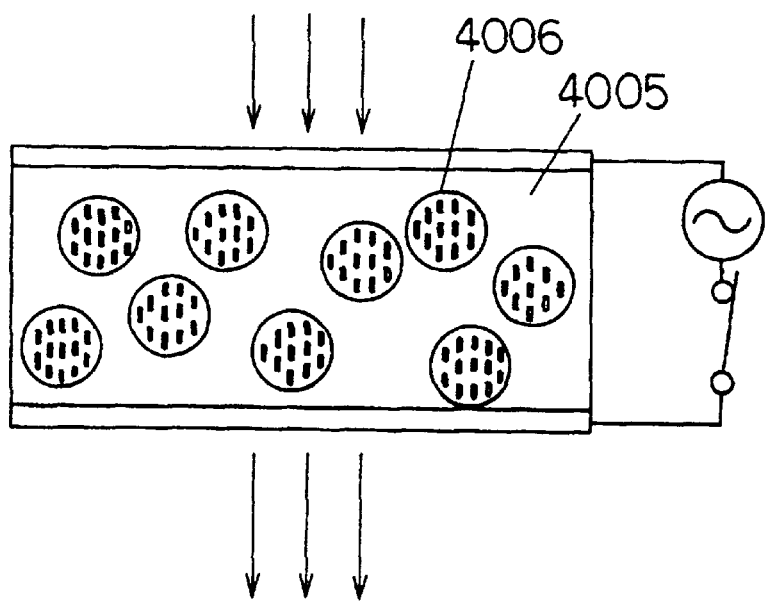
Figure 41:
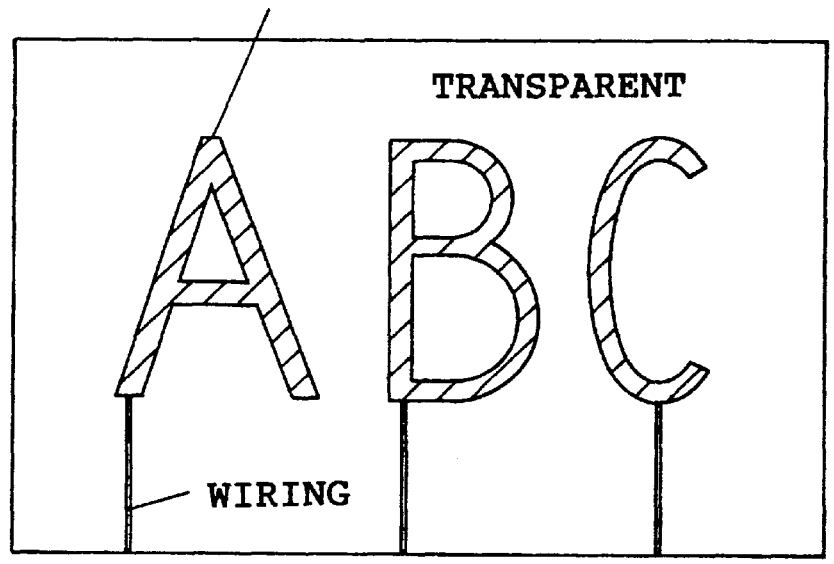
FIG. 41 is diagram showing display patterns in the prior art liquid crystal display.
Figure 42:
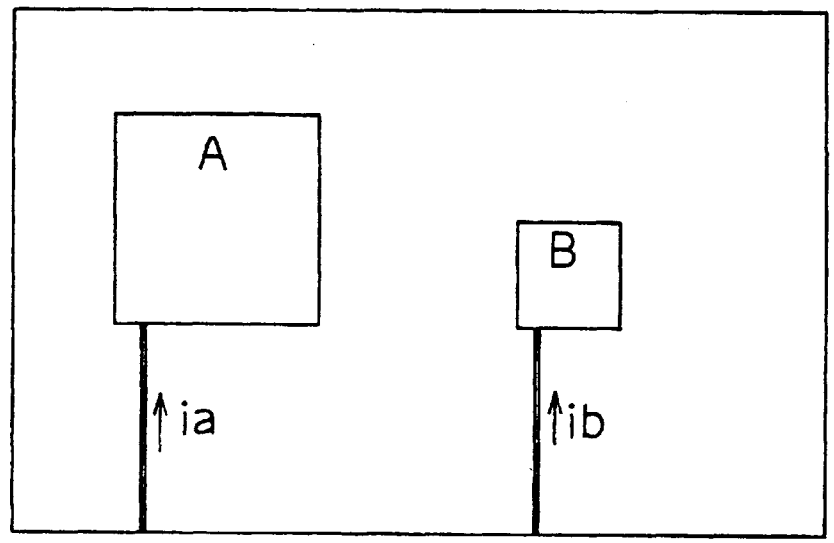
FIG. 42 is diagram showing display patterns of different area sizes in the prior art liquid crystal display.
Figure 43:
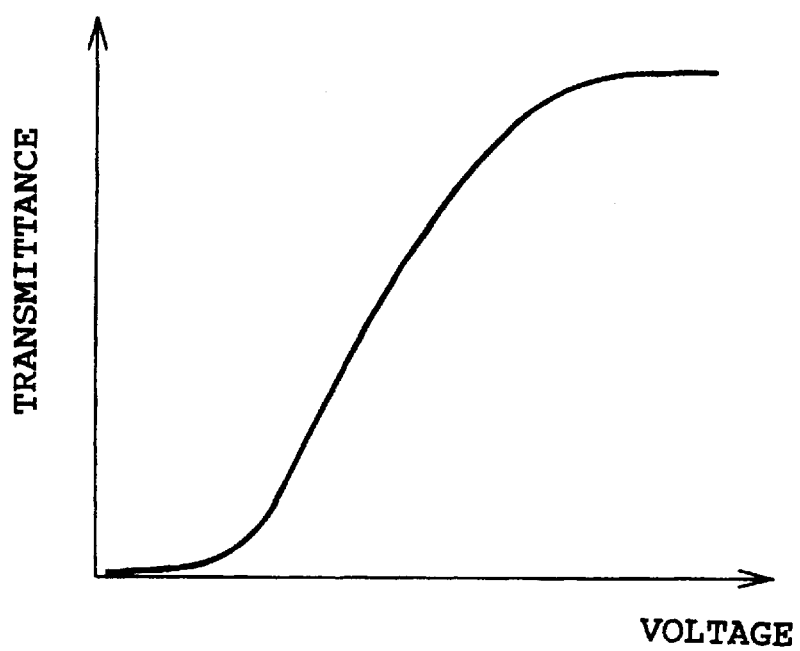
FIG. 43 is a voltage-transmittance characteristic diagram for a typical macromolecular dispersion-type liquid crystal.
Figure 44:
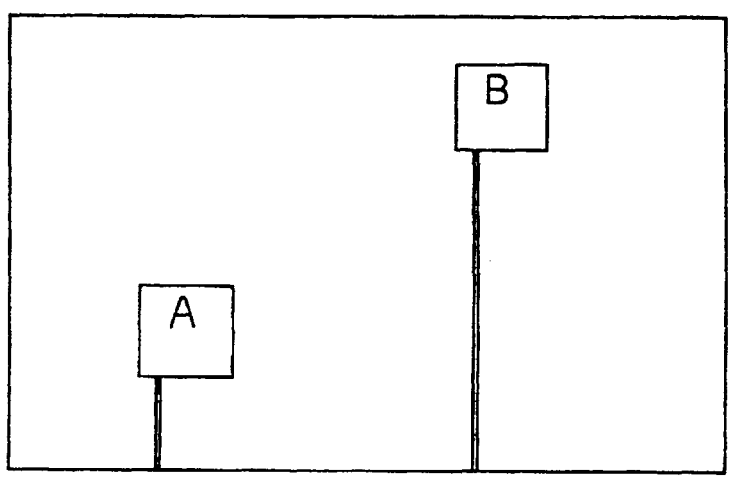
FIG. 44 is diagram showing display patterns of different wire lengths in the prior art liquid crystal display.

Next, a combination rearview mirror according to a 26th embodiment of the present invention will be described. In FIG. 38, reference numeral 3834 is an ordinary rearview mirror on which the transparent liquid crystal display 3835 already described previously is overlaid. Normally, the liquid crystal display 3835 is transparent, and the rearview mirror simply acts as an ordinary rearview mirror. When an appropriate signal is applied to the liquid crystal display 3835, a warning indication, for example, is displayed flashing, as shown in the figure, alerting the driver. Since the portions other than the displayed portions are transparent, the display can be seen in superimposed fashion on the rear view, while retaining the function as a rearview mirror.

Embodiment 27

Figure 45:
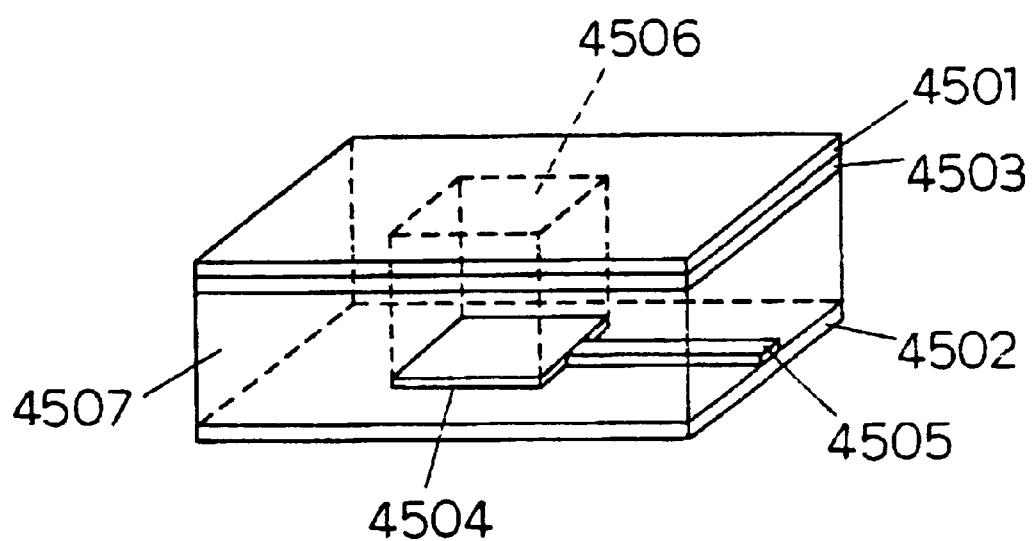
FIG. 45 is a simplified schematic diagram showing the structure of a liquid crystal display according to a 27th embodiment of the present invention.

FIG. 45 is a conceptual diagram showing the construction of a liquid crystal display according to the present invention. Reference numeral 4501 is a top transparent substrate, and 4502 is a bottom transparent substrate. A transparent electrode 4503 is deposited uniformly over the underside of the top transparent substrate 4503. A patterned transparent electrode 4504 and a transparent electrode 4505 for its wiring are deposited on the bottom transparent substrate 4502. A cube 4506 defined by dashed lines in the figure is filled with a macromolecular dispersion-type liquid crystal, while the space excluding the cube 4506 is filled with a transparent resin. In the thus constructed liquid crystal display of the present invention, when an AC signal voltage is applied between the electrode 4503 and the electrodes 4504, 4505, the region 4506 filled with the macromolecular dispersion-type liquid crystal becomes transparent in the ON state and scattered in the OFF state, thus displaying a pattern 4504. The other portions including the wiring portion 4505, which are filled with transparent resin, are always transparent, and unwanted scattered light images are not produced. That is, the image of the wiring portion can be erased. In this way, according to the invention, the macromolecular dispersion-type liquid crystal is filled only into the portions necessary for display, and the other portions which are not necessary are filled with a transparent resin instead of the macromolecular dispersion-type liquid crystal.

Figure 46:
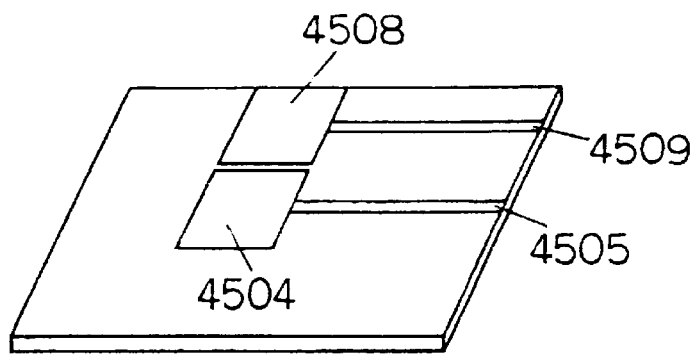
FIG. 46 is a diagram showing one example of a method of making in the 27th embodiment.
Figure 46:
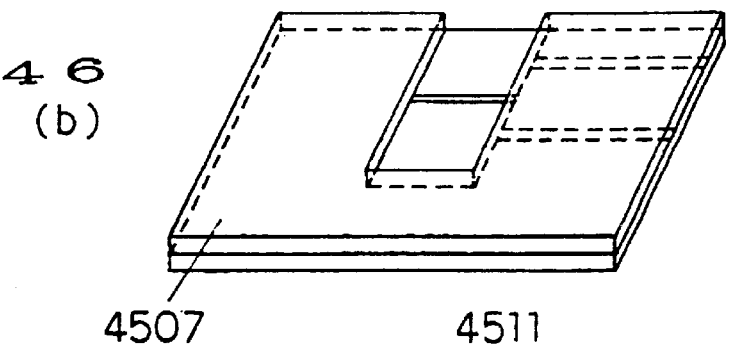
Figure 46:
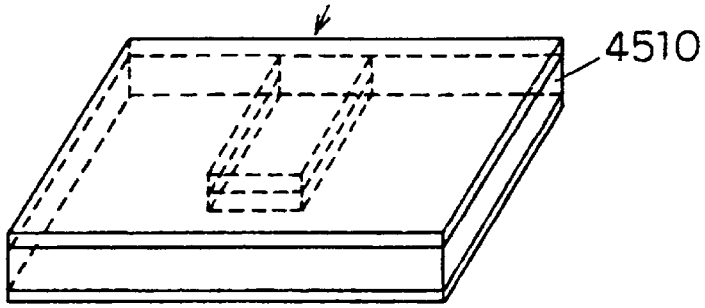
Figure 47A:
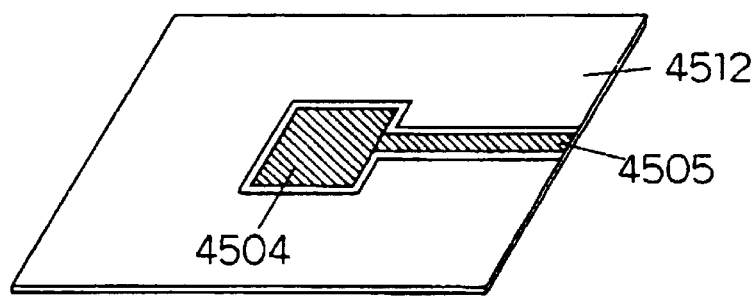
FIG. 47 is a diagram showing another example of a method of making in the 27th embodiment.
Figure 47B:
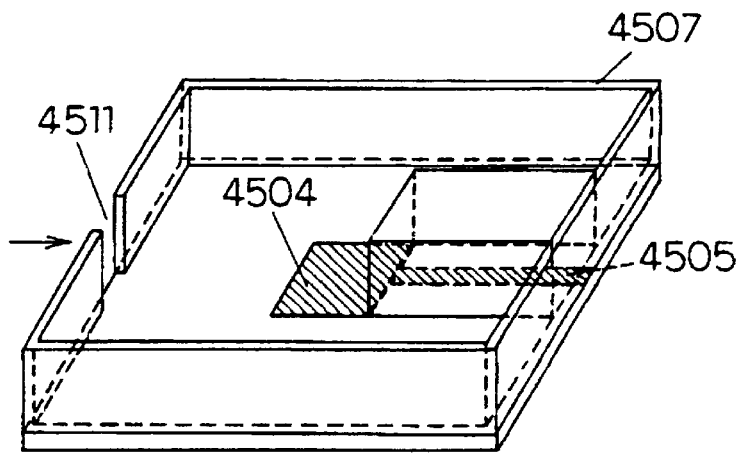

Next, a method of fabricating the liquid crystal display of the invention will be described. FIG. 46(*a*) shows transparent electrodes deposited in the form of patterns. In addition to the pattern 4504 and its wiring portion 4505 shown in FIG. 45, a new pattern 4508 arranged in close proximity to the pattern 4504 and its wiring portion 4509 are formed. It is desirable that the patterns 4504 and 4508 be formed as close to each other as possible. FIG. 46(*b*) shows a transparent resin 4507 screen-printed to a prescribed thickness on the pattern electrodes. That is, the transparent resin is printed everywhere except the pattern portions 4504 and 4508. On top of this structure, a substrate with a transparent counter electrode uniformly formed over it is overlaid, and the top and bottom substrates are bonded together with the transparent resin 4507 interposed between them, resulting in the formation of an empty cell 4510 as shown in FIG. 46(*c*) (the electrodes are not shown). Next, a macromolecular dispersion-type liquid crystal precursor (hereinafter referred to as the liquid crystal precursor) is injected through an opening 4511, and cured. When an AC voltage is applied between the electrode 4509 and the counter electrode 4503 in the thus fabricated liquid crystal display, the pattern 4508 becomes transparent and only the pattern 4504 is displayed in the scattered state. When an AC signal voltage is applied between the electrodes 4505 and 4503, the display of the pattern 4504 is turned on and off according to the applied signal. It is of course possible to apply an AC signal voltage to the pattern 4508 formed independently of the pattern 4504 and to use not only the pattern 4504 but also the pattern 4508 as a display electrode. The present embodiment has employed the method in which the transparent resin is formed in the shape shown in FIG. 46(b), the liquid crystal precursor is injected through the opening 4511 in FIG. 46(c), and an independent pattern electrode is formed in the portion of the pattern 4508 corresponding to the injection path. It will, however, be recognized that it is also possible to employ other methods, for example, a method in which, as shown in FIG. 45, the transparent resin 4507 is deposited everywhere except the space 4506 above the electrode 4504, a prescribed amount of liquid crystal precursor is dropped using a dispenser or the like to fill the space 4506, and the opposing transparent substrate is overlaid thereon and cured, or a method in which, as shown in FIG. 47(b), a transparent resin layer is formed on the substrate periphery (seal) and on the wiring portion, and the liquid crystal precursor is injected through the opening 4511 into the remaining portions where an independent electrode 4512 is deposited in advance surrounding the pattern electrode 4504 (hatched portion) and its wiring electrode 4505 (hatched portion) as shown in FIG. 47(a). With an AC voltage applied between the pattern electrode 4512 and the counter electrode 4503, the entire display area except the pattern 4504 always stays transparent. A suitable method can be selected according to the purpose and process requirements.

As the transparent resin, a sealant usually used for sealing a liquid crystal cell, or epoxy, acrylic, or other resin that can provide the necessary transparency, can be used as desired. In the present embodiment, the transparent resin was formed by screen printing, but it will be appreciated that other methods, such as a dispenser method, may be selected as desired.

What is claimed is:

1. A color display device comprising:

a light guiding member constructed with a pair of wedge-shaped light guiding plates bonded together;

light sources of different colors, each disposed facing one edge or each of said wedge-shaped light guiding plates;

substantially transparent layers, each formed on a light emergence surface of each of said wedge-shaped light guiding plates and having a higher refractive index than said guiding member; and scattering layers each formed at an exterior surface of each of said transparent layers.

2. A color display device comprising:

a plurarity of light guiding plates, disposed parallel to each other, for guiding a light therethrough;

a light scattering layer formed on a display side of each of said light guiding plates;

a low-refractive-index layer formed between said light guiding plates and on the display side of said light scattering layer;

a color filter disposed on one edge face of each of said light guiding plates; and a light source disposed near said color filter.

3. A color display device according to claim 2, wherein a layer having a higher refractive index than said light guiding plates is formed between each of said light scattering layer and each of said light guiding plates.

4. A color display device according to claim 3, wherein said high-refractive-index layer is a transparent conductive layer, and said light scattering layer is constructed with a macromolecular dispersion-type liquid crystal.

5. A vehicular onboard color display apparatus comprising:

said color display device of claim 4;

an instrument panel, installed in combination with said color display device, for displaying various conditions of a vehicle;

a control section for controlling said color display device and said instrument panel; and an operation section for allowing manual operation of displayed conditions on said color display device and said instrument panel.

6. A color display operation panel comprising:

a transparent touch panel switch;

said color display device of claim 4 overlaid on said transparent touch panel switch;

a control section for controlling said transparent touch panel switch and said color display device; and a drive circuit for driving said control section.

7. A color display device according to claim 2, wherein said low-refractive-index layer is also formed on an exterior surface of the light guiding place located at a farthest end from the display side.

8. A color display device according to claim 2, wherein said color filters are selected from a group of R, G, and B.

9. A color display device according to claim 2, wherein said color filters are each constructed to be movable with respect to each of said light guiding plates, allowing selection of a different color.

10. A vehicular onboard color display apparatus comprising:

said color display device of claim 2;

a drive circuit for driving said color display device; and a signal generator for supplying said drive circuit with display contents, said color display device positioned near a glass surface in such a manner as to allow an image displayed on said color display device to be viewed superimposed on an outside view seen through said glass surface.

* * * * *